United States Patent
Quirynen et al.

(10) Patent No.: US 11,340,899 B1
(45) Date of Patent: May 24, 2022

(54) CONTROLLER WITH EARLY TERMINATION IN MIXED-INTEGER OPTIMAL CONTROL OPTIMIZATION

(71) Applicant: Mitsubishi Electric Research Laboratories, Inc., Cambridge, MA (US)

(72) Inventors: Rien Quirynen, Somerville, MA (US); Jiaming Liang, Atlanta, GA (US); Stefano Di Cairano, Newton, MA (US)

(73) Assignee: mitsubishi electric research laboratories, inc., Cambridge, MA (US)

( * ) Notice: Subject to any disclaimer, the term of this patent is extended or adjusted under 35 U.S.C. 154(b) by 0 days.

(21) Appl. No.: 17/089,763

(22) Filed: Nov. 5, 2020

(51) Int. Cl.
*G06F 9/30* (2018.01)
*G06F 17/16* (2006.01)
*G06F 9/38* (2018.01)

(52) U.S. Cl.
CPC .......... *G06F 9/3001* (2013.01); *G06F 9/3005* (2013.01); *G06F 9/3836* (2013.01); *G06F 17/16* (2013.01)

(58) Field of Classification Search
None
See application file for complete search history.

(56) References Cited

U.S. PATENT DOCUMENTS

| | | | |
|---|---|---|---|
| 8,600,717 B2* | 12/2013 | Rashid | E21B 43/12 703/10 |
| 2004/0210426 A1* | 10/2004 | Wood | G06F 30/20 703/2 |
| 2010/0268353 A1* | 10/2010 | Crisalle | G05B 13/048 700/29 |
| 2015/0370271 A1* | 12/2015 | Raghunathan | B60H 1/00821 700/277 |
| 2016/0313751 A1* | 10/2016 | Risbeck | G05B 15/02 |
| 2016/0335223 A1* | 11/2016 | Zeng | G06F 17/11 |
| 2017/0192397 A1* | 7/2017 | Vedam | G06F 17/11 |
| 2018/0313557 A1* | 11/2018 | Turney | F24F 11/64 |
| 2020/0125045 A1 | 4/2020 | Risbeck et al. | |
| 2020/0293009 A1 | 9/2020 | Quirynen et al. | |

OTHER PUBLICATIONS

Meyer, X. et al., A Branch-and-Bound algorithm using multiple GPU-based LP solvers, 2013, IEEE, 10 pages. (Year: 2013).*

(Continued)

*Primary Examiner* — Eric Coleman
(74) *Attorney, Agent, or Firm* — Gennadiy Vinokur; Hironori Tsukamoto

(57) ABSTRACT

A system is controlled by solving a mixed-integer optimal control optimization problem using branch-and-bound (B&B) optimization that searches for a global optimal solution within a search space. The B&B optimization iteratively partitions the search space into a nested tree of regions, and prunes at least one region from the nested tree of regions before finding a local optimal solution for each region when a dual objective value of a projection of a sub-optimal dual solution estimate for each region into a dual feasible space is greater than an upper bound or lesser than a lower bound of the global optimal solution maintained by the B&B optimization.

16 Claims, 38 Drawing Sheets

(56) References Cited

OTHER PUBLICATIONS

Hespanhol, P. et al., A Structure Exploiting Branch-and-Bound Algorithm for Mixed-Integer Model Predictive Control, 2019, EUCA European control conference, pp. 2763-2768. (Year: 2019).*
Stellato, B., et al., Embedded Mixed-Integer Quadratic Optimization Using the OSQP Solver, 2018, EUCA European Control Conference, pp. 1536-1541. (Year: 2018).*
Marcucci, T., et al., Warm Start Mixed-Integer Programs for Model Predictive Control of Hybrid Systems, Jul. 7, 2020, IEEE, pp. 2433-2448. (Year: 2020).*
Richards, A., et al., Mixed-integer Programming for Control, 2005, American Control Conference, pp. 2676-2683. (Year: 2005).*
Malyuta, D., et al., Fast Trajectory Optimization via Successive Convexification for Spacecraft Rendezvous with Integer Constraints, Jan. 2020, AIAA Scitech Forum, 24 pages. (Year: 2020).*

* cited by examiner

Solve optimal control structured quadratic program (OCP-QP) — 610

$$\min_{X,U} \sum_{k=0}^{N-1} \frac{1}{2} \begin{bmatrix} x_k \\ u_k \end{bmatrix}^T \begin{bmatrix} Q_k & S_k^T \\ S_k & R_k \end{bmatrix} \begin{bmatrix} x_k \\ u_k \end{bmatrix} + \begin{bmatrix} q_k \\ r_k \end{bmatrix}^T \begin{bmatrix} x_k \\ u_k \end{bmatrix} + \frac{1}{2} x_N^T Q_N x_N + q_N^T x_N$$ — 611 s.t. $x_0 = \hat{x}_0,$ — 612
$x_{k+1} = a_k + A_k x_k + B_k u_k, \quad k = 0,\ldots,N-1,$ — 613
$d_k \geq D_k^x x_k + D_k^u u_k, \quad k = 0,\ldots,N,$ — 614

Primal-dual interior point method solves the OCP-QP by iteratively solving the smoothened system of first order necessary optimality conditions using a Newton-type method for barrier parameter values $\tau \to 0$ $Hz + F^T \lambda + G^T \mu + h = 0,$ — 601
$Fz - f = 0,$ — 602
$Gz - g + s = 0,$ — 603
$M\mathbf{1} - \tau S^{-1}\mathbf{1} = 0,$ — 604
$\mu, s \geq 0,$ — 605

$$H := \begin{bmatrix} Q_0 & S_0^T & \cdots & 0 \\ S_0 & R_0 & \cdots & 0 \\ \vdots & \vdots & \ddots & \vdots \\ 0 & 0 & \cdots & Q_N \end{bmatrix}, \quad G := \begin{bmatrix} D_0^x & D_0^u & \cdots & 0 \\ \vdots & \vdots & \ddots & \vdots \\ 0 & 0 & \cdots & D_N^x \end{bmatrix}$$

$$F := \begin{bmatrix} -\mathbf{1} & 0 & 0 & \cdots & 0 & 0 \\ A_0 & B_0 & -\mathbf{1} & 0 & \cdots & 0 \\ \vdots & & & \ddots & & \vdots \\ 0 & \cdots & 0 & 0 & A_{N-1} & B_{N-1} & -\mathbf{1} \end{bmatrix}$$

Algorithm 1 Early termination for IPM in B&B method. ~ 750

1: Input: Warm start $\{(z^0, \mu^0, \lambda^0, s^0)\}$, $tol$, and UB. ~ 751
2: while $\max\{r^k, \|r^k\|\} > tol$ do ~ 626
3:    if $\psi(\mu^k, \lambda^k) > $ UB & dual_feasible then ~ 505
4:       break while loop.     ▷ Early termination ~ 550
5:    else if $\psi(\mu^k, \lambda^k) > $ UB then ~ 506
6:       Compute projection step $(\Delta\mu, \Delta\lambda)$ in (12). ~ 710
7:       $\mu \leftarrow \mu^k + \Delta\mu$, $\lambda \leftarrow \lambda^k + \Delta\lambda$, and ~ 752
8:       $r_y \leftarrow F_y^\top \lambda + G_y^\top \mu + h_y$. ~ 753
9:       if $\mu > 0$ & $\|r_y\| < tol$ then ~ 705
10:          $\mu^k \leftarrow \mu$, $\lambda^k \leftarrow \lambda$, $r_y^k \leftarrow r_y$, and ~ 720
11:          dual_feasible $\leftarrow$ 1.
12:       if $\psi(\mu^k, \lambda^k) > $ UB then ~ 507
13:          break while loop.     ▷ Early termination ~ 550
14:       end if
15:    end if
16:    end if
17:    Perform an IPM iteration (8), e.g., see [17]. ~ 530
18: end while

Fig. 7D

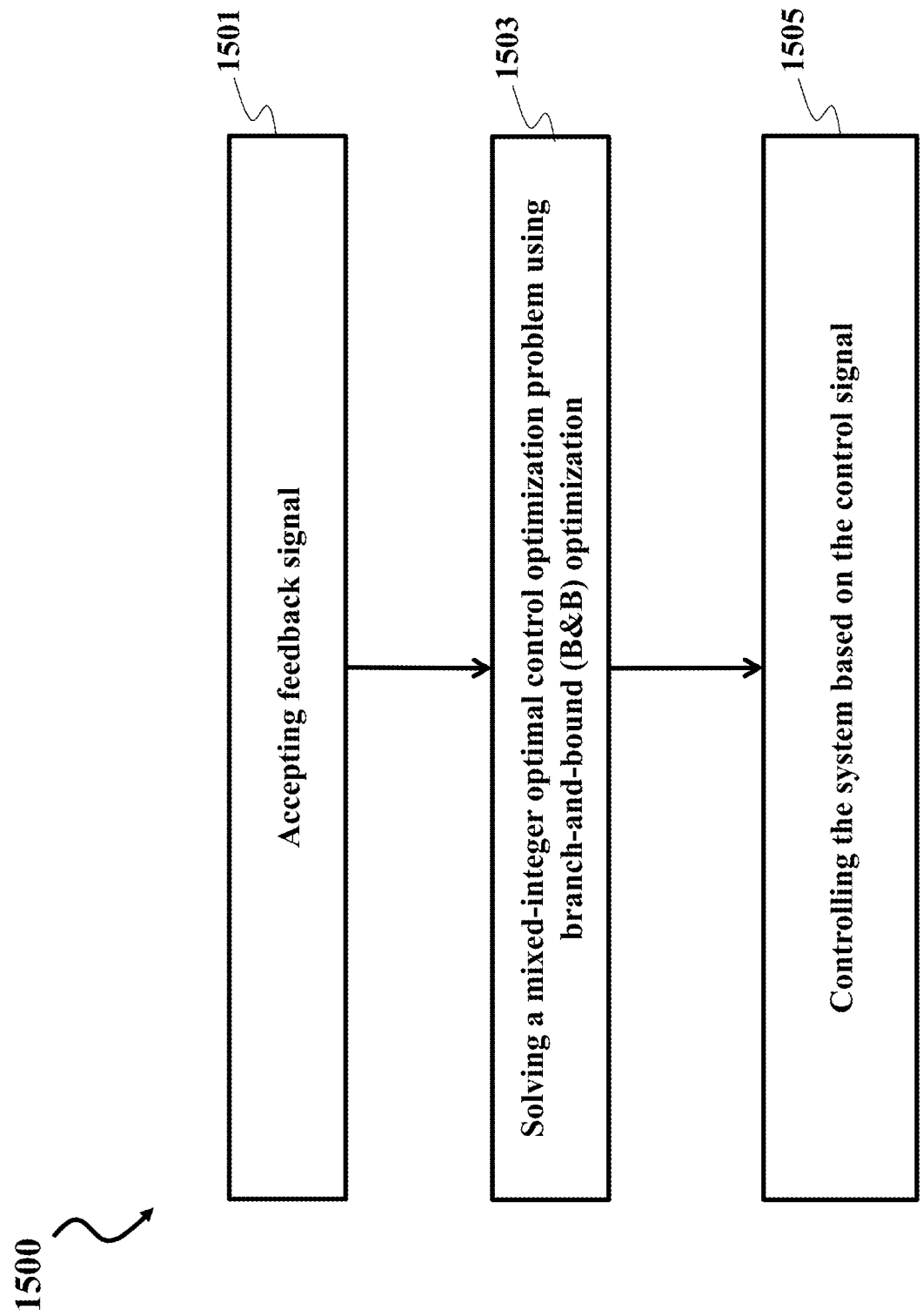

CONTROLLER WITH EARLY TERMINATION IN MIXED-INTEGER OPTIMAL CONTROL OPTIMIZATION

TECHNICAL FIELD

The present disclosure relates generally to optimization-based control, and more particularly to methods and apparatus for model predictive control of systems with continuous and discrete elements of operations.

BACKGROUND

Optimization based decision making, planning and control techniques, such as model predictive control (MPC), allow a model-based design framework in which the system dynamics, the system requirements and constraints can directly be taken into account. This framework has been extended to hybrid systems, including both continuous and discrete decision variables, which provides a powerful technique to model a large range of problems, e.g., including dynamical systems with mode switching or systems with quantized actuation, problems with logic rules, temporal logic specifications or obstacle avoidance constraints. However, the resulting optimization problems are highly non-convex, and therefore difficult to solve in practice, because they contain variables which only take integer values. When using a linear or linear-quadratic objective in combination with linear system dynamics and linear inequality constraints, the resulting optimal control problem (OCP) can be formulated as a mixed-integer linear program (MILP) or mixed-integer quadratic program (MIQP). More general convex inequality constraints can be included such as quadratic inequality constraints, resulting in a mixed-integer quadratically constrained quadratic program (MIQCQP), or second order cone constraints, resulting in a mixed-integer second order cone program (MISOCP).

Decision making, planning or control for hybrid systems aims to solve such a mixed-integer program (MIP) at every sampling time instant. This is a difficult task, given that mixed-integer programming is NP-hard in general, and several methods for solving such a sequence of MIPs have been explored in the literature. These approaches can be divided in heuristic techniques, which seek to efficiently find sub-optimal solutions to the problem, and optimization algorithms which attempt to solve the MIPs to optimality. Examples of the former techniques can be based on rounding and pumping schemes, using approximate optimization algorithms, or based on approximate dynamic programming. The downside of fast heuristic approaches is often the lack of guarantees for finding an optimal or even an integer-feasible but suboptimal solution.

Most mixed-integer optimization algorithms are based on a variant of the branch-and-bound (B&B) technique in order to solve the MIPs to optimality. Variants of the branch-and-bound strategy have been combined with various methods for solving the relaxed convex subproblems, e.g., with dual active-set solvers, interior point algorithms, dual projected gradient methods, nonnegative least squares solvers, and the alternating direction method of multipliers (ADMM). One advantage of using a dual active-set solver, is that a dual feasible starting point for the child problems can be computed from the dual solution of the parent. The latter allows early termination of the solver for the relaxed problem, whenever the dual objective becomes larger than the current upper bound, resulting in a reduced computational cost of the branch-and-bound optimization method.

Interior point methods (IPMs) can be used to solve more general convex optimization problems and they generally exhibit better worst-case computational performance, compared to active-set type optimization algorithms. In addition, recent advances in warm starting strategies for IPMs have motivated the use of IPMs within branch-and-bound optimization for mixed-integer programming However, unlike dual active-set methods, an IPM does not generally provide a dual feasible solution estimate at each iteration, which could be used for early termination of the convex solver in the branch-and-bound strategy.

SUMMARY

The present disclosure proposes an approach for early termination, before the optimal solution to the convex relaxation is computed, based on the detection of cases when the solution to the convex relaxation can be discarded due to infeasibility or based on the current global upper bound, in order to reduce the computational effort of the branch-and-bound method. The present disclosure describes a tailored projection step in order to compute a dual feasible solution estimate, given a primal-dual solution estimate at the current iteration of the interior point method, which allows to evaluate the dual objective for early termination of the convex solver in the branch-and-bound method. The same strategy of early termination can be used for primal infeasibility detection.

Embodiments are based on a branch-and-bound (B&B) optimization algorithm to solve mixed-integer programming problems. The B&B optimization algorithms for mixed-integer programming require the solution of multiple convex relaxations, to compute lower and upper bounds for the optimal solution to the mixed-integer program, the solution of which can often be discarded whenever the convex relaxation is primal infeasible or when the objective value exceeds the current global upper bound. Interior point methods are generally applicable to a large class of optimization problems and can be very reliable for solving the convex relaxations in branch-and-bound methods for mixed-integer programming, even without a good initial estimate for the optimal solution.

To that end, it is an object of some embodiments to adapt the B&B optimization algorithm to solve mixed-integer programming problems for decision making, planning, or control of hybrid systems that involve both continuous and discrete decision variables. Additionally, or alternatively, it is another object of some embodiments, to provide control techniques that use interior-point methods (IPM) for solving the convex relaxations in branch-and-bound methods for mixed-integer programming.

Some embodiments are based on recognition that the advantage of the B&B optimization lies in its ability to efficiently prune the spaces not containing the optimal results to reduce the search space. Specifically, the goal of the B&B algorithm is to find a value x that maximizes or minimizes the value of a real-valued function f(x), called an objective function, among some set S of admissible, or candidate solutions. The set S is called the search space, or a feasible region. Further, $S_I$ is used to denote the set of candidate solutions of an instance I. The instance representation comprises three operations such as branch(I), bound (I), and solution(I). The operation branch(I) produces two or more instances that each represents a subset of $S_I$. Typically, the subsets are disjoint to prevent the algorithm from visiting the same candidate solution twice, but this is not required. However, the optimal solution among $S_I$ must be contained in at least one of the subsets. The operation bound(I) computes a lower (and/or upper) bound on the value of any candidate solution in the space represented by I, that is, bound(I)≤f(x) for all x in $S_I$. The operation solution(I) determines whether I represents a single candidate solution. Alternatively, if it does not, the operation may choose to return some feasible solution from among $S_I$.

Using these operations, a B&B algorithm performs a top-down recursive search through the tree of instances formed by the branch operation. Upon visiting an instance I, it checks whether bound(I) is greater than the lower bound and/or greater than the global upper bound for some other instance that it already visited. If bound(I) is greater than the global upper bound, then I may be safely discarded from the search and the recursion steps. This pruning step is usually implemented by maintaining a global variable that records the minimum lower bound and the maximum upper bound seen among all instances examined so far.

Typically, to evaluate a lower bound for the instance I representing a partition of a search space, the solution of a convex relaxation for the instance I needs to be determined. In a number of practical applications of the B&B algorithm for solving nonconvex mixed-integer problems subject to equality and inequality constraints, the computation of a lower bound for an instance I is performed using a convex relaxation of the optimization problem over the search space corresponding to the instance I. Since many convex relaxations typically need to be solved as part of the B&B algorithm to find the optimal solution to a single mixed-integer problem, the efficient solution of convex relaxations is important and there is a need to reduce the computational burden of the B&B algorithm.

Some embodiments are based on a recognition that in optimization theory, duality or the duality principle is the principle that optimization problems may be viewed from either of two perspectives, the primal problem or the dual problem formulation. The solution to the dual problem provides a lower bound to the solution of the primal (minimization) problem. In general, the optimal values of the primal and dual problems need not be equal. Their difference is called the duality gap. However, for many convex optimization problems, the duality gap is zero under a constraint qualification condition.

Some embodiments are based on understanding that solution to the dual problem provides a lower bound to the solution of the primal (minimization) problem. If the dual objective value for a feasible but suboptimal solution of the dual problem is greater than a previously determined upper bound in the B&B algorithm for the solution of the mixed-integer program, then the optimal solution of the dual problem is also greater than the upper bound and any feasible solution of the primal problem is also greater than the upper bound. Hence, there is no need to find the optimal solution of the dual and/or the primal problem in a situation when the dual objective value for at least one feasible solution of the dual problem is greater than the upper bound in the context of a B&B method. In other words, if the dual objective value for any dual feasible solution of instance I is greater than the upper bound maintained by the B&B method, the optimal solution of instance I cannot be lower than the upper bound and should be discarded. In such a manner, the computational burden of the B&B method can be reduced.

However, some embodiments are based on another realization that unfortunately, these above-mentioned principles of early termination of the solution procedure for the convex relaxation based on a dual feasible solution estimate are not directly applicable to situations when the solutions of the convex relaxation are evaluated using a primal-dual interior point method. This is because the primal-dual interior point method is designed to find the feasible and optimal solution at the same time, meaning that until the optimal solution is found, the primal or dual feasibility of intermediate solutions is not guaranteed. For early termination based on the dual objective, a dual feasible solution estimate is needed.

Some embodiments are based on understanding that the primal-dual interior point optimization is an iterative method. It is possible to test the intermediate and sub-optimal dual solution for its feasibility and compare the sub-optimal dual solution against the upper bound only if the sub-optimal dual solution is feasible. However, due to the principles of interior-point optimization, the feasibility of the sub-optimal dual solution is more likely in the space closer to the optimality and the computational cost to find a dual feasible solution estimate may therefore be large in a standard interior point optimization method. Hence, testing the feasibility and testing the dual objective value for a dual feasible solution estimate against the upper bound value to eliminate sub-optimal branches in the B&B algorithm is more likely only near the end of the interior point optimization method. However, it is desired to prune the sub-optimal branches as soon as possible to reduce the computational burden of the B&B method.

Some embodiments are based on the realization that instead of checking the feasibility of sub-optimal dual solutions, it can be more efficient to project a sub-optimal dual solution to its feasible space and compare the dual objective value for the projections against the upper bound value. In such a manner, even an infeasible solution can be used to check the optimality of the currently evaluated instance I without finding its optimal dual and/or primal solution.

Some embodiments of the present disclosure are based on the interior point method (IPM) to solve the inequality-constrained convex relaxations in the branch-and-bound algorithm, and the proposed implementation of the method includes a tailored projection step, based on the solution of an equality constrained optimization problem, that can be used to compute a dual feasible solution estimate for early termination of the solver, starting from a primal-dual solution estimate at the current iteration of the IPM.

In an interior point optimization method, the values of Lagrange multipliers become increasingly close to zero while the slack variables remain nonzero for inequality constraints that are inactive at the optimal solution, i.e., when the left- and right-hand side of such inequality constraints are not equal to each other at the solution. On the other hand, the values of slack variables become increasingly close to zero while the Lagrange multiplier values remain nonzero for inequality constraints that are active at the optimal solution, i.e., when the left- and right-hand side of such inequality constraints are equal to each other at the solution. In terms of the ratio between the slack variables and the Lagrange multiplier values, over the subsequent iterations of the IPM, the value of this ratio is either increasing or decreasing, respectively, for each of the inequality constraints that are either inactive or active at the optimal solution to the convex relaxation.

Embodiments of the present disclosure are based on the realization that an inequality constrained optimization problem would need to be solved in a projection step to ensure feasibility with respect to both equality and inequality constraints of the dual problem for the convex relaxation, which is too computationally expensive, and an equality constrained optimization problem is solved instead to implement the projection step. Some embodiments are based on the realization that the values for the ratio between the slack variables and the Lagrange multiplier values can be used in a weighting matrix for the Lagrange multipliers in the objective of the equality constrained optimization problem that is solved in the projection step to compute a dual feasible solution estimate, given a primal-dual solution estimate at the current iteration of the IPM. The solution to the latter equality constrained optimization problem provides multiple important advantages, compared to a standard minimum norm projection onto the dual feasibility constraints.

First, the use of an objective term $\|\Delta\mu\|_{w^k}^2$ in the proposed equality constrained optimization problem to implement the projection step, based on the ratio $$w_i^k = \frac{s_i^k}{\mu_i^k}$$

between the value of the slack variable $s_i^k$ and of the Lagrange multiplier $\mu_i^k$ for each inequality constraint, indirectly enforces the positivity constraints $\mu \le 0$. More specifically, an objective term $\|\Delta\mu_i\|_{w_i^k}^2$ penalizes the step $\Delta\mu_i$ to remain small when the current value $\mu_i^k > 0$ is close to zero, resulting in a large value for the ratio $$w_i^k = \frac{s_i^k}{\mu_i^k},$$

which makes it likely to satisfy the positivity constraint $\mu_i^k + \Delta\mu_i > 0$ for the Lagrange multiplier value after the projection step.

Second, in some embodiments of the present disclosure, the optimal solution to the equality constrained optimization problem in the proposed projection step is computed by solving a structured linear system corresponding to the first order necessary optimality conditions, i.e., the Karush-Kuhn-Tucker (KKT) conditions for the convex relaxation. In some embodiments, a linear system for the projection step can be solved using the same matrix factorization procedure that is used to solve the linear system in each iteration of the IPM. In addition, some embodiments reuse the matrix factorization from a projection step to solve the linear system in the subsequent IPM iteration. Finally, unlike a standard minimum norm projection, the equality constrained optimization problem in the proposed projection strategy aims to maintain any progress towards convergence of the IPM, i.e., it preserves the progress towards primal feasibility and optimality of the primal-dual solution estimate of the IPM.

Embodiments of the present disclosure use the proposed projection step to compute a dual feasible solution estimate, given a primal-dual solution estimate at the current iteration of the IPM, if the dual objective value is larger than a particular threshold value. More specifically, if the dual objective value exceeds the current global upper bound in the branch-and-bound optimization method, then the dual objective is likely to exceed the upper bound also for the dual feasible solution estimate after the projection step, resulting in early termination of the IPM to solve the convex relaxation and a corresponding reduction of the computational effort.

Embodiments of the present disclosure are based on the realization that the objective value for the dual problem is smaller than or equal to the objective value of the primal formulation of the convex relaxation, such that the dual objective value exceeds the current upper bound only if the optimal objective value for the convex relaxation exceeds the current upper bound in the branch-and-bound method, i.e., only if the solution to the convex relaxation can be discarded.

The dual objective is unbounded when the primal problem corresponding to a convex relaxation is infeasible. Embodiments of the present disclosure are based on the realization that the dual objective goes to infinitely large values for subsequent iterations of an IPM applied to a primal infeasible convex relaxation, such that the proposed projection step can be used to compute a dual feasible solution estimate, followed by early termination whenever the dual objective value exceeds the current upper bound in the branch-and-bound method.

Some embodiments involve a branch-and-bound optimization method to solve mixed-integer optimal control problems (MI-OCP) that involve both continuous and discrete variables in the model, objective and constraints that, respectively, describe the system, the performance metric and system requirements. Some embodiments include state and control input variables that are either continuous or discrete, i.e., they can only assume a discrete set of values. The present disclosure aims to solve block-sparse mixed-integer optimal control problems to implement model predictive control for hybrid systems, such that problem sparsity can be used in our proposed early termination strategy to efficiently solve the convex optimization problem relaxations in a branch-and-bound method.

In some embodiments of the present disclosure, the projection step can be based on a Cholesky factorization in combination with a forward and backward substitution, using the Cholesky factors, to solve the equality constrained optimization problem that provides the updated Lagrange multiplier values to achieve dual feasibility. In some embodiments, a block-tridiagonal Cholesky factorization can be used in combination with a block-structured forward and backward substitution. In some embodiments, the (block-structured) Cholesky factorization from a projection step can be reused to solve the linear system in the subsequent IPM iteration.

Some embodiments are based on the realization that the computational cost for one evaluation of the dual objective is considerably smaller than the computational cost for one projection step. Therefore, in embodiments of the present disclosure, the projection step is performed if and only if the evaluated value of the dual objective for a dual infeasible solution estimate is larger than the current upper bound in the branch-and-bound optimization method.

Accordingly, an embodiment discloses a predictive controller for controlling a system, the predictive controller comprising: at least one processor; and memory having instructions stored thereon that, when executed by the at least one processor, cause the predictive controller to: accept feedback signal including measurements of a state of the system; solve a mixed-integer optimal control optimization problem using branch-and-bound (B&B) optimization that searches for a global optimal solution within a search space to produce a control signal, wherein the B&B optimization iteratively partitions the search space into a nested tree of regions, and prunes at least one region from the nested tree of regions before finding a local optimal solution for each region when a dual objective value of a projection of a sub-optimal dual solution estimate for each region into a dual feasible space is greater than an upper bound or lesser than a lower bound of the global optimal solution maintained by the B&B optimization; and control the system based on the control signal to change the state of the system.

According to an example embodiment, the nested tree of regions are formed by different convex relaxations of integer variables of the mixed-integer optimal control optimization problem, and where the local optimal solution within each region of the nested tree of regions is searched by an interior-point method over multiple iterations, such that the sub-optimal dual solution estimate for each region is produced by an intermediate iteration of the interior-point method.

According to an example embodiment, the local optimal solution is based on an early termination procedure, where the early termination procedure allows the interior-point method to terminate its iterative procedure before the local optimal solution for the at least one region is found in case when: a dual feasible solution estimate is computed after one or multiple iterations of the interior point method and the dual objective value is greater than the upper bound of the global optimal solution maintained by the B&B optimization; or a projection step is performed after one or multiple iterations of the interior point method to compute a dual feasible solution estimate and the corresponding dual objective value is greater than the upper bound of the global optimal solution maintained by the B&B optimization; or the interior point method detects after one or multiple iterations that no feasible solution exists for the at least one region.

According to an example embodiment, the processor is configured to: perform the projection of the sub-optimal dual solution estimate for the early termination procedure when the dual objective value for the sub-optimal dual solution estimate is greater than the upper bound; and otherwise continue to execute the iterative solution method from a sub-optimal dual solution estimate to find the optimal solution to the convex relaxation.

According to an example embodiment, the projection step computes an update to the sub-optimal dual solution estimate by solving an equality-constrained optimization problem that enforces the dual feasibility constraints and minimizes a norm of the update for Lagrange multiplier variables.

According to an example embodiment, the local optimal solution for the at least one region is used to initialize the iterative solution procedure in one or multiple other regions within the nested tree of regions for the B&B optimization.

According to an example embodiment, the projection step computes the sub-optimal dual solution estimate from the local optimal solution to perform the early termination procedure for one or multiple other regions within the nested tree of regions for the B&B optimization.

According to an example embodiment, the projection step enforces one or multiple additional optimality conditions; and minimizes a weighted norm of the update for optimization variables, based on a positive definite weighting matrix in an objective function.

According to an example embodiment, the projection step computes an update to the sub-optimal dual solution estimate by solving a block-structured linear system, the solution of which forms an optimal solution to the equality-constrained optimization problem.

According to an example embodiment, the positive definite weighting matrix in the objective of the projection step corresponds to a Hessian matrix as a weighting for the update to the primal optimization variables, a diagonal matrix of small positive weighting values for the update to the Lagrange multipliers corresponding to the equality constraints in the convex relaxation, and a positive weighting value that corresponds to the ratio between the slack variable and the Lagrange multiplier value corresponding to each inequality constraint after one or multiple iterations of a convex solution procedure.

According to an example embodiment, the block-structured linear system is solved by solving a reduced linear system to compute an update to the optimization variables, followed by a solution of a diagonal linear system to compute an update to the Lagrange multiplier variables.

According to an example embodiment, a Cholesky factorization is computed or updated, given the Cholesky factorization from a previous projection step or from a previous iteration of a convex solution procedure, to compute a solution to the reduced linear system with a positive definite KKT matrix.

According to an example embodiment, the KKT matrix of the reduced linear system has a block-tridiagonal sparsity structure due to the block-structured sparsity of the mixed-integer optimal control optimization problem, and a block-tridiagonal Cholesky factorization is computed or updated to compute a solution to the reduced linear system with a positive definite, block-tridiagonal KKT matrix.

According to an example embodiment, where the predictive controller is implemented using a mixed-integer model predictive control (MI-MPC), where the MI-MPC computes the control signal based on current state of the system and control command, and where the MI-MPC computes a control solution that comprises a sequence of future optimal discrete and continuous control inputs over a prediction time horizon of the system, by solving a constrained mixed-integer optimization problem at each control time step.

According to an example embodiment, the system is a vehicle, and where the predictive controller determines an input to the vehicle based on the mixed-integer control solution, where the input to the vehicle includes one or a combination of an acceleration of the vehicle, an engine torque of the vehicle, brake torques, and a steering angle, and the discrete optimization variables are used to model one or a combination of discrete control decisions, switching in the system dynamics, gear shifting, and obstacle avoidance constraints.

According to an example embodiment, where the system is a spacecraft, and wherein the predictive controller determines an input to the spacecraft based on the mixed-integer control solution, where the input to the spacecraft actuates one or a combination of thrusters and momentum exchange devices, and the discrete optimization variables are used to model one or a combination of discrete control decisions, switching in the system dynamics, integer values for the thruster commands, and obstacle avoidance constraints.

According to an example embodiment, the system is a vapor compression system, and where the predictive controller determines an input to the vapor compression system based on the mixed-integer control solution, where the input to the vapor compression system includes one or a combination of an indoor unit fan speed, an outdoor unit fan speed, a compressor rotational speed, an expansion valve position, and a flow reversing valve position, and the discrete optimization variables are used to model one or a combination of discrete control decisions, switching in the system dynamics, and integer values for the commands that are sent to the valves and/or to the fans.

Accordingly, another embodiment discloses a method for controlling a system, where the method uses at least one processor; and memory having instructions stored thereon that, when executed by the at least one processor carry out steps of the method, comprising: accepting feedback signal including measurements of a state of the system. The method further comprises solving a mixed-integer optimal control optimization problem using branch-and-bound (B&B) optimization that searches for a global optimal solution within a search space to produce a control signal, wherein the B&B optimization iteratively partitions the search space into a nested tree of regions, and prunes at least one region from the nested tree of regions before finding a local optimal solution for each region when a dual objective value of a projection of a sub-optimal dual solution estimate for each region into a dual feasible space is greater than an upper bound or lesser than a lower bound of the global optimal solution maintained by the B&B optimization. The method further comprises controlling the system based on the control signal to change the state of the system.

According to an example embodiment, a non-transitory computer readable storage medium embodied thereon a program executable by a processor for performing a method, the method comprising: accepting feedback signal including measurements of a state of the system; solving a mixed-integer optimal control optimization problem using branch-and-bound (B&B) optimization that searches for a global optimal solution within a search space to produce a control signal, wherein the B&B optimization iteratively partitions the search space into a nested tree of regions, and prunes at least one region from the nested tree of regions before finding a local optimal solution for each region when a dual objective value of a projection of a sub-optimal dual solution estimate for each region into a dual feasible space is greater than an upper bound or lesser than a lower bound of the global optimal solution maintained by the B&B optimization; and controlling the system based on the control signal to change the state of the system.

BRIEF DESCRIPTION OF THE DRAWINGS

FIG. 6A illustrates a block-sparse interior point optimization algorithm to solve the constrained optimal control structured quadratic program (OCP-QP) by iteratively solving a relaxed system of necessary optimality conditions, according to some embodiments.

FIG. 7D illustrates pseudo code of an early termination procedure for the solution of a convex relaxation within the branch-and-bound optimization algorithm in the predictive controller, based on evaluation of the dual objective and based on a projection step onto a dual feasible solution estimate, according to some embodiments.

FIG. 15 illustrates a method for controlling a system, according to an example embodiment.

DETAILED DESCRIPTION

Some embodiments of the present disclosure provide a system and a method for controlling an operation of a system or a system using a predictive controller. An example of the predictive controller is a model predictive control (MPC) determining control inputs based on a model of the controlled system.

Figure 1A:
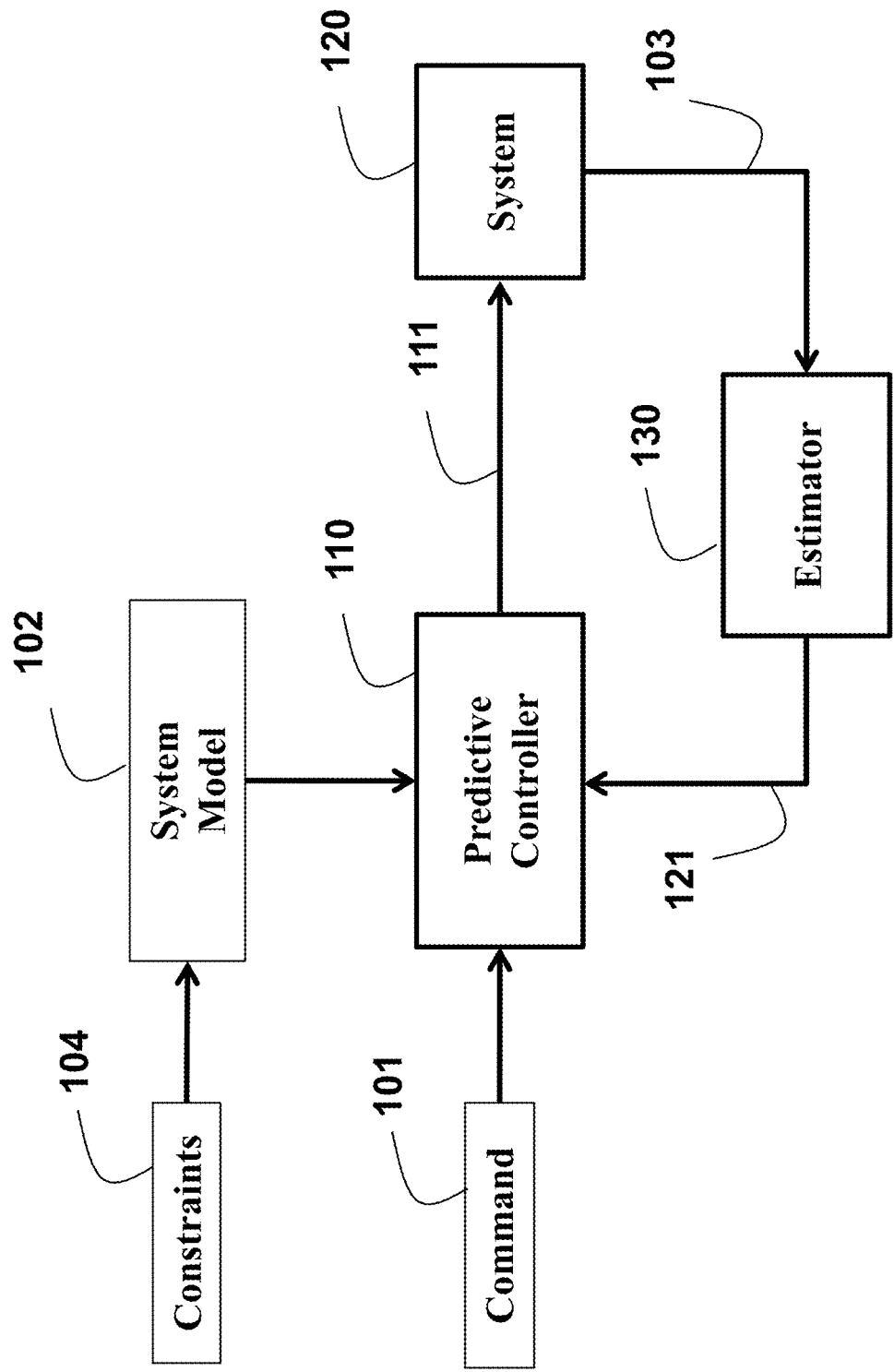
FIG. 1A illustrates a block diagram of a predictive controller and feedback system, according to some embodiments.

FIG. 1A illustrates a block diagram of a predictive controller 110 and feedback system 120, according to some embodiments. FIG. 1A shows an example feedback system (or system) 120 connected to the predictive controller 110 (or controller) via a state estimator 130 according to some embodiments. In some implementations, the predictive controller 110 is an MPC controller programmed according to a dynamical model 102 (or system model) of the system 120. The system model 102 can be a set of equations representing changes of the state and output 103 of the system 120 over time as functions of current and previous inputs 111 and previous outputs 103. The system model 102 can include constraints 104 that represent physical and operational limitations of the system 120. During the operation, the controller 110 receives a command 101 indicating the desired behavior of the system 120. The command can be, for example, a motion command. In response to receiving the command 101, the controller 110 generates a control signal 111 that serves as an input for the system 120. In response to the input, the system updates the output 103 of the system 120. Based on measurements of the output 103 of the system 120, the estimator 130 updates the estimated state 121 of the system 120. This estimated state 121 of the system 120 provides the state feedback to the predictive controller 110. Thus, the predictive controller initially accepts feedback signal 121 of the system 120, via the estimator 130, where the feedback signal 121 includes measurements of a state of the system 120.

The system 120, as referred herein, can be any machine or device controlled by certain manipulation input signals, e.g. control signal 111 (inputs), possibly associated to physical quantities such as voltages, pressures, forces, torques, and to return some controlled output signals 103 (outputs), possibly associated to physical quantities such as currents, flows, velocities, positions indicative of a transition of a state of the system from a previous state to the current state. The output values are related in part to previous output values of the system, and in part to previous and current input values. The dependency on previous inputs and previous outputs is encoded in the state of the system. The operation of the system, e.g., a motion of components of the system, can include a sequence of output values generated by the system following the application of certain input values.

The system model 102 may include a set of mathematical equations that describe how the system outputs change over time as functions of current and previous inputs, and the previous outputs. The state of the system 120 is any set of information, in general time varying, for instance an appropriate subset of current and previous inputs and outputs, that, together with the model of the system and future inputs, can uniquely define the future motion of the system.

The system 120 can be subject to physical limitations and specification constraints 104 limiting the range where the outputs, the inputs, and also possibly the states of the system 120 are allowed to operate.

The controller 110 can be implemented in hardware or as a software program executed in a processor, e.g., a microprocessor, which at fixed or variable control period sampling intervals receives the estimated state 121 of the system 120 and the desired motion command 101 and determines, using this information, the inputs, e.g., the control signal 111, for operating the system 120. The controller 110 further solves a mixed-integer optimal control optimization problem using branch-and-bound (B&B) optimization that searches for a global optimal solution within a search space to produce a control signal 111. The B&B optimization iteratively partitions the search space into a nested tree of regions, and prunes at least one region from the nested tree of regions before finding a local optimal solution for each region when a dual objective value of a projection of a sub-optimal dual solution estimate for each region into a dual feasible space is greater than an upper bound or lesser than a lower bound of the global optimal solution maintained by the B&B optimization. Further, the nested tree of regions is formed by different convex relaxations of integer variables of the mixed-integer optimal control optimization problem. The controller 110, further, controls the system 120 based on the control signal 111 to change the state of the system 120.

Further, the local optimal solution within each region of the nested tree of regions is searched by an interior-point method over multiple iterations, such that the sub-optimal dual solution estimate for each region is produced by an intermediate iteration of the interior-point method. The local optimal solution is based on an early termination procedure, where the early termination procedure allows the interior-point method to terminate its iterative procedure before the local optimal solution for the at least one region is found in case when:

1. a dual feasible solution estimate is computed after one or multiple iterations of the interior point method and the dual objective value is greater than the upper bound of the global optimal solution maintained by the B&B optimization; or
2. a projection step is performed after one or multiple iterations of the interior point method to compute a dual feasible solution estimate and the corresponding dual objective value is greater than the upper bound of the global optimal solution maintained by the B&B optimization; or
3. the interior point method detects after one or multiple iterations that no feasible solution exists for the at least one region.

Further, the local optimal solution for the at least one region of the nested tree of regions is used to initialize the iterative procedure in one or multiple other regions within the nested tree of regions for the B&B optimization.

The estimator 130 can be implemented in hardware or as a software program executed in a processor, either the same or a different processor from the controller 110, which at fixed or variable control period sampling intervals receives the outputs of the system 103 and determines, using the new and the previous output measurements, the estimated state 121 of the system 120.

Thus, by using the B&B optimization, the processor prunes the spaces not containing the optimal results to reduce the search space. Due to the reduced search space, the processor is enabled to accurately determine optimal solutions to control the state of the system 120 in less time. Accordingly, the processor achieves fast processing speed with high accuracy.

Figure 1B:
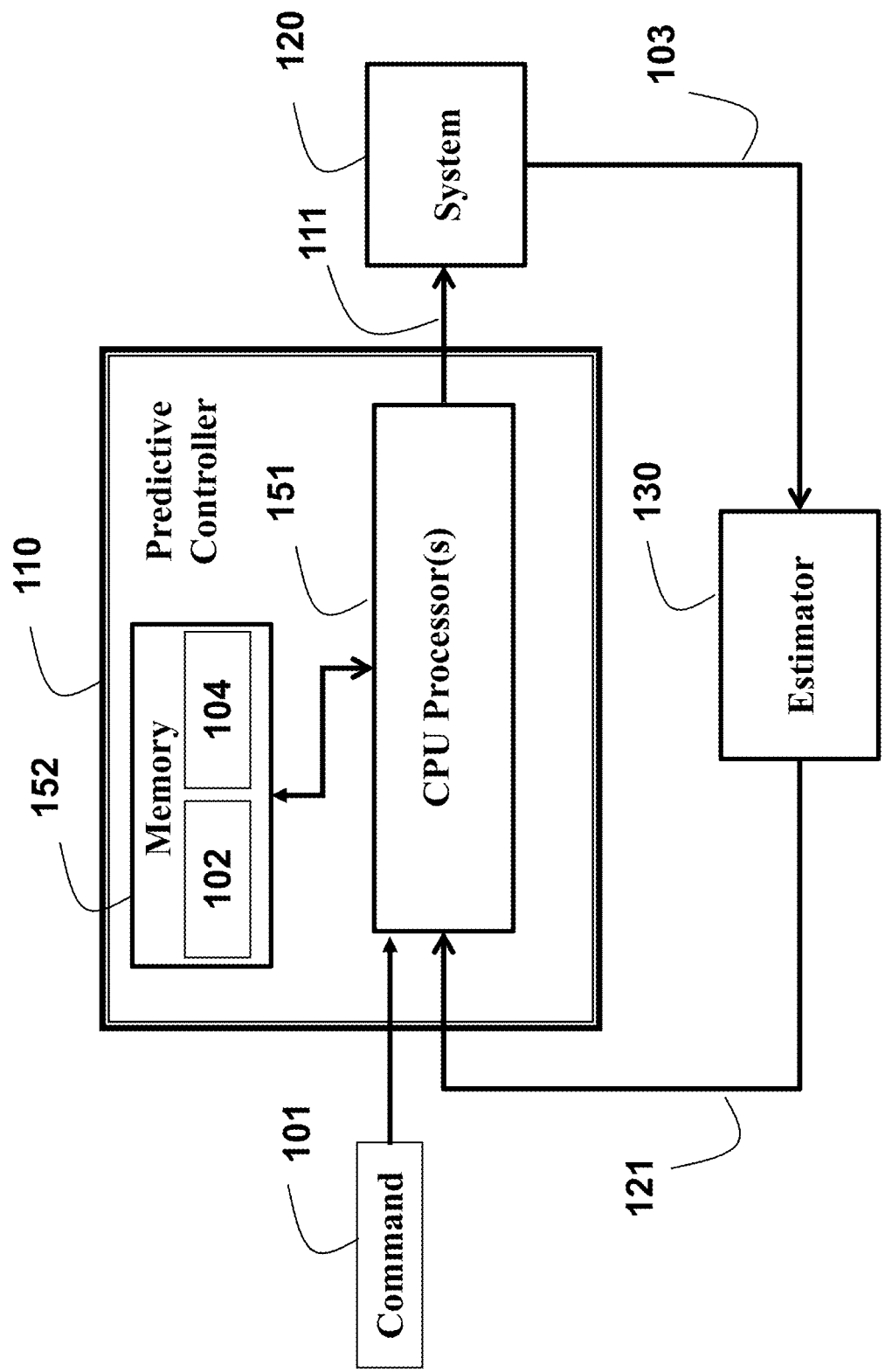
FIG. 1B illustrates a block diagram of the predictive controller and the feedback system, according to some embodiments.

FIG. 1B illustrates a block diagram of the predictive controller 110 and the feedback system 120, according to some embodiments. The predictive controller 110 actuates the system 120 such that the estimated state 121 of the system 120 and output 103 follow the command 101. The controller 110 includes a computer, e.g., in the form of a single central processing unit (CPU) or multiple CPU processors 151 connected to memory 152 for storing the system model 102 and the constraints 104 on the operation of the system 120. The CPU processors 151 may be comprised of a single core processor, a multi-core processor, a computing cluster, or any number of other configurations. The memory 152 may include random access memory (RAM), read only memory (ROM), flash memory, or any other suitable memory systems.

Figure 2A:
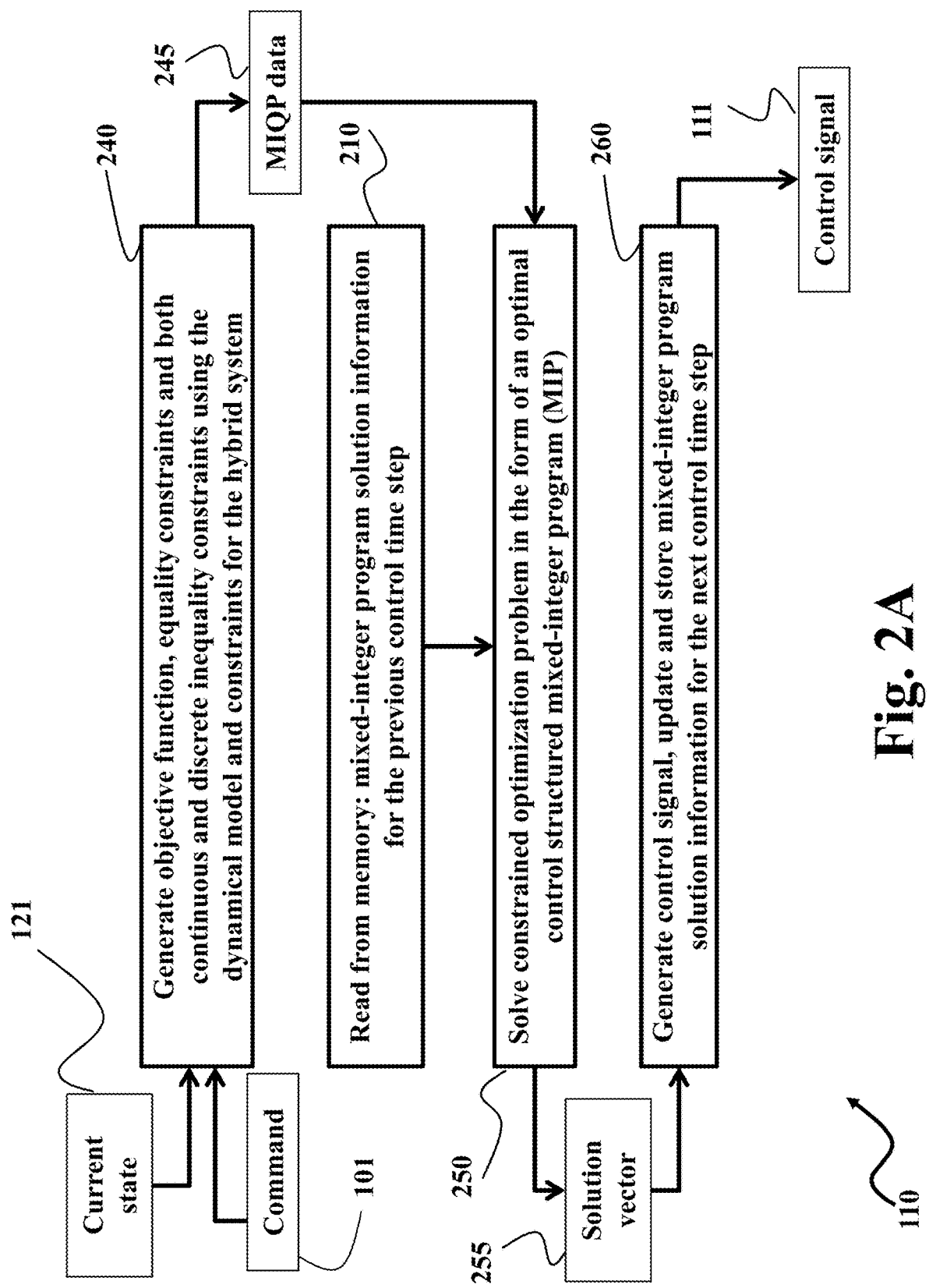
FIG. 2A illustrates a block diagram of a method for mixed-integer model predictive control (MI-MPC) to implement the predictive controller that computes the control signal, given the current state of the system, and the control command, according to some embodiments.

FIG. 2A illustrates a block diagram of a system and a method for mixed-integer model predictive control (MI-MPC) to implement the predictive controller 110 that computes the control signal 111, given the current state of the system 121 and the control command 101, according to some embodiments. Specifically, MI-MPC computes a control solution, e.g., a solution vector 255 that contains a sequence of future optimal discrete and continuous control inputs over a prediction time horizon of the system 260, by solving a constrained mixed-integer optimization problem 250 at each control time step. The MIQP data 245 of the objective function, equality, and discrete and continuous inequality constraints in this optimization problem 250 depends on the dynamical model, the system constraints 240, the current state of the system 121, objectives of control and the control command 101.

In some embodiments, the solution of this inequality constrained mixed-integer optimization problem 250 uses the state and control values over the prediction time horizon from the previous control time step 210, which can be read from the memory. This concept is called warm- or hot-starting of the optimization algorithm and it can reduce the required computational effort of the MI-MPC controller in some embodiments. In a similar fashion, the corresponding solution vector 255 can be used to update and store a sequence of optimal state and control values for the next control time step 260.

In some embodiments, the mixed-integer optimization algorithm is based on a search algorithm such that the MI-MPC controller updates and stores additional mixed-integer program solution information 260 in order to reduce the computational effort of the search algorithm at the next control time step. In one embodiment, the MI-MPC problem at each control time step is solved using a branch-and-bound optimization method and the warm starting information 260 includes data related to the nodes in the binary search tree that are part of the solution path from the root node to the leaf node where the optimal integer-feasible control solution is found, in order to improve the node selection and variable branching strategies from one control time step to the next.

Figure 2B:
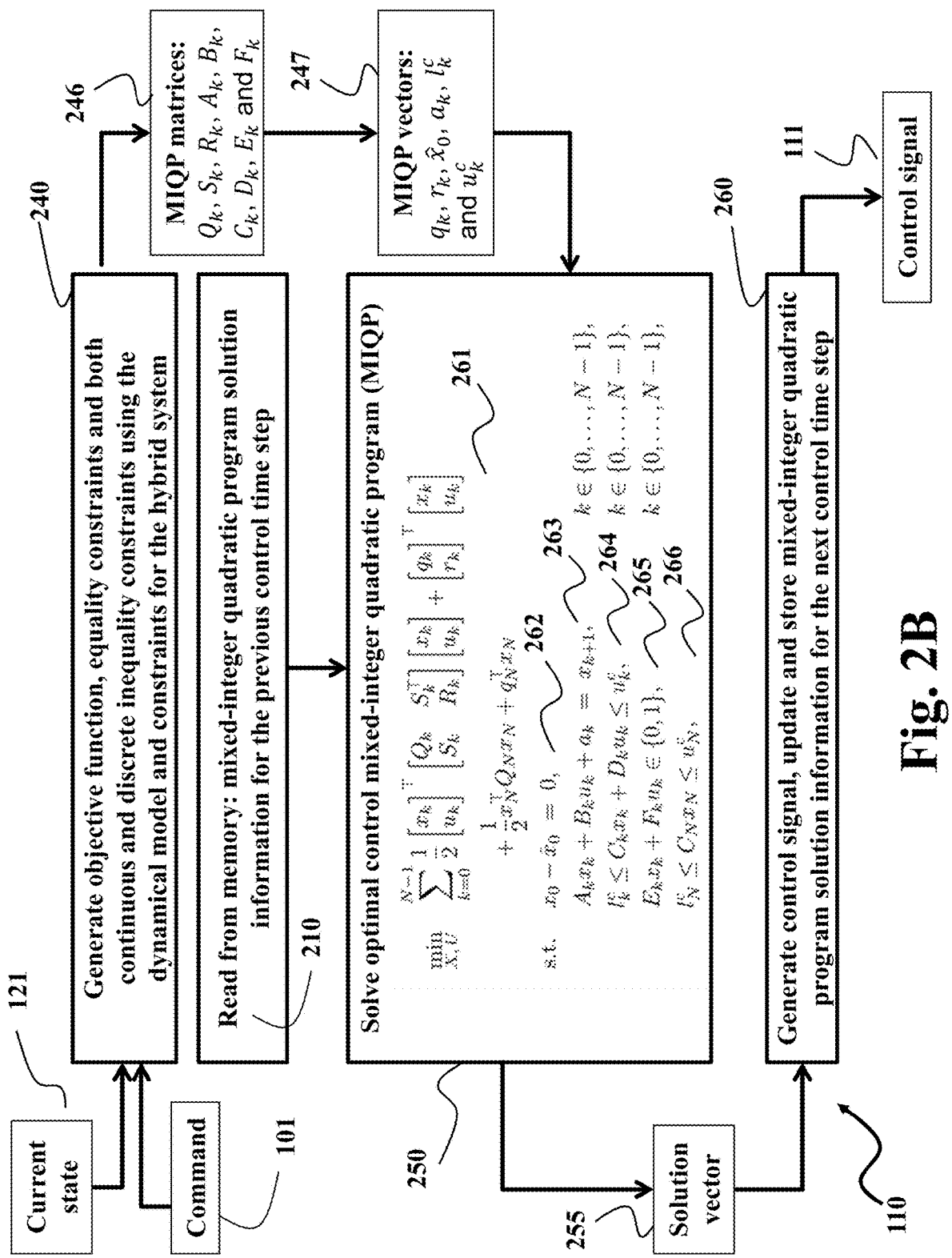
FIG. 2B illustrates a block diagram of an MI-MPC method that solves an optimal control structured mixed-integer quadratic program (MI-QP), according to some embodiments.

FIG. 2B illustrates a block diagram of an MI-MPC method that solves an optimal control structured mixed-integer optimization problem 250 in order to compute the control signal 111 at each control time step, given the current state 121 of the system 120 and the command 101. Some embodiments are based on a linear dynamical model of the system 263 with linear equality constraints 262, linear continuous inequality constraints 264, linear discrete equality constraints 265, linear terminal inequality constraints 266 and a linear-quadratic objective function 261, such that a constrained mixed-integer quadratic program (MIQP) 250 needs to be solved at each control time step. The MIQP data 245 then include the Hessian and constraint Jacobian matrices 246 and the corresponding gradient and constraint evaluation vectors 247. In general, the linear discrete equality constraints 265 state that a linear function of state and control values, $E_k x_k + F_k u_k$, is constrained to be equal to one of a discrete set of values. In some embodiments, the linear discrete equality constraints 265 are binary equality constraints, $E_k x_k + F_k u_k \in \{0,1\}$, for example, this formulation includes a constraint on a particular control input variable to be equal to either 0 or 1.

Figure 3A:
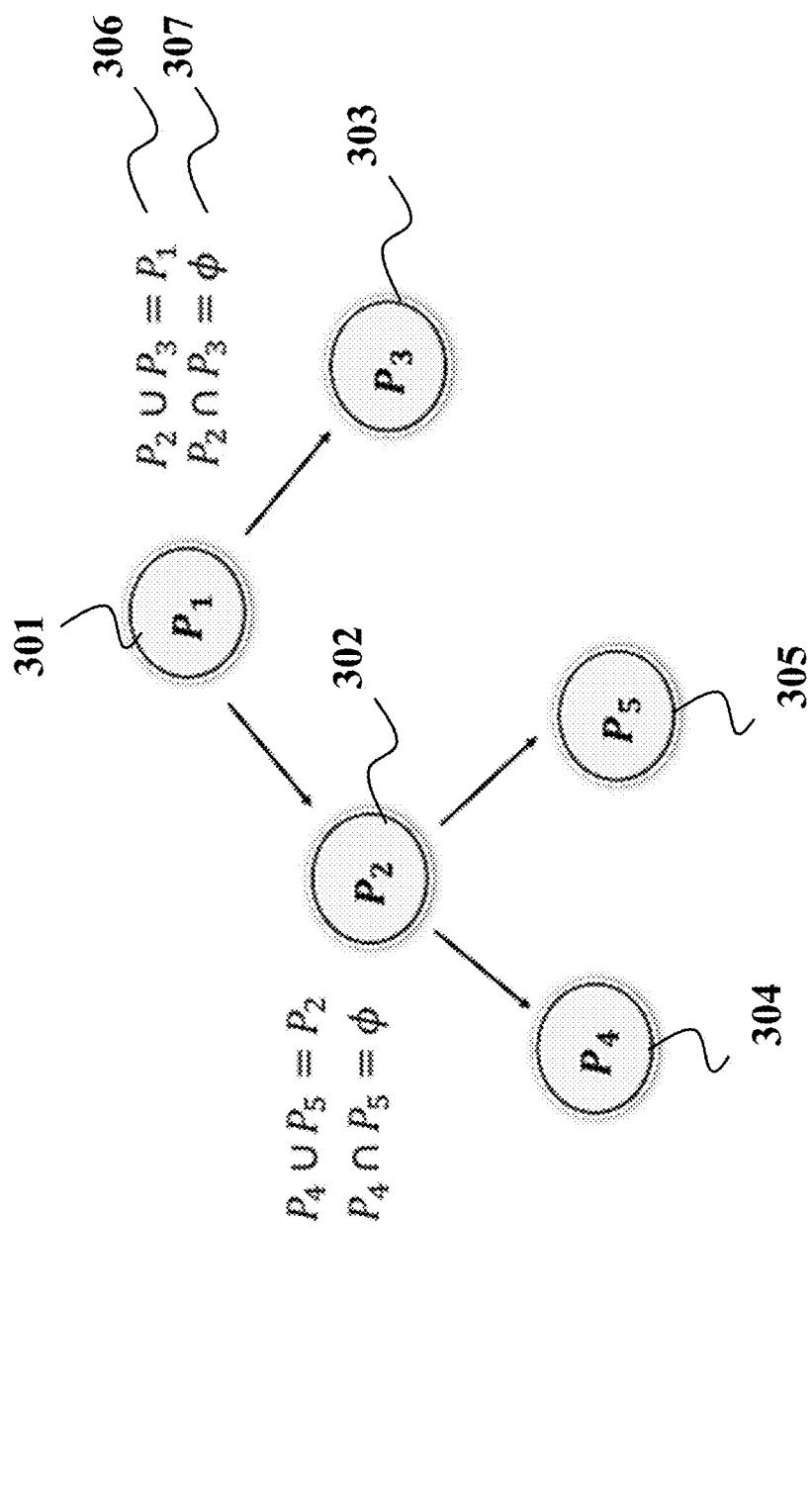
FIG. 3A illustrates a schematic of an example of a binary control variable search tree that represents a nested tree of search regions for the integer-feasible control solution, according to some embodiments.

FIG. 3A illustrates a schematic of an example of a binary control variable search tree that represents a nested tree of search regions for the integer-feasible control solution, according to some embodiments. FIG. 3A shows a schematic representation of a branch-and-bound method, which is used to implement the MI-MPC controller in some embodiments, by showing the binary search tree 300 at a particular iteration of the mixed-integer optimization algorithm. The main idea of a branch-and-bound (B&B) method is to sequentially create partitions of the original problem and then attempt to solve those partitions, where each partition corresponds to a particular region of the discrete control variable search space. In some embodiments, a branch-and-bound method selects a partition or node and selects a discrete control variable to branch this partition into smaller partitions or search regions, resulting in a nested tree of partitions or search regions.

For example, the partition $P_1$ 301 represents a discrete search region that can be split or branched into two smaller partitions or regions $P_2$ 302 and $P_3$ 303, i.e., a first and a second region that are nested in a common region. The first and the second region are disjoint, i.e., the intersection of these regions is empty $P_2 \cap P_3 = \phi$ 307, but they form the original partition or region $P_1$ together, i.e., the union $P_2 \cup P_3 = P_1$ 306 holds after branching. The branch-and-bound method then solves an integer-relaxed MPC problem for both the first and the second partition or region of the search space, resulting in two solutions (local optimal solutions) that can be compared against each other as well as against the currently known upper bound value to the optimal objective value. The first and/or the second partition or region can be pruned if their performance metric is less optimal than the currently known upper bound to the optimal objective value of the MI-MPC problem. The upper bound value can be updated if the first region, the second region or both regions result in a discrete feasible solution to the MI-MPC problem. The branch-and-bound method then continues by selecting a remaining region in the current nested tree of regions for further partitioning.

While solving each partition may still be challenging, it is fairly efficient to obtain local lower bounds on the optimal objective value, by solving local relaxations of the mixed-integer program or by using duality. If the MI-MPC solver happens to obtain an integer-feasible solution while solving a local relaxation, the MI-MPC solver can then use it to obtain a global upper bound for the mixed-integer control solution of the original MI-MPC problem. This may help to avoid solving or branching certain partitions that were already created, i.e., these partitions or nodes can be pruned. This general algorithmic idea of partitioning can be represented as a binary search tree 300, including a root node, e.g., $P_1$ 301 at the top of the tree, and leaf nodes, e.g., $P_4$ 304 and $P_5$ 305 at the bottom of the tree. In addition, the nodes $P_2$ 302 and $P_3$ 303 are typically referred to as the direct children of node $P_1$ 301, while node $P_1$ 301 is referred to as the parent of nodes $P_2$ 302 and $P_3$ 303. Similarly, nodes $P_4$ 304 and $P_5$ 305 are children of their parent node $P_2$ 302.

Figure 3B:
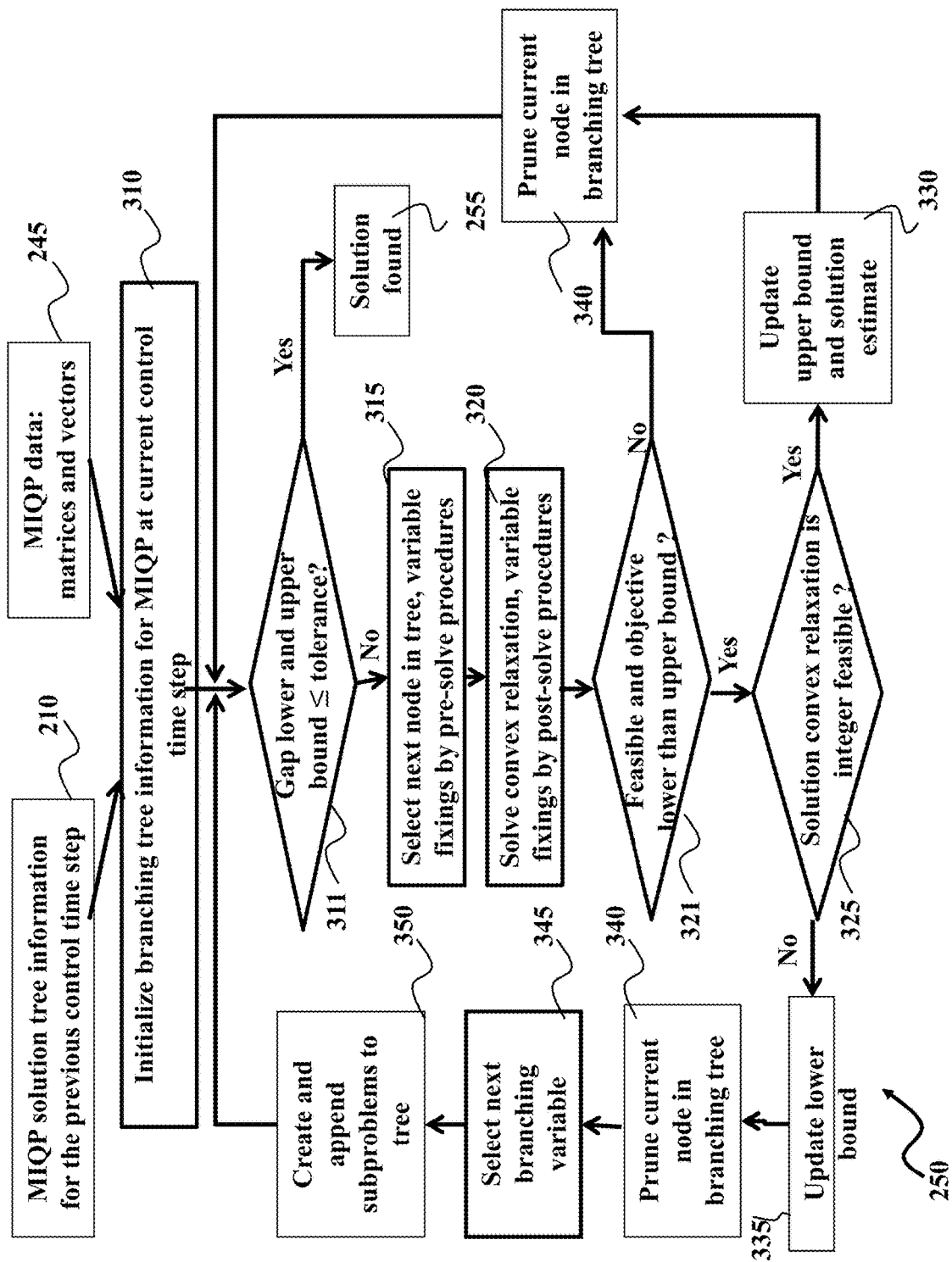
FIG. 3B illustrates a block diagram of a branch-and-bound mixed-integer optimization algorithm to search for the integer-feasible optimal control solution based on a nested tree of search regions and corresponding lower/upper bound values, according to some embodiments.

FIG. 3B illustrates a block diagram of a branch-and-bound mixed-integer optimization algorithm to search for the integer-feasible optimal control solution based on a nested tree of search regions and corresponding lower/upper bound values, according to some embodiments. The block diagram of a branch-and-bound mixed-integer optimization algorithm illustrated in FIG. 3B can be used to implement the MI-MPC controller in some embodiments. The branch-and-bound method initializes the branching search tree information for the mixed-integer quadratic program (MIQP) at the current control time step 310, based on the MIQP data 245 that consists of MIQP matrices 246 and MIQP vectors 247. The initialization can additionally use the branching search tree information and MIQP solution information from the previous control time step 210 in order to generate a warm started initialization for the current control time step 310. The main goal of the optimization algorithm is to construct lower and upper bounds on the objective value of the mixed-integer control solution. At step 311, if the gap between the lower and upper bound value is smaller than a particular tolerance value, then the mixed-integer optimal control solution 255 is found.

As long as the gap between the lower and upper bound value is larger than a particular tolerance value at step 311, and a maximum execution time is not yet reached by the optimization algorithm, then the branch-and-bound method continues to search iteratively for the mixed-integer optimal control solution 255. Each iteration of the branch-and-bound method starts by selecting the next node in the tree, corresponding to the next region or partition of the integer variable search space, with possible variable fixings based on pre-solve branching techniques 315. After the node selection, the corresponding integer-relaxed MPC problem is solved, with possible variable fixings based on post-solve branching techniques 320.

If the integer-relaxed MPC problem has a feasible solution, then the resulting relaxed control solution provides a lower bound on the objective value for that particular region or partition of the integer variable search space. At step 321, if the objective is determined to be larger than the currently known upper bound for the objective value of the optimal mixed-integer control solution, then the selected node is pruned or removed from the branching tree 340. However, at step 321, if the objective is determined to be lower than the currently known upper bound, and the relaxed control solution is integer feasible 325, then the currently known upper bound and corresponding mixed-integer control solution estimate is updated at step 330.

If the integer-relaxed MPC problem has a feasible solution and the objective is lower than the currently known upper bound 321, but the relaxed control solution is not yet integer feasible, then the global lower bound for the objective can be updated 335 to be the minimum of the objective values for the remaining leaf nodes in the branching tree and the selected node is pruned from the tree 340. In addition, starting from the current node, a discrete variable with a fractional value is selected for branching according to a particular branching strategy 345, in order to create and append the resulting subproblems, corresponding to regions or partitions of the discrete search space, as children of that node in the branching tree 350.

An important step in the branch-and-bound method is how to create the partitions, i.e., which node to select 315 and which discrete variable to select for branching 345. Some embodiments are based on branching one of the binary control variables with fractional values in the integer-relaxed MPC solution. For example, if a particular binary control variable $\mu_{i,k} \in \{0,1\}$ has a fractional value as part of the integer-relaxed MPC solution, then some embodiments create two partitions of the mixed-integer program by adding, respectively, the equality constraint $\mu_{i,k}=0$ to one subproblem and the equality constraint $u_{i,k}=1$ to the other subproblem. Some embodiments are based on a reliability branching strategy for variable selection 345, which aims to predict the future branching behavior based on information from previous branching decisions.

Some embodiments are based on a branch-and-bound method that uses a depth-first node selection strategy, which can be implemented using a last-in-first-out (LIFO) buffer. The next node to be solved is selected as one of the children of the current node and this process is repeated until a node is pruned, i.e., the node is either infeasible, optimal or dominated by the currently known upper bound value, which is followed by a backtracking procedure. Instead, some embodiments are based on a branch-and-bound method that uses a best-first strategy that selects the node with the currently lowest local lower bound. Some embodiments employ a combination of the depth-first and best-first node selection approach, in which the depth-first node selection strategy is used until an integer-feasible control solution is found, followed by using the best-first node selection strategy in the subsequent iterations of the branch-and-bound based optimization algorithm. The latter implementation is motivated by aiming to find an integer-feasible control solution early at the start of the branch-and-bound procedure (depth-first) to allow for early pruning, followed by a more greedy search for better feasible solutions (best-first).

The branch-and-bound method continues iterating until either one or multiple of the following conditions have been satisfied:
1. The maximum execution time for the processor is reached.
2. All the nodes in the branching search tree have been pruned, such that no new node can be selected for solving convex relaxations or branching.
3. The optimality gap between the global lower and upper bound value for the objective of the mixed-integer control solution is smaller than the tolerance.

Figure 4A:
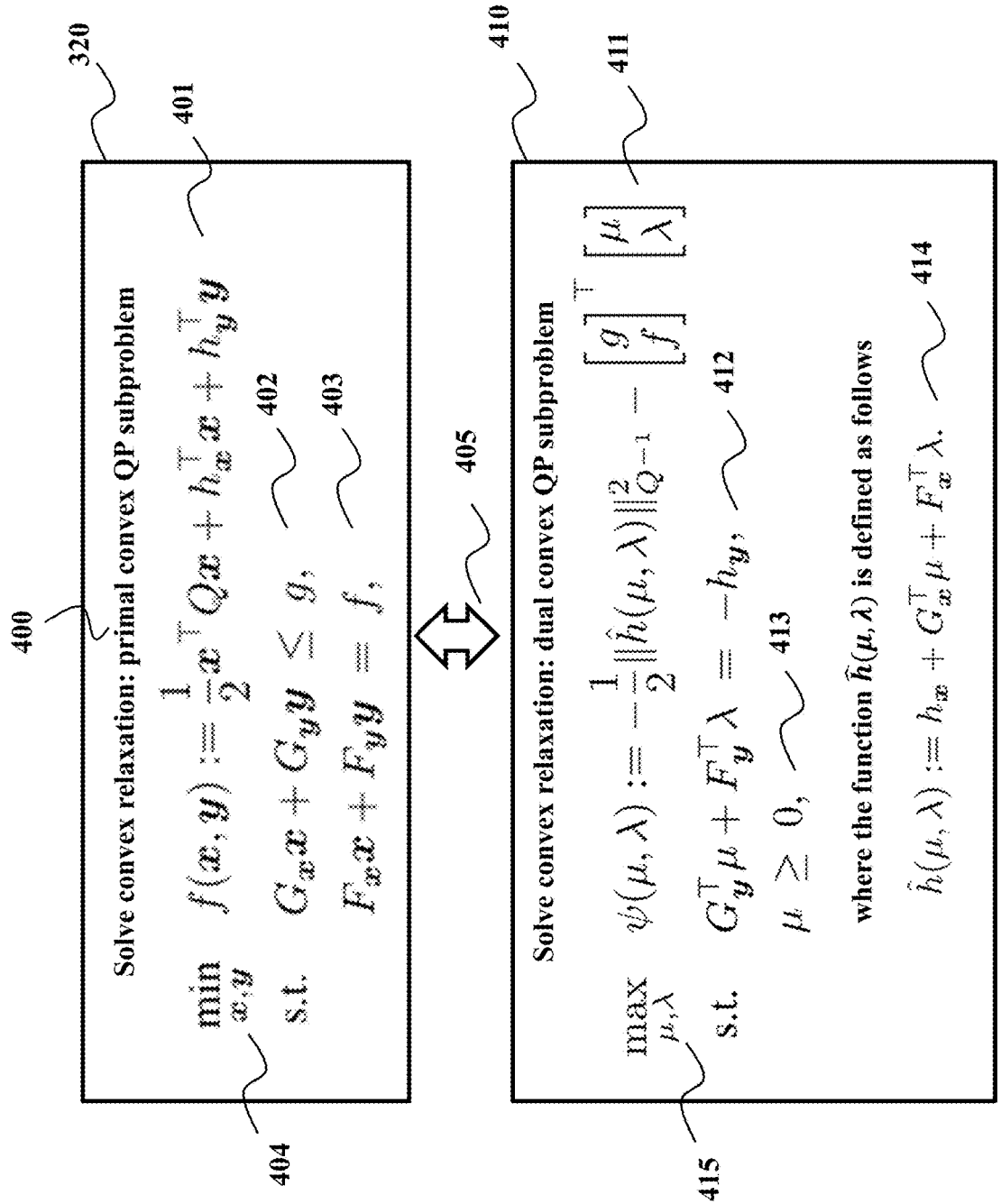
FIG. 4A illustrates the primal and dual formulation of a convex relaxation that is solved as part of the branch-and-bound optimization algorithm in the MI-MPC controller, according to some embodiments.

FIG. 4A illustrates the primal and dual formulation of a convex relaxation that is solved as part of the branch-and-bound optimization algorithm in the MI-MPC controller, according to some embodiments. When solving a constrained mixed-integer quadratic program (MIQP), in some embodiments, the primal formulation for a convex relaxation 320 in the branch-and-bound method corresponds to a convex quadratic program (QP) 400 with a linear-quadratic objective function 401, affine inequality constraints 402 and affine equality constraints 403. Some embodiments of the present disclosure are based on the realization that a partitioning can be performed of the primal optimization variables z=[x,y] between the variables x and y 404 that enter the objective function 401 in a linear-quadratic or purely linear form, respectively. As a result, even though the Hessian matrix $H \geq 0$ of the primal objective function 401 is positive semidefinite, the matrix $Q \in \mathbb{R}^{n_x \times n_x}$ is strictly positive definite and therefore invertible, i.e., $Q > 0$. In general, a change of variables can be used to reformulate any QP into the primal form of FIG. 4A.

Alternatively, in some embodiments, the dual formulation for a convex relaxation 320 is used in the branch-and-bound method which corresponds to a dual convex QP 410 with a linear-quadratic objective function 411, affine equality constraints 412 and positivity inequality constraints 413 for the Lagrange multipliers $\mu \geq 0$. The dual optimization variables $v=[\mu,\lambda]$ 415 include Lagrange multipliers $\mu$ corresponding to the affine inequality constraints 402 and Lagrange multipliers $\lambda$ corresponding to the affine equality constraints 403 in the primal QP formulation 400. An affine function $\hat{h}(\mu,\lambda)$ 414 can be used to define a compact notation for the linear-quadratic dual objective function $\psi(\mu, \lambda)$ 411, which depends on the inverse $Q^{-1}$ of the positive definite matrix $Q > 0$.

Figure 4B:
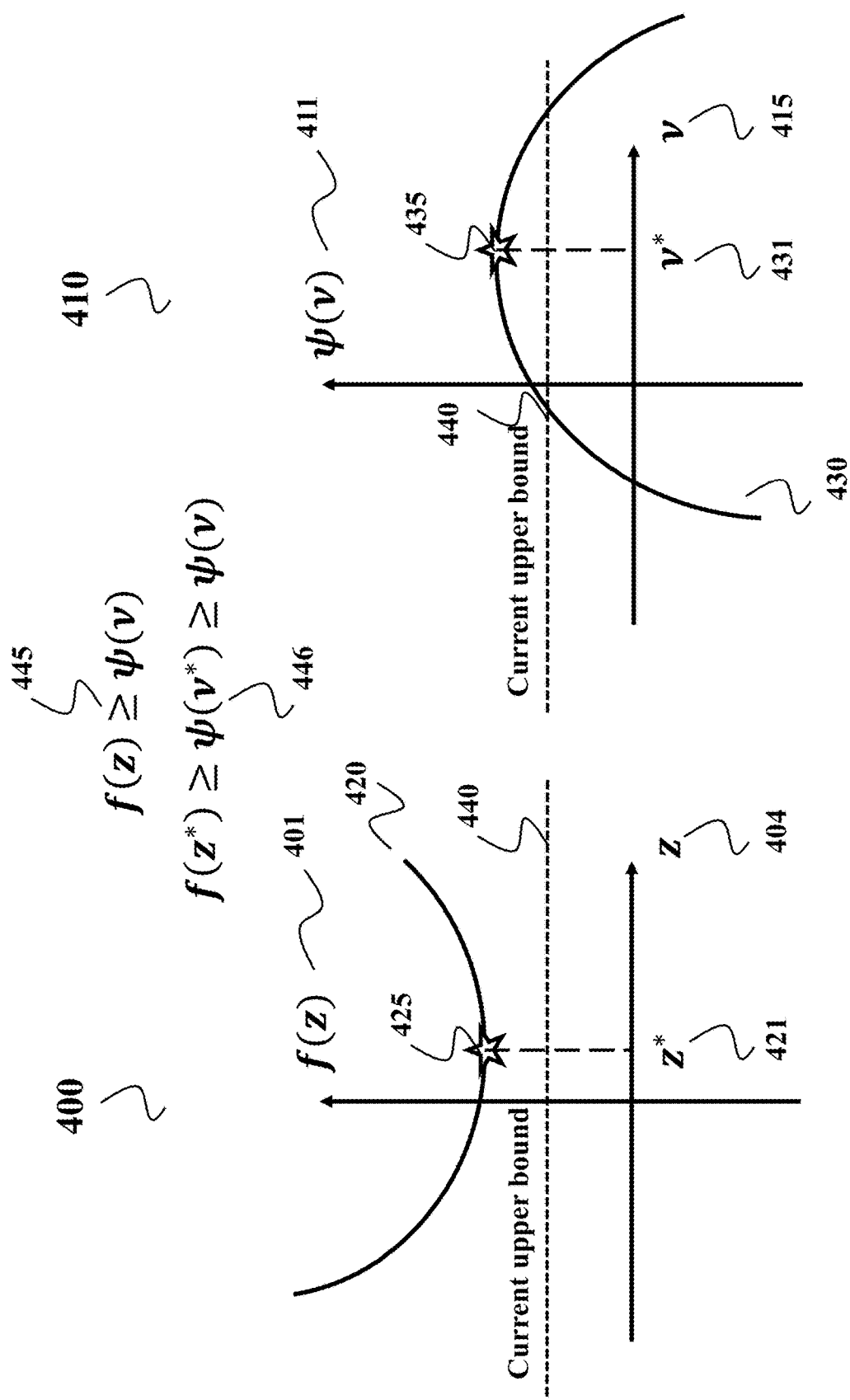
FIG. 4B illustrates a connection between the primal and dual formulation of each convex relaxation within the branch-and-bound optimization algorithm, according to some embodiments.

FIG. 4B illustrates a connection 405 between the primal 400 and dual 410 formulation of each convex relaxation within the branch-and-bound optimization algorithm, according to some embodiments. More specifically FIG. 4B illustrates a relation between the primal objective function $f(z)$ 401 and the dual objective function $\psi(v)$ 411. The dual objective function is always concave 430 such that the dual QP formulation 410 is always convex. When solving a primal QP 400 that is convex, the primal objective is also a convex function 420. Embodiments of the present disclosure are based on the realization that the dual objective value for a dual feasible point is smaller than or equal to the primal objective value for a primal feasible point, i.e., $\psi(\mu,\lambda) \leq f(x,y)$ 445 if the dual optimization variables $v=[\mu,\lambda]$ 415 satisfy the affine equality constraints 412 and positivity inequality constraints 413 in the dual QP 410 and if the primal optimization variables z=[x,y] 404 satisfy the affine inequality constraints 402 and affine equality constraints 403 in the primal QP 400. As a result, the dual objective value for a dual feasible point is smaller than or equal to the dual objective 435 for the optimal values of the dual variables v*431 which is smaller than or equal to the primal objective 425 for the optimal values of the primal optimization variables z*421, i.e., $\psi(v) \leq \psi(v^*) \leq f(z^*)$ 446.

It is typically referred to as weak duality when the optimal dual objective value 435 is smaller than the optimal primal objective value 425, while it is referred to as strong duality when the optimal dual objective value is equal to the optimal primal objective value. In the latter case, the objective value for the optimal solution to the dual QP 410 is equal to the objective value for the optimal solution to the primal QP 400. And it is known that strong duality holds for many convex optimization problems if an additional condition is satisfied, i.e., the Slater condition.

Some embodiments are based on the realization that any dual feasible point $v=[\mu,\lambda]$, i.e., a set of values for the Lagrange multipliers that satisfy the affine equality constraints 412 and positivity inequality constraints 413 in the dual QP 410, can be used to compute a lower bound to the optimal objective value of the primal convex QP 400 since $\psi(v) \leq \psi(v^*) \leq f(z^*)$ 446 in case of weak duality and $\psi(v) \leq \psi(v^*) = f(z^*)$ in case of strong duality.

Some embodiments are based on the realization that the optimal solution to a convex relaxation 320 is not needed within the branch-and-bound optimization algorithm when the corresponding node or partition is pruned 340, i.e., when the convex relaxation is either infeasible or the optimal objective value is larger than the current upper bound (UB) 440. In addition, some embodiments are based on the realization that it can be substantially easier to find a sub-optimal dual solution estimate for which $\psi(v)$>UB, in case the optimal objective value is larger than the current upper bound, rather than finding the optimal solution to either the primal 400 or dual 410 formulation of the convex relaxation. Finally, some embodiments are based on the realization that the dual objective function 411 for the dual QP 410 is unbounded in case the primal QP 400 is infeasible, i.e., the dual objective function 411 is unbounded if there exists no values z=[x,y] that satisfy the affine inequality constraints 402 and affine equality constraints 403 in the primal QP 400.

Figure 4C:
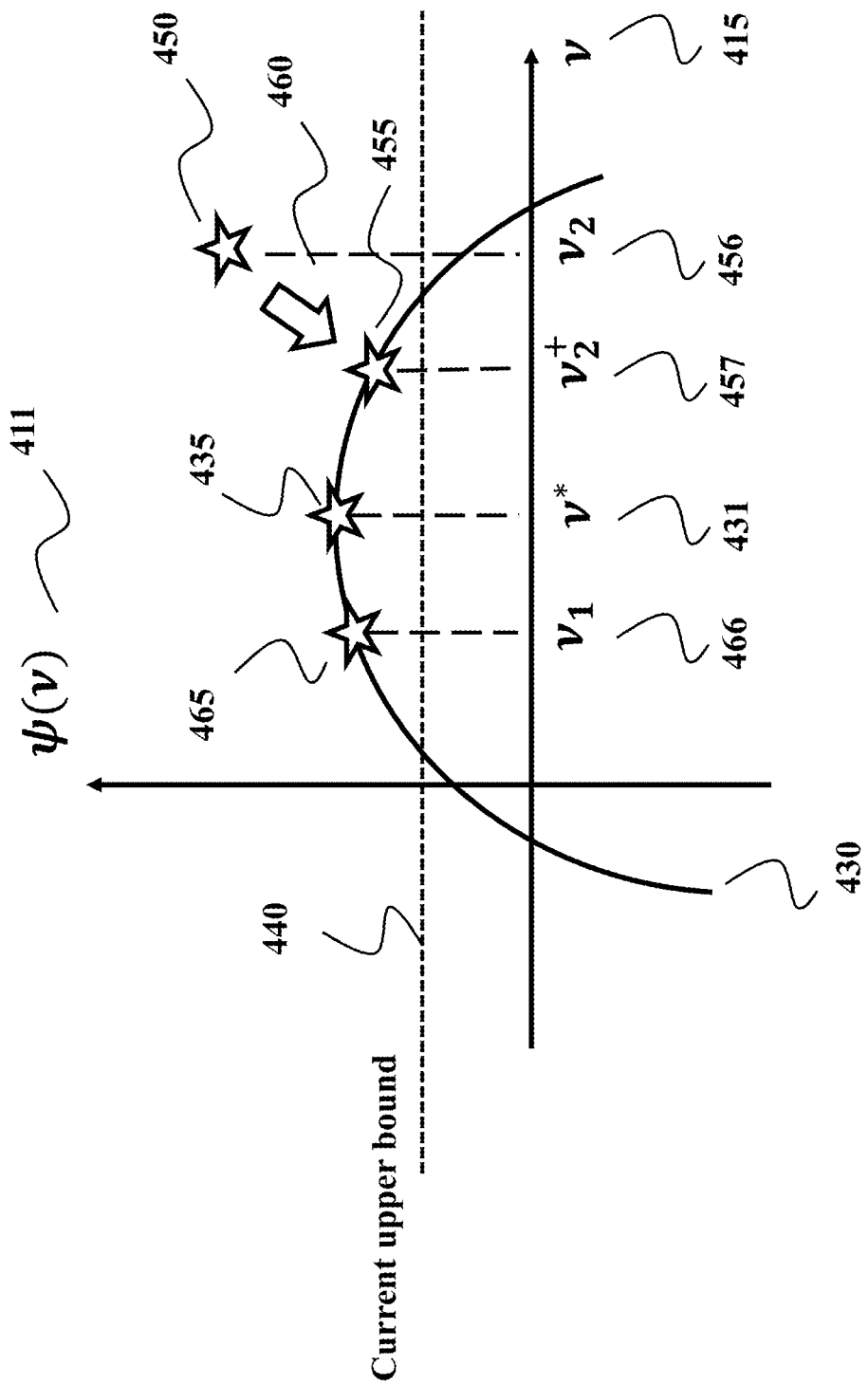
FIG. 4C illustrates the use of a sub-optimal dual solution estimate for an early termination for the solution procedure for a convex relaxation within the branch-and-bound optimization method based on a dual feasible solution estimate or based on a projection onto a dual feasible solution estimate, according to some embodiments.

FIG. 4C illustrates the use of a sub-optimal dual solution estimate for an early termination of the solution procedure for a convex relaxation 320 within the branch-and-bound optimization method based on the sub-optimal dual solution estimate or based on a projection of the sub-optimal dual solution estimate, according to some embodiments. Embodiments of the present disclosure are based on the realization that the sub-optimal dual solution estimate $v_1$ 466 can be used to evaluate the dual objective function 411 such that the QP solution procedure can be terminated early if the corresponding dual objective value 465 satisfies $\psi(v_1)$>UB such that $\psi(v^*)\leq\psi(v_1)$>UB. More specifically, whenever the sub-optimal dual solution estimate is found for which the corresponding dual objective value is larger than the current upper bound value 440, then this implies that also the optimal objective value 435 is larger than the current upper bound 440 such that the corresponding node or partition is pruned 340 within the branch-and-bound optimization algorithm. Otherwise, continue to execute the iterative procedure of the interior point method, from the sub-optimal dual solution estimate, to find the optimal solution to the convex relaxation.

In addition, some embodiments are based on the realization that a dual infeasible solution estimate $v_2$ 456 could instead lead to a dual objective value 450 that does not correspond to a point on the concave function 430, which is defined by the dual objective function 411 for all dual feasible solutions, such that the dual objective value 450 is not necessarily a lower bound for the optimal objective value 435 and therefore the same early termination procedure cannot be applied for such a dual infeasible solution estimate. Instead, some embodiments perform a computationally efficient projection step 460 for a particular dual infeasible solution estimate $v_2$ 456, resulting in a the sub-optimal dual solution estimate $v_2^+$ 457 that can be used to evaluate the dual objective function 411 such that the QP solution procedure can be terminated early if the corresponding dual objective value 455 satisfies $\psi(v_2^+)$>UB such that $\psi(v^*)\geq\psi(v_2^+)$>UB.

Figure 5A:
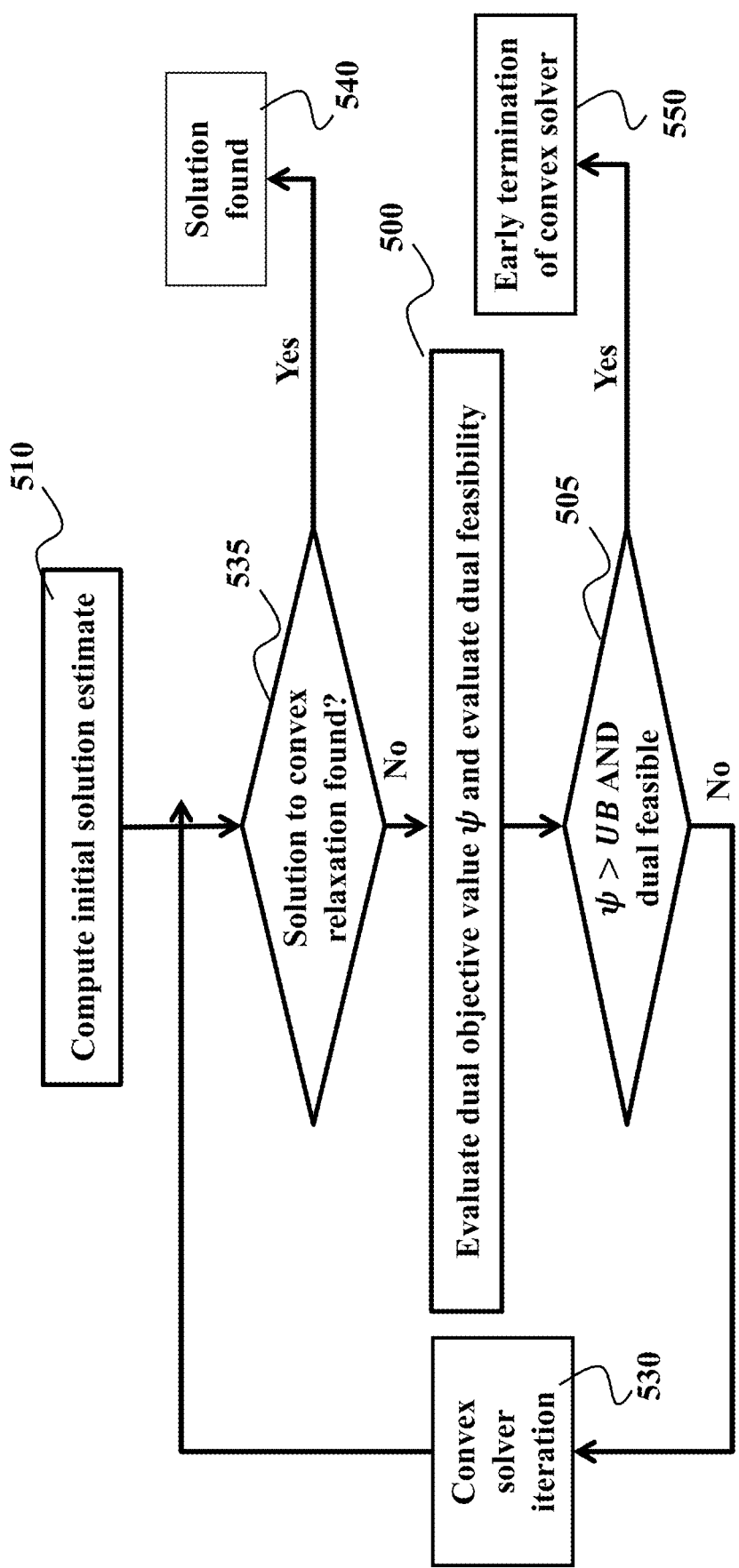
FIG. 5A illustrates a block diagram of an early termination procedure for the solution of a convex relaxation within the branch-and-bound optimization method based on the dual objective value for a dual feasible solution estimate, according to some embodiments.

FIG. 5A illustrates a block diagram of an early termination procedure for the solution of a convex relaxation 320 within the branch-and-bound optimization method based on the dual objective value for a dual feasible solution estimate, according to some embodiments. The block diagram considers any convex optimization algorithm to solve a convex relaxation 320 within the branch-and-bound method, based on an initial solution estimate 510 and by performing one or multiple convex solver iterations 530. After one or multiple convex solver iterations 530, a condition can be verified to know whether a particular solution estimate forms a solution to the convex relaxation 535, in which case the solution to the convex relaxation has been found 540. Otherwise, if the convex solver termination condition 535 is not yet satisfied, another set of convex solver iterations 530 can be performed until the solution is found 540, the convex relaxation is detected to have no feasible solution or until a maximum computation time has been reached.

In case the optimal solution to the convex relaxation has not yet been found 535, some embodiments evaluate the dual objective function 411 and the dual feasibility constraints 500, including the affine equality constraints 412 and positivity inequality constraints 413 in the dual QP 410. If the dual objective value is larger than the current upper bound 440 and if the solution estimate is dual feasible 505, then the solution of the convex relaxation can be terminated early 550, i.e., the optimal solution to the convex relaxation does not need to be computed since the corresponding node or partition is pruned 340 within the branch-and-bound optimization algorithm. If the dual objective value is not larger than the current upper bound 440 or the solution estimate is not yet dual feasible 505, then another set of convex solver iterations 530 can be performed until the solution is found 540, the convex relaxation is detected to have no feasible solution, a maximum computation time has been reached or until a dual feasible solution estimate is computed for which the dual objective value is larger than the current upper bound 505 resulting in early termination of the convex solver 550.

Figure 5B:
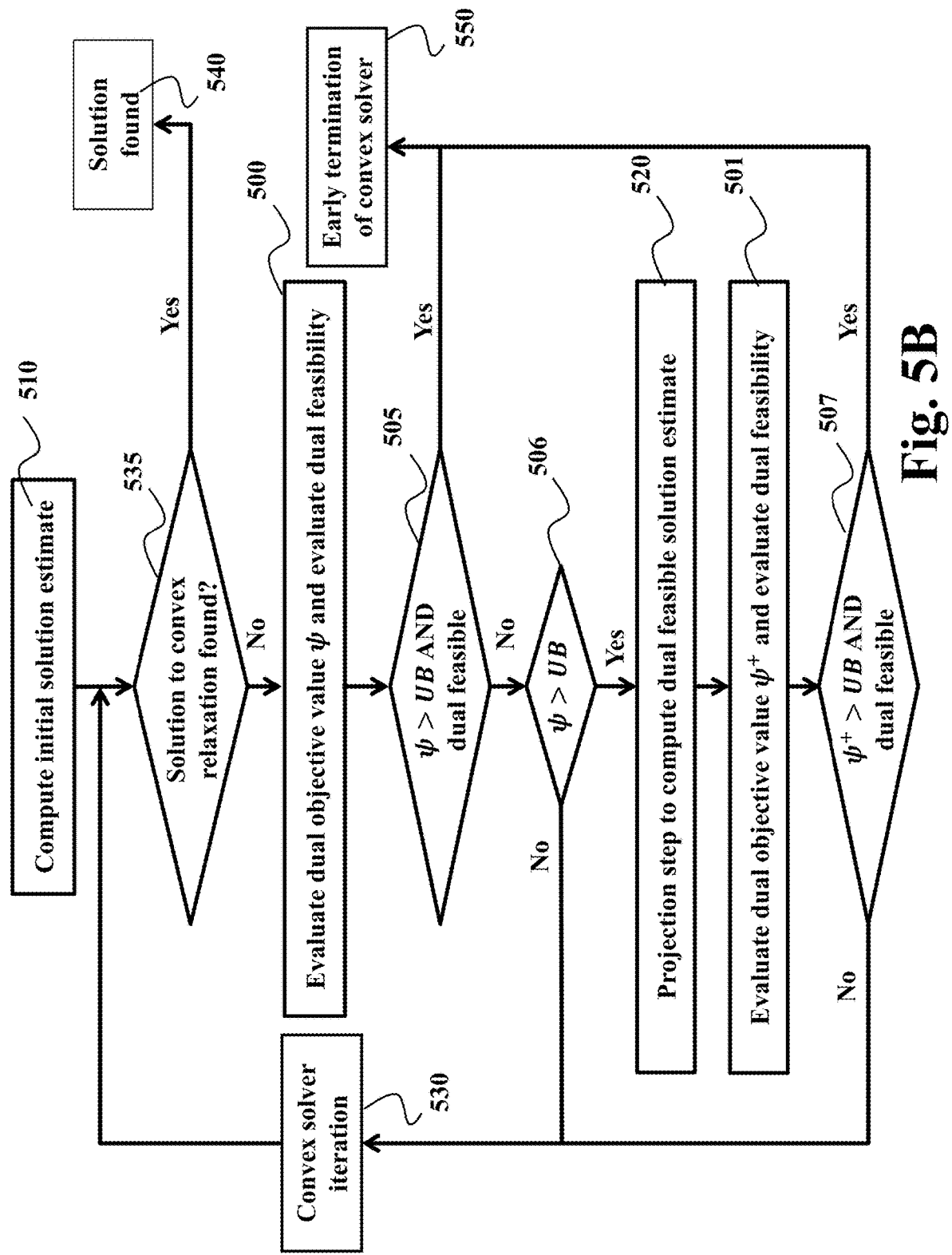
FIG. 5B illustrates a block diagram of an early termination procedure for the solution of a convex relaxation within the branch-and-bound optimization method based on a projection step to compute a dual feasible solution estimate, according to some embodiments.

FIG. 5B illustrates a block diagram of an early termination procedure for the solution of a convex relaxation within the branch-and-bound optimization method based on a projection step to compute a dual feasible solution estimate, according to some embodiments. In case the optimal solution to the convex relaxation has not yet been found 535, some embodiments evaluate the dual objective function and the dual feasibility constraints 500. If the dual objective value is larger than the current upper bound 440 and if the solution estimate is dual feasible 505, then the solution of the convex relaxation can be terminated early 550, i.e., the optimal solution to the convex relaxation does not need to be computed since the corresponding node or partition is pruned 340. If the latter condition 505 is not yet satisfied, then the procedure checks whether the dual objective value $\psi$ is larger than the current upper bound 506, in which case a projection step 520 can be used to compute a dual feasible solution estimate, otherwise, another set of convex solver iterations 530 is performed.

Based on a projection 520 onto a dual feasible solution estimate, some embodiments evaluate the dual objective function and the dual feasibility constraints 501 for the projected dual feasible solution estimate. If the new dual objective value $\psi^+$ is larger than the current upper bound and the solution estimate is dual feasible 507, then the solution of the convex relaxation can be terminated early 550, otherwise, another set of convex solver iterations 530 can be performed until the solution is found 540, the convex relaxation is detected to have no feasible solution, a maximum computation time has been reached or until a dual feasible solution estimate is computed for which the dual objective value is larger than the current upper bound resulting in early termination of the convex solver 550. Thus, the early termination of the convex solver 550 increases efficiency of a processor that is configured to determine the optimal solution with low cost (time and memory space) and high accuracy by use of the branch and bound optimization.

Some embodiments are based on the realization that an evaluation of the dual objective function and dual feasibility 500 is often computationally cheaper than a projection step 520 to compute a dual feasible solution estimate, such that the projection step 520 is performed only if the dual objective value $\psi$ for the current solution estimate is larger than the current upper bound 506. In addition, some embodiments are based on the realization that the dual objective value $\psi^+$ for the solution estimate after the projection step 520 is likely to be larger than the current upper bound 507 if the dual objective value $\psi$ for the solution estimate before the projection step is larger than the upper bound 506.

FIG. 6A illustrates a block-sparse interior point optimization algorithm to solve the constrained optimal control structured quadratic program (OCP-QP) by iteratively solving a relaxed system of necessary optimality conditions, according to some embodiments. Further, FIG. 6A illustrates an approach of an interior point optimization algorithm to solve the convex relaxation 320 within the branch-and-bound method, in some embodiments, by iteratively solving a smoothened system of necessary optimality conditions using a Newton-type solution strategy for a converging sequence of barrier relaxation parameter values 600. In some embodiments, within the branch-and-bound optimization algorithm to solve the optimal control structured mixed-integer quadratic program (MIQP) 250, each convex relaxation 320 is a constrained optimal control structured quadratic programming problem (OCP-QP) 610. The OCP-QP optimization problem includes an initial state value condition 612, a dynamical model of the system that results in linear equality constraints 613, linear inequality constraints 614 and a linear-quadratic objective function 611, such that a constrained OCP-QP 610 needs to be solved at each convex relaxation 320. The necessary optimality conditions 600, sometimes referred to as the Karush-Kuhn-Tucker (KKT) conditions, can include one or multiple stationarity conditions 601, one or multiple conditions of primal feasibility with respect to the equality constraints 602, one or multiple conditions of primal feasibility with respect to the inequality constraints 603, one or multiple dual feasibility conditions 605 and one or multiple complementarity conditions 604.

Some embodiments are based on the realization that the relaxed, smoothened system of necessary optimality conditions 600 for the constrained optimal control structured quadratic programming problem (OCP-QP) 610 is defined by block-structured sparse OCP-QP data 245, consisting of OCP-QP vectors 247 and OCP-QP matrices 246 in the form of block-structured sparse Hessian and constrain Jacobian matrices 615. In some embodiments, the interior point optimization algorithm uses block-sparse structure exploiting linear algebra operations to reduce the computational complexity of implementing a Newton-type method for solving the sequence of smoothened systems of necessary optimality conditions 600.

In FIG. 6A, the optimization variables $z=[x_0, u_0, x_1, u_1, \ldots, x_{N-1}, u_{N-1}, x_N]$ include both the state and control input variables of the constrained optimal control structured quadratic programming problem (OCP-QP) 610. The dual variables $\lambda=[\lambda_0, \lambda_1, \ldots, \lambda_N]$ denote the Lagrange multipliers with respect to the equality constraints at each time step k over the control horizon, e.g., the initial state value condition 612 and the equality constraints that impose the system dynamics 613. The dual variables $\mu=[\mu_0, \mu_1, \ldots, \mu_N]$ denote the Lagrange multipliers with respect to the inequality constraints at each time step k over the control horizon, e.g., the linear inequality constraints 614, and $s=[s_0, s_1, \ldots, s_N]$ denote the slack variables corresponding to the inequality constraints. The matrices M and S are diagonal matrices defined, respectively, by the dual variables $\mu$ and the slack variables s on the diagonal, and the variable $\tau$ denotes the parameter value for the barrier-type relaxation of the system of necessary optimality conditions.

Some embodiments use a relaxation for the system of necessary optimality conditions that is different from using a logarithmic barrier function, resulting in one or multiple smoothened sets of nonlinear equations that can be solved by the Newton-type method in embodiments of the present disclosure. Some embodiments are based on the realization that a solution to the constrained optimal control structured quadratic program (OCP-QP) 610 needs to be a solution to the smoothened system of necessary optimality conditions 600 as the barrier parameter value in the complementarity conditions 604 approaches zero, i.e., for increasingly small barrier parameter value $\tau>0$ and $\Sigma\to 0$.

Figure 6B:
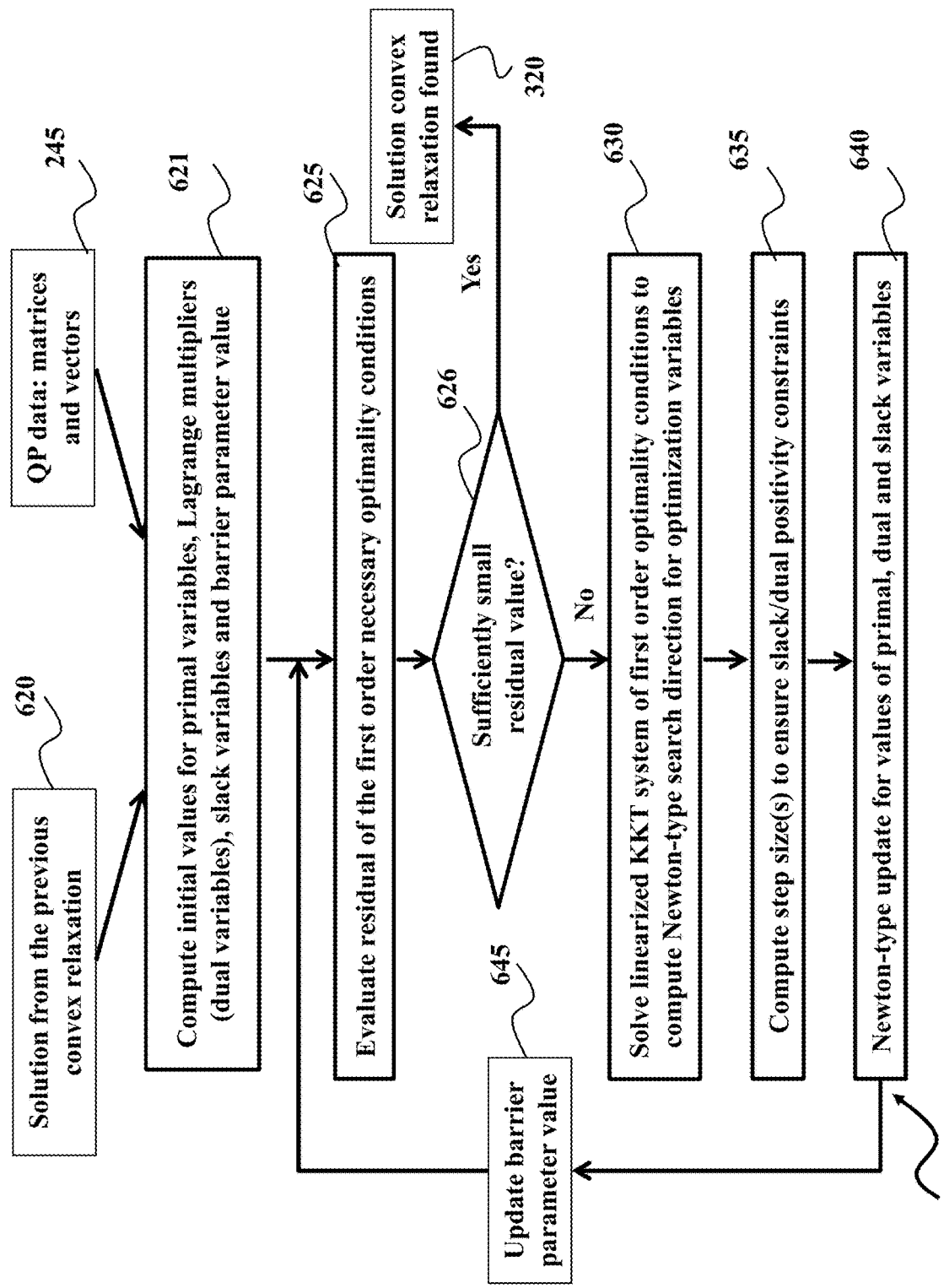
FIG. 6B illustrates a block diagram of the initialization step and the iterative procedure of an interior point optimization algorithm to solve constrained optimal control problems in an implementation of the predictive control system, according to some embodiments.

FIG. 6B illustrates a block diagram of the initialization step and the iterative procedure of an interior point optimization algorithm to solve constrained optimal control problems in an implementation of the predictive control system 600, according to some embodiments. The initialization step can use the optimal or approximate solution from the previous convex relaxation 620 and/or the OCP-QP data 245 to compute initial values for the primal optimization variables, the Lagrange multipliers (dual variables) with respect to equality and inequality constraints, the slack variables for the inequality constraints and an initial barrier parameter value 621.

Based on the initialization of the values for the optimization variables 621, an iterative procedure of the interior point optimization algorithm aims to make the residual value of the first order necessary optimality conditions sufficiently small 626, in which case the (approximately) optimal solution to the convex relaxation is found 320. The iterative procedure starts by evaluating the residual vector of the first order necessary optimality conditions 625, and it then checks whether a norm of the residual vector is sufficiently small with respect to a tolerance value 626. The (approximately) optimal solution to the convex relaxation is found 320 and the iterative procedure terminates if the residual value is sufficiently small but the iterative procedure continues if a norm of the residual vector is too large and the number of iterations of the interior point optimization algorithm has not yet reached a maximum value.

The iterative procedure of the interior point optimization algorithm 600 continues by solving a linearized system of Karush-Kuhn-Tucker (KKT) conditions, further referred to as a linearized KKT system, for the set of first order optimality conditions to compute a Newton-type search direction 630 for the optimal values of the optimization variables in the constrained convex relaxation for an implementation of the predictive control system. Next, the iterative procedure computes a step size in the Newton-type search direction that ensures the positivity of the slack variables and of the Lagrange multipliers (dual variables) with respect to the inequality constraints 635. In some embodiments, the step size is computed as the largest positive value that is smaller than one in the Newton-type search direction that ensures the positivity of the slack variables and of the Lagrange multipliers with respect to the inequality constraints 635.

Based on the Newton-type search direction 630 and the computed step size 635, the iterative procedure of the interior point optimization algorithm continues by updating the values for the primal optimization variables, for the Lagrange multipliers (dual variables) and for the slack variables 640. Given the new solution estimate for the optimization variables, an update to the barrier parameter value 645 can be computed such that the new residual vector of the first order necessary optimality conditions 625 can be evaluated. The iterative procedure of the interior point optimization algorithm continues until the residual value is sufficiently small 626, and the optimal solution to the convex relaxation is found 320, until a maximum number of interior point iterations has been reached, or until the interior point optimization algorithm can be terminated early according to some embodiments of the present disclosure.

Figure 6C:
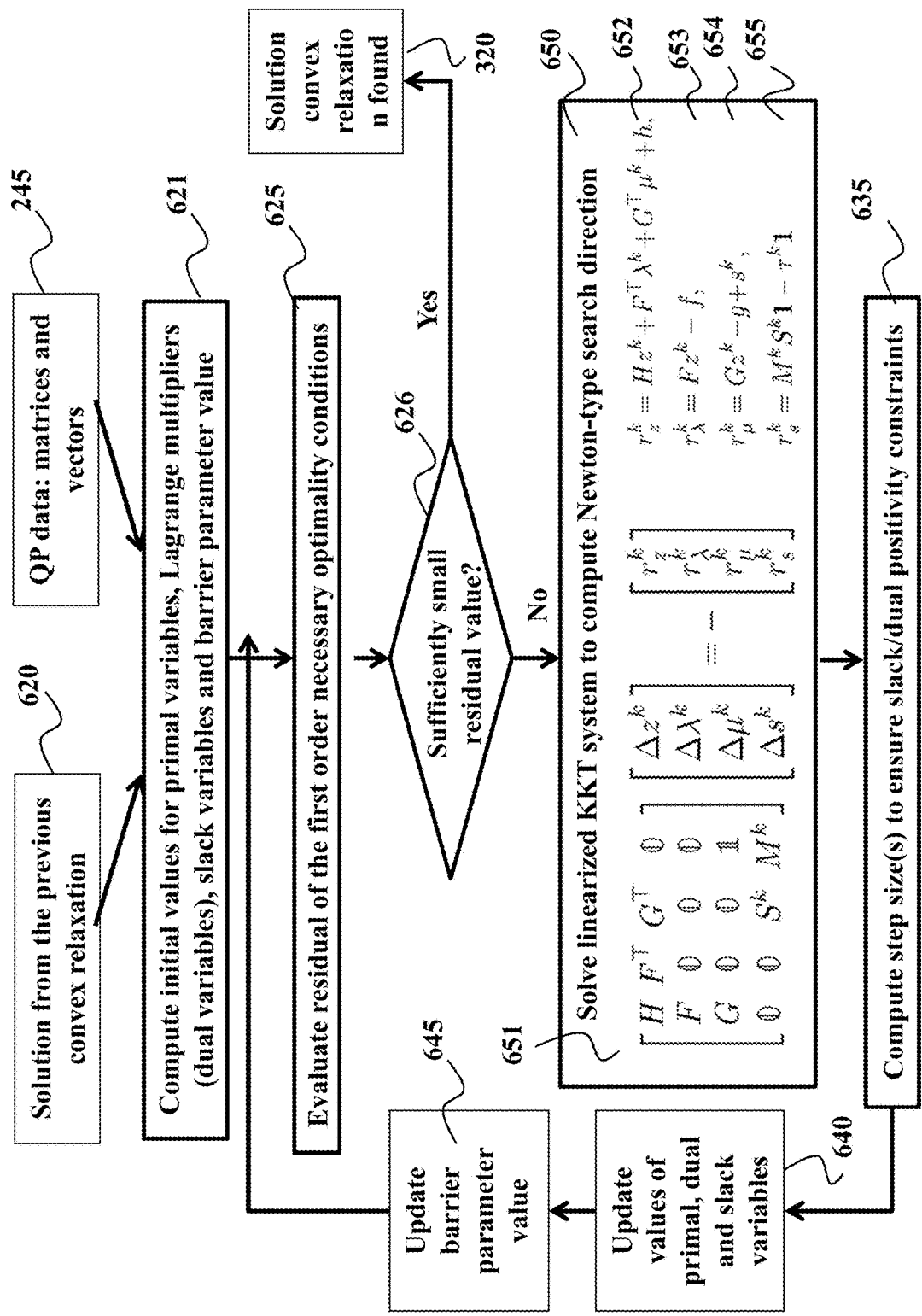
FIG. 6C illustrates a block diagram of the linearized KKT system to compute a Newton-type search direction in the iterative procedure of the interior point optimization algorithm to solve constrained OCP-QPs, according to some embodiments.

FIG. 6C illustrates a block diagram of the linearized KKT system to compute a Newton-type search direction 650 in the iterative procedure of the interior point optimization algorithm to solve constrained OCP-QPs within a branch-and-bound optimization algorithm for predictive control, according to some embodiments. The linearized system of KKT conditions can be represented as a block-structured linear system of equations 651 that defines the Newton-type search direction for the primal optimization variables $\Delta z^k$, the Lagrange multipliers (dual variables) with respect to the equality constraints $\Delta \lambda^k$, the Lagrange multipliers (dual variables) with respect to the inequality constraints $\Delta \mu^k$ and the Newton-type search direction for the slack variables $\Delta s^k$ in the $k^{th}$ iteration of the interior point optimization algorithm. The right-hand side vector of the linear KKT system 651 consists of the evaluation of the stationarity conditions 652, the evaluation of the primal feasibility with respect to the equality constraints 653, the evaluation of the primal feasibility with respect to the inequality constraints 654 and the evaluation of the relaxed complementarity conditions 655 in the $k^{th}$ iteration of the interior point optimization algorithm.

Embodiments of the present disclosure are based on the realization that the relaxed complementarity conditions 655, for a nonzero barrier parameter value $\tau^k > 0$, correspond more closely to the exact complementarity conditions for increasingly small values of the barrier parameter $\tau^k \to 0$ for successive iterations of the interior point optimization algorithm.

Figure 6D:
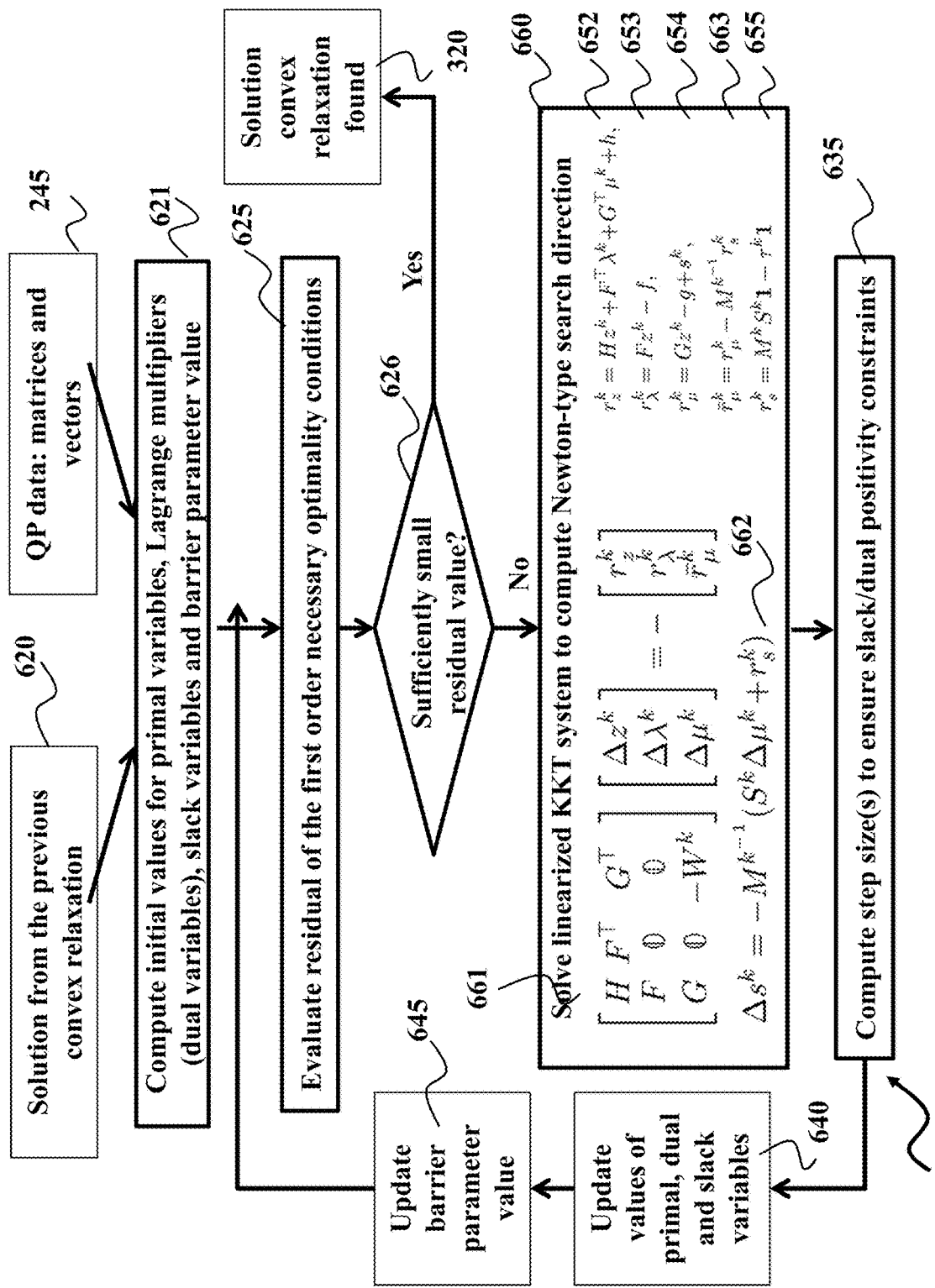
FIG. 6D illustrates a block diagram of a decomposition of the linearized KKT system into a sequence of two subsystems in the interior point optimization algorithm to solve constrained OCP-QPs, according to some embodiments.

FIG. 6D illustrates a block diagram of a decomposition of the linearized KKT system into a sequence of two subsystems in the interior point optimization algorithm to solve constrained OCP-QPs, according to some embodiments. Some embodiments are based on the realization that the linearized KKT system can be decomposed into one symmetric linear subsystem 661 to compute the Newton-type search direction for the primal optimization variables $\Delta z^k$, the Lagrange multipliers (dual variables) with respect to the equality constraints $\Delta \lambda^k$ and the Newton-type search direction for the Lagrange multipliers (dual variables) with respect to the inequality constraints $\Delta \mu^k$. Solving the latter symmetric linear subsystem 661 can then be followed by solving a diagonal linear system 662 to compute the Newton-type search direction for the slack variables $\Delta s^k$ in the $k^{th}$ iteration of the interior point optimization algorithm.

The right-hand side vector of the first symmetric linear KKT system 661 consists of the evaluation of the stationarity conditions 652, the evaluation of the primal feasibility with respect to the equality constraints 653 and a modified variant 663 of the evaluation of the primal feasibility with respect to the inequality constraints 654 due to the Newton-type search direction for the slack variables $\Delta s^k$. Similarly, the right-hand side vector of the diagonal linear system 662 consists of the evaluation of the relaxed complementarity conditions 655 in addition to a contribution that is due to the Newton-type search direction for the Lagrange multipliers (dual variables) with respect to the inequality constraints $\Delta \mu^k$.

Some embodiments are based on the realization that the first symmetric linear KKT system 661 can be solved either based on iterative linear algebra routines or using a direct factorization or decomposition of the symmetric, sparse and block-structured KKT matrix on the left-hand side of the system. In addition, some embodiments are based on the realization that each of the equations in the diagonal linear system 662 can be solved independently based on a single scalar division, due to the diagonal sparsity structure of the matrix $M^k$ that is defined by the Lagrange multipliers (dual variables) with respect to the inequality constraints $\mu^k$ on the diagonal for the $k^{th}$ iteration of the interior point optimization algorithm.

Figure 7A:
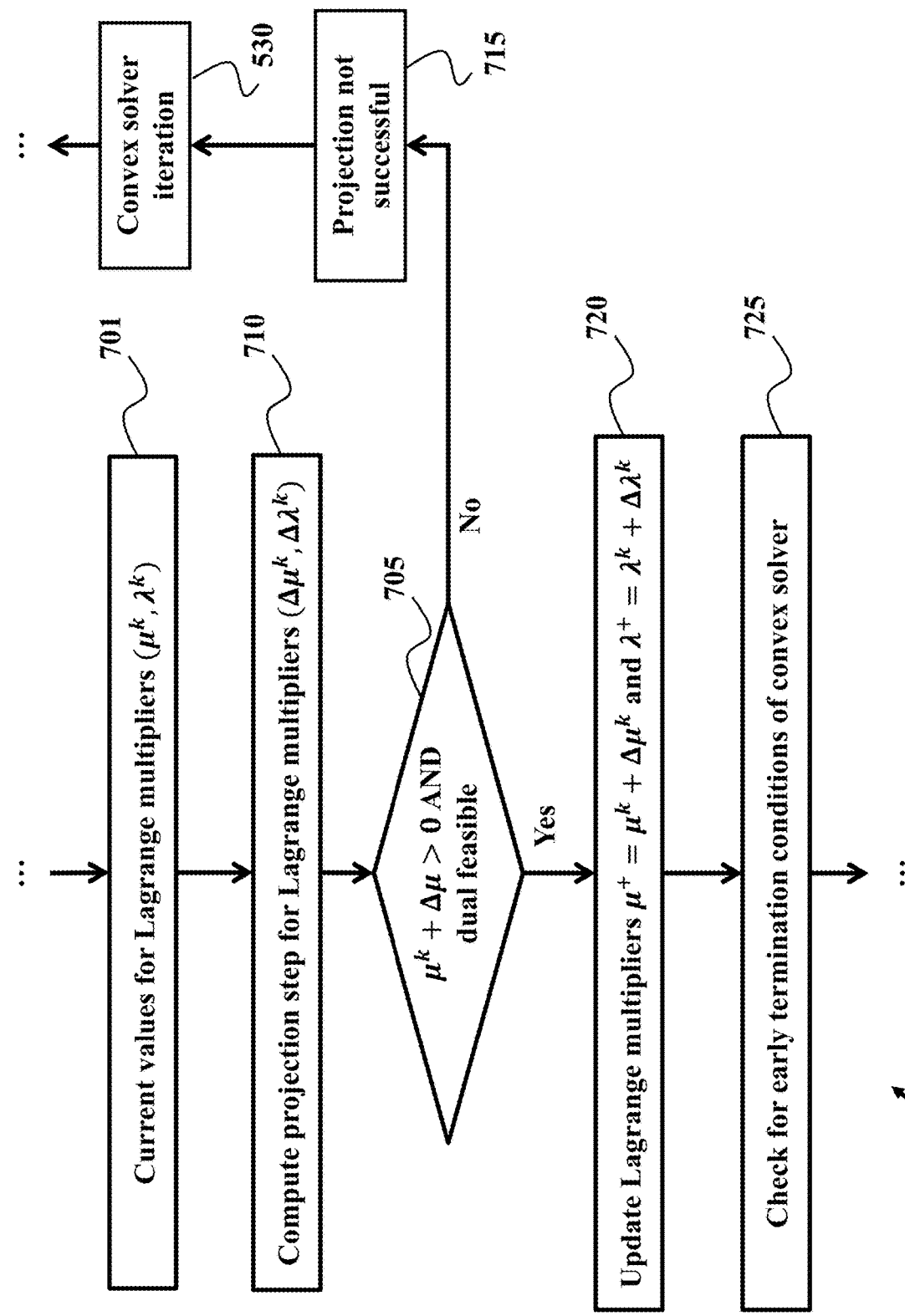
FIG. 7A illustrates a block diagram of a procedure for a projection step to compute a dual feasible solution estimate that can be used for early termination of the convex solver within the branch-and-bound optimization algorithm, according to some embodiments.

FIG. 7A illustrates a block diagram of a procedure for a projection step to compute the sub-optimal dual solution estimate 520 that can be used for early termination of the convex solver within the branch-and-bound optimization algorithm, according to some embodiments. The sub-optimal dual solution estimate 520 is computed for a given current set of values for the Lagrange multipliers $(\mu^k, \lambda^k)$ 701 that is nearly dual feasible or dual infeasible. First, an update to the Lagrange multiplier values $(\Delta \mu^k, \Delta \lambda^k)$ 710 is computed. Then, the procedure verifies whether the dual feasibility constraints are satisfied for the updated values $(\mu^k + \Delta \mu^k, \lambda^k + \Delta \lambda^k)$ 705, i.e., whether the solution estimate satisfies the affine equality constraints 412 and positivity inequality constraints 413 in the dual QP formulation 410 of the convex relaxation 320. If the updated solution estimate, after the projection step, is still not dual feasible 705, then the projection step was not successful 715 and the procedure continues by performing one or multiple convex solver iterations 530 until the optimal solution is found 540, the convex relaxation is detected to have no feasible solution or until a maximum computation time has been reached.

If the values after the projection are dual feasible 705, then the current values for the Lagrange multipliers are updated 720 and the procedure checks whether these updated values can be used for early termination of the convex solver within the branch-and-bound optimization algorithm 725. Embodiments of the present disclosure are based on the realization that the updated values for the Lagrange multipliers 720 can be used for early termination of the convex solver 550, if the updated solution estimate after the projection step is dual feasible and the dual objective is larger than the current upper bound 507.

Figure 7B:
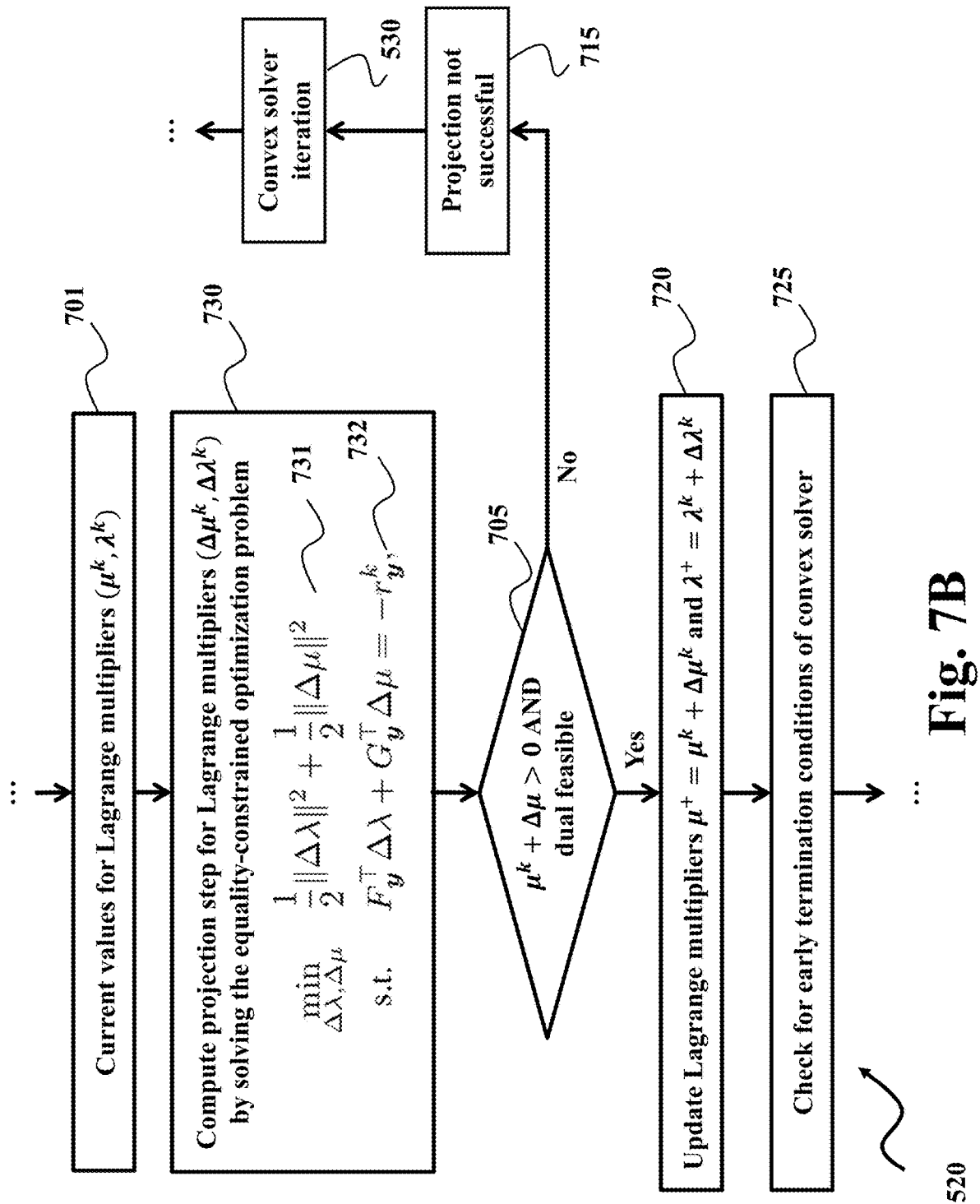
FIG. 7B illustrates a block diagram of a procedure for a projection step to compute a dual feasible solution estimate by solving an equality-constrained optimization problem to enforce the affine equality constraints in the dual QP formulation of the convex relaxation, according to some embodiments.

FIG. 7B illustrates a block diagram of a procedure for a projection step to compute the sub-optimal dual solution estimate 520, by solving an equality constrained linear-quadratic optimization problem to enforce the affine equality constraints 412 in the dual QP formulation 410 of the convex relaxation 320, according to some embodiments. Some embodiments are based on the realization that a projection step for the Lagrange multipliers $(\Delta \mu^k, \Delta \lambda^k)$ 710 can be computed by solving an equality-constrained quadratic program (QP) optimization problem 730, in which the quadratic objective minimizes the size of the update $(\Delta \mu^k, \Delta \lambda^k)$ 731 and the equality constraints 732 enforce the affine constraints 412 in the dual QP 410. To that end, the projection step computes an update to the sub-optimal dual solution estimate 520 by solving an equality-constrained optimization problem that enforces the dual feasibility constraints and minimizes a norm of the update for Lagrange multiplier variables.

Some embodiments are based on the realization that the equality-constrained QP for the projection step 730 can be solved efficiently by solving a block-structured linear system, using structure-exploiting direct or iterative linear algebra routines, for which the computational cost is considerably less than the computational cost for the solution of the convex relaxation 320. However, the projection step ($\Delta\mu^k$, $\Delta\lambda^k$) based on the equality-constrained QP 730 does not directly enforce the positivity inequality constraints 413 in the dual QP 410, such that the updated values of the Lagrange multipliers may not always be dual feasible 705 and the projection step may not always be successful 715. In some embodiments, the projection step 730 computes an update to the sub-optimal dual solution estimate by solving a block-structured linear system, the solution of which forms an optimal solution to the equality-constrained optimization problem.

In some embodiments of the present disclosure, the projection step 710 is computed by performing one or multiple iterations of the procedure that solves the equality-constrained QP 730 until either a dual feasible solution estimate 520 is computed, which can be used for early termination of the convex solver 725, or until a maximum computation time has been reached such that the procedure continues by performing one or multiple convex solver iterations 530. Embodiments of the present disclosure are based on the realization that the matrix factorization can be reused in subsequent solutions of the equality-constrained QP 730 in order to reduce the computational cost of the projection step to compute a dual feasible solution estimate for early termination of the convex solver.

Figure 7C:
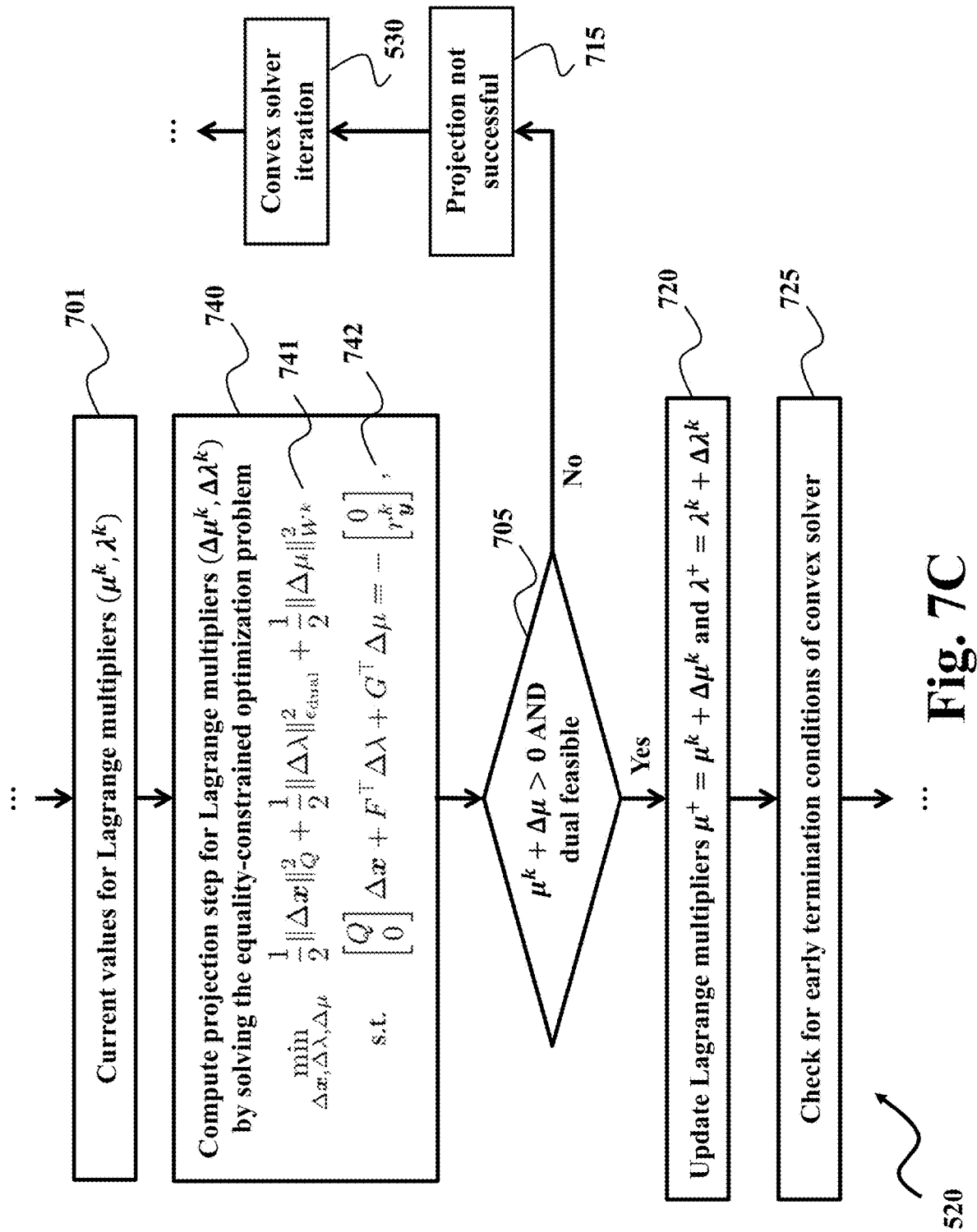
FIG. 7C illustrates a block diagram of a procedure for a projection step to compute a dual feasible solution estimate 520, by solving an equality constrained linear-quadratic optimization problem with an alternative scaling of the optimization variables in the objective of the equality-constrained QP to effectively enforce positivity of the updated Lagrange multiplier values, according to some embodiments.

FIG. 7C illustrates a block diagram of a procedure for a projection step to compute a dual feasible solution estimate 520, by solving an equality constrained linear-quadratic optimization problem with an alternative scaling of the optimization variables in the objective of the equality-constrained QP to effectively enforce positivity of the updated Lagrange multiplier values, according to some embodiments. Further, the equality constrained linear-quadratic optimization problem is solved with an alternative scaling of the optimization variables in the objective to effectively enforce the affine equality constraints 412 while trying to enforce the positivity inequality constraints 413 in the dual QP formulation 410 of the convex relaxation 320. Some embodiments are based on the realization that a projection step for the Lagrange multipliers ($\Delta\mu^k$, $\Delta\lambda^k$) 710 can be computed by solving an equality-constrained quadratic program (QP) optimization problem 740, including an update to the primal variables $\Delta x^k$ and the dual variables $\Delta\mu^k$, $\Delta\lambda^k$ as optimization variables in the equality-constrained QP 740.

The projection step in FIG. 7C further enforces one or multiple additional optimality conditions; and minimizes a weighted norm of the update for the primal optimization variables and for the Lagrange multiplier variables, based on a positive definite weighting matrix in an objective function. The positive definite weighting matrix in the objective of the projection step corresponds to a Hessian matrix as a weighting for the update to the primal optimization variables, a diagonal matrix of small positive weighting values for the update to the Lagrange multipliers corresponding to the equality constraints in the convex relaxation, and a positive weighting value that corresponds to the ratio between the slack variable and the Lagrange multiplier value corresponding to each inequality constraint after one or multiple iterations of a convex solution procedure.

The quadratic objective minimizes the size of the update ($\Delta x^k$, $\Delta\mu^k$, $\Delta\lambda^k$) 741, using the positive definite Hessian matrix $Q \succ 0$ from the primal QP formulation 400 of the convex relaxation, i.e., $$\frac{1}{2}\|\Delta x\|_Q^2 = \frac{1}{2}\Delta x^T Q \Delta x.$$

The update step size for the Lagrange multipliers corresponding to the equality constraints is minimized using a small positive value $\epsilon_{dual}>0$ resulting in the objective term $$\frac{1}{2}\|\Delta\lambda\|_{\epsilon_{dual}}^2 = \frac{1}{2}\epsilon_{dual}\Delta\lambda^T\Delta\lambda.$$

The update step size for the Lagrange multipliers corresponding to the inequality constraints is minimized using a positive definite weighting matrix $W^k \succ 0$ resulting in the objective term $$\frac{1}{2}\|\Delta\mu\|_{W^k}^2 = \frac{1}{2}\Delta\mu^T W^k \Delta\mu.$$

Finally, the equality constraints 742 enforce the affine constraints 412 in the dual QP 410 and additional constraints that aim to enforce that the updated solution estimate remains close to satisfying the necessary optimality conditions, i.e., the Karush-Kuhn-Tucker (KKT) conditions corresponding to the convex relaxation.

Some embodiments use an interior point optimization algorithm 600 to solve each convex relaxation within the branch-and-bound optimization algorithm such that the positive definite weighting matrix $W^k \succ 0$, in the quadratic objective 741 of the equality-constrained QP for the projection step 740, can be computed as a diagonal matrix with a diagonal element for each inequality constraint corresponding to the ratio $$w_i^k = \frac{s_i^k}{\mu_i^k} >$$

0 between the value for the slack variable $s_i^k>0$ and the value for the Lagrange multiplier $\mu_i^k>0$, at the $k^{th}$ iteration of the interior point optimization method (IPM) 600 to solve the constrained convex relaxation problem.

Some embodiments are based on the realization that an inequality constraint is considered "active" at the optimal solution of the convex relaxation if the inequality constraint holds with equality sign for the optimal values of the optimization variables. An inequality constraint is considered "inactive" at the optimal solution of the convex relaxation if the inequality constraint holds with an inequality sign for the optimal values of the optimization variables.

Some embodiments are based on the realization that the w-value grows larger and larger until infinity, i.e., $w_i \to \infty$, for an inequality constraint that is inactive at the optimal solution because the slack variable $s_i>0$ is nonzero and the corresponding Lagrange multiplier value remains positive but becomes smaller and smaller towards zero, i.e., $\mu_i \to 0$, in a sequence of subsequent iterations of the interior point optimization algorithm. For an inequality constraint that is inactive at the optimal solution, the value for $$w_i^k = \frac{s_i^k}{\mu_i^k} > 0$$

on the diagonal of the weighting matrix $W^k \succ 0$ in the objective term $$\frac{1}{2}\|\Delta\mu\|^2_{W^k} = \frac{1}{2}\Delta\mu^T W^k \Delta\mu \quad 741$$

becomes increasingly large for subsequent iterations of the interior point solution procedure such that the corresponding update $\Delta\mu_i^k$ from the projection step 740 is likely to be small and the positivity constraint $\mu_i^k + \Delta\mu_i^k > 0$ is likely to be satisfied 705, even though the current value for the Lagrange multiplier $\mu_i^k > 0$ 701 may be relatively close to zero. If the projection 740 is successful such that the updated values for the Lagrange multipliers are positive and the dual feasibility constraints are satisfied 705, then this solution estimate can be used to check for early termination of the convex solver 725 to reduce the computational cost of the branch-and-bound optimization algorithm in the predictive controller.

Some embodiments are based on the realization that the w-value remains positive but it becomes smaller and smaller towards zero, i.e., $w_i \to 0$, for an inequality constraint that is active at the optimal solution because the Lagrange multiplier value $\mu_i > 0$ is nonzero and the corresponding value for the slack variable remains positive but becomes smaller and smaller towards zero, i.e., $s_i \to 0$, in a sequence of subsequent iterations of the interior point optimization algorithm. For an inequality constraint that is active at the optimal solution, the value for $$w_i^k = \frac{s_i^k}{\mu_i^k} > 0$$

on the diagonal of the weighting matrix $W^k \succ 0$ in the objective term $$\frac{1}{2}\|\Delta\mu\|^2_{W^k} = \frac{1}{2}\Delta\mu^T W^k \Delta\mu \quad 741$$

becomes increasingly small for subsequent iterations of the interior point solution procedure and the corresponding update $\Delta\mu_i^k$ from the projection step 740 is allowed to be relatively large because the current value for the Lagrange multiplier $\mu_i^k > 0$ 701 is positive and relatively large such that the positivity constraint $\mu_i^k + \Delta\mu_i^k > 0$ is likely to be satisfied 705, which can allow for early termination of the convex solver 725.

FIG. 7D illustrates pseudo code of an early termination procedure 750 for the solution of a convex relaxation within the branch-and-bound optimization algorithm in the predictive controller, based on evaluation of the dual objective and based on a projection step onto a dual feasible solution estimate, according to some embodiments. The solution procedure for each convex relaxation can start from either a fixed set of values or a warm started solution estimate for the primal optimization variables $z^0$, the Lagrange multipliers $\mu^0$ and $\lambda^0$ and the slack variables $s^0$, and given the current upper bound value 751 in the branch-and-bound optimization procedure. The solution procedure continues as long as the residual value is not sufficiently small 626, in which case the procedure first evaluates the dual objective function and the dual feasibility constraints 500. If the dual objective value is larger than the current upper bound 440 and if the solution estimate is dual feasible 505, then the solution of the convex relaxation can be terminated early 550, i.e., the optimal solution to the convex relaxation does not need to be computed since the corresponding node or partition is pruned 340. If the latter condition 505 is not yet satisfied, then the procedure checks whether the dual objective value $\psi$ is larger than the current upper bound 506, in which case a projection step can be used to compute a dual feasible solution estimate 710, otherwise, another set of convex solver iterations 530 is performed. In some embodiments, the latter convex solver iterations 530 correspond to iterations of an interior point optimization algorithm 600 to solve each constrained convex relaxation within the branch-and-bound method.

Based on the computed projection step 710, updated values can be computed for the Lagrange multipliers 752 for which the dual objective function and the dual feasibility constraints 501 are evaluated. If the updated values after the projection step are dual feasible 705, then the current values for the Lagrange multipliers are updated 720. In addition, if the new dual objective value $\psi^+$ is larger than the current upper bound and the solution estimate is dual feasible 507, then the solution of the convex relaxation can be terminated early 550, otherwise, another set of convex solver iterations 530 can be performed until the solution is found 540, the convex relaxation is detected to have no feasible solution, a maximum computation time has been reached or until a dual feasible solution estimate is computed for which the dual objective value is larger than the current upper bound resulting in early termination of the convex solver 550.

Figure 8:
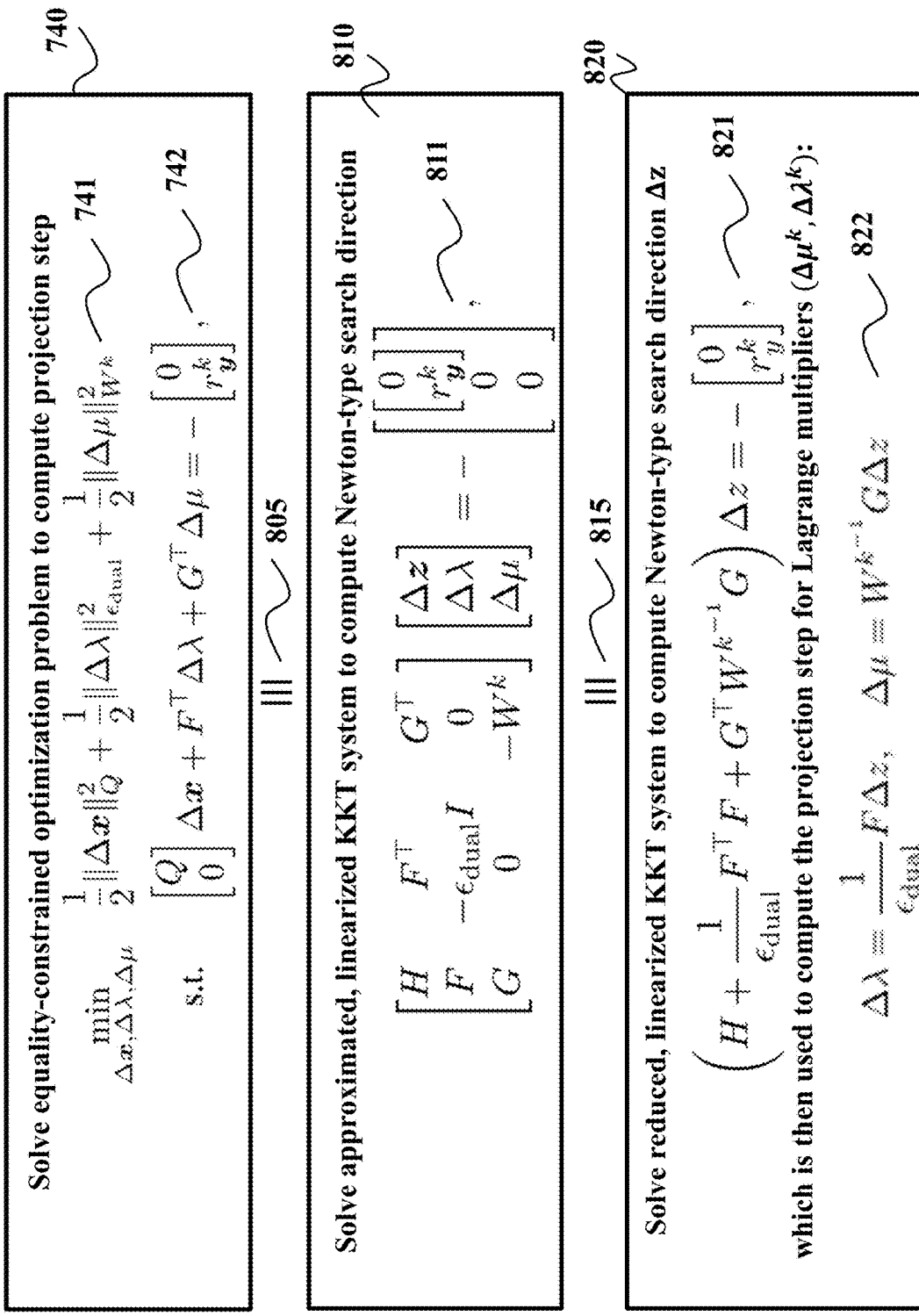
FIG. 8 illustrates the equations of an approximated, linearized KKT system to compute the equality-constrained QP solution in the projection step and its equivalence to the solution of a reduced linear system, followed by independent computations of the dual variable updates, according to some embodiments.

FIG. 8 illustrates the equations of an approximated, linearized KKT system to compute the equality-constrained QP solution in the projection step and its equivalence to the solution of a reduced linear system, followed by independent computations of the dual variable updates, according to some embodiments. Further, FIG. 8 shows the equations of an approximated, linearized KKT system 810 that is solved to compute a projection step 710 as an optimal solution to the equality-constrained quadratic program (QP) optimization problem 740, including an update to the primal variables $\Delta x^k$ and the dual variables $\Delta\mu^k$, $\Delta\lambda^k$ as optimization variables in the equality-constrained QP 740. Some embodiments are based on the realization that the optimal solution to an equality-constrained QP 740 is equivalent 805 to the solution of a linear system of equations 810.

Some embodiments are based on the realization that the linear system of equations 810 that needs to be solved to compute a projection step 740, in order to compute a dual feasible solution estimate for early termination, has a particular block-sparse structure for which the matrix closely approximates the symmetric matrix in the linearized KKT system 661 in an interior point optimization algorithm 600. The right-hand side 811 of the linear system 810 to compute the projection step 710 is, however, different from the right-hand side in the linearized KKT system 661 to compute a Newton-type search direction in an iteration of the interior point optimization algorithm 600. The right-hand side for the projection step 811 is zero, except for the stationarity conditions 652 with respect to the optimization variables y 404 that do not enter the primal objective function 401 or enter the primal objective function 401 linearly, which corresponds to the dual feasibility equality constraints 412 in the dual QP 410. Some embodiments are based on the realization that the right-hand side for the projection step 811 enforces dual feasibility, while aiming to preserve the progress done until the current iteration of the interior point optimization algorithm to satisfy the necessary optimality conditions, i.e., the Karush-Kuhn-Tucker (KKT) conditions corresponding to the convex relaxation.

The Hessian matrix $H \succcurlyeq 0$ of the primal objective function 401 is positive semidefinite, $\epsilon_{dual} > 0$ is a small positive penalty weight value for the Lagrange multipliers corresponding to the equality constraints, and $W^k \succ 0$ is a positive definite penalty weighting matrix for the Lagrange multipliers corresponding to the inequality constraints. The matrices F and G correspond to the constraint Jacobian matrices for the equality and for the inequality constraints, respectively. In some embodiments, the weighting matrix $W^k \succ 0$ is computed as a diagonal matrix with a diagonal element for each inequality constraint corresponding to the ratio $$w_i^k = \frac{s_i^k}{\mu_i^k} > 0$$

between the value for the slack variable $s_i^k > 0$ and the value for the Lagrange multiplier $\mu_i^k > 0$, at the $k^{th}$ iteration of the interior point optimization method (IPM) 600 to solve a constrained convex relaxation in the branch-and-bound optimization algorithm.

Some embodiments are based on the realization that the approximated, linearized KKT system for the projection step 810 is equivalent 815 to efficiently solving a reduced, linearized KKT system to compute a Newton-type search direction for the primal optimization variables $\Delta z$ 821, followed by a computation of the projection step for the Lagrange multipliers 822. The block-structured linear system comprised of linearized system of KKT conditions is solved by solving a reduced linear system to compute an update to the primal optimization variables, followed by a solution of a diagonal linear system to compute an update to the Lagrange multiplier variables. Some embodiments are based on a realization that the matrix $$M^k = \left( H + \frac{1}{\epsilon_{dual}} F^T F + G^T W^{k-1} G \right)$$

in the reduced, linearized KKT system 821 is positive definite such that a Cholesky factorization can be computed for this matrix to solve the reduced, linearized KKT system 821 in a computationally efficient manner. The projection step for the Lagrange multipliers 822 corresponding to the equality constraints can be computed independently as follows $$\Delta \lambda_i^k = \frac{1}{\epsilon_{dual}} F_{i,:} \Delta z.$$

In case the weighting matrix $W^k \succ 0$ is computed as a diagonal matrix, then the projection step for the Lagrange multipliers 822 corresponding to the inequality constraints can be computed independently as follows $$\Delta \mu_i^k = \frac{1}{w_i^k} G_{i,:} \Delta z,$$

at the $k^{th}$ iteration of the interior point optimization method (IPM) 600 to solve a constrained convex relaxation in the branch-and-bound optimization algorithm.

Figure 9A:
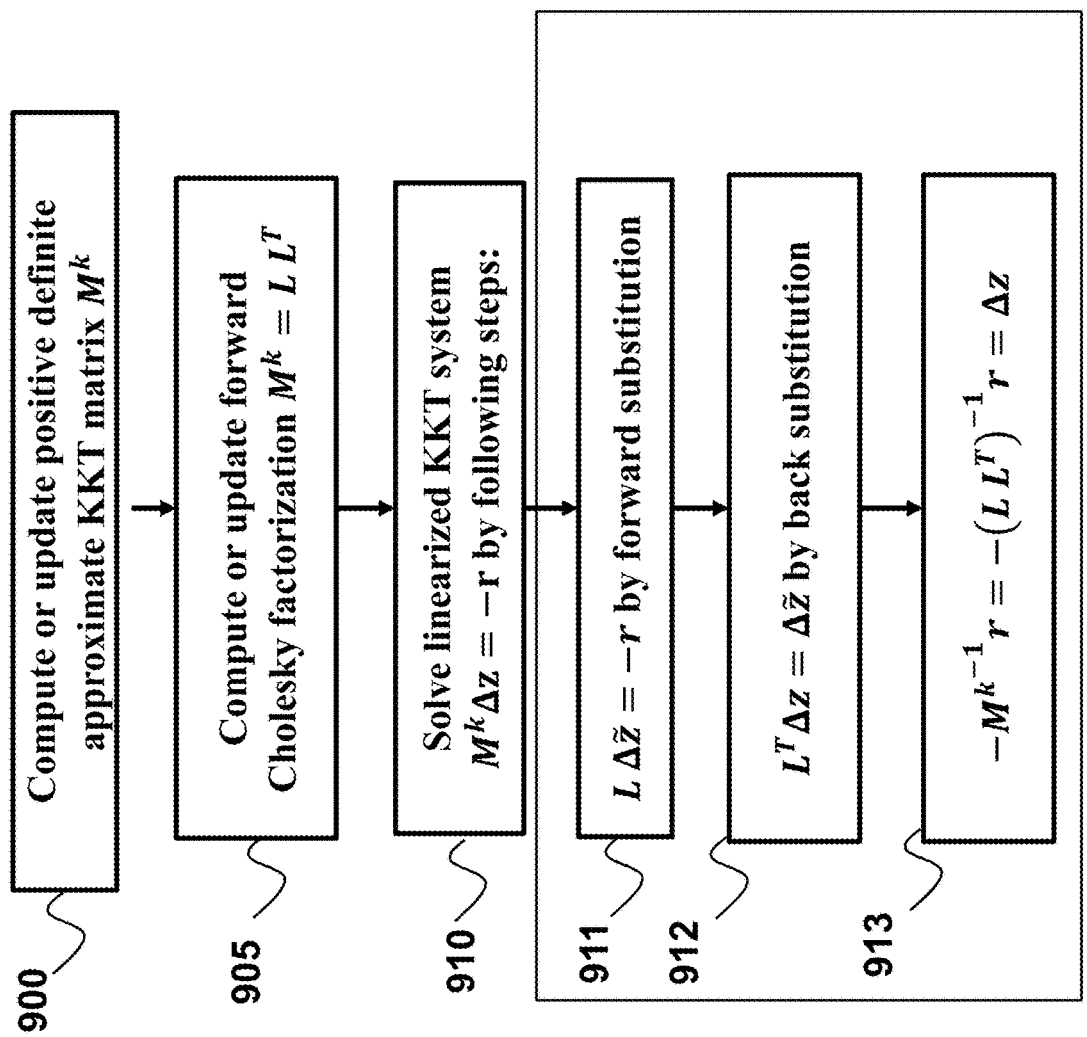
FIG. 9A illustrates a block diagram of a procedure to solve the reduced, approximated, linearized KKT system to compute the Newton-type search direction for the primal variables, in order to compute a projection step for the Lagrange multipliers, based on a forward Cholesky factorization of the positive definite, approximate KKT matrix, according to some embodiments.

FIG. 9A illustrates a block diagram of a procedure to solve the reduced, approximated, linearized KKT system 821 to compute the Newton-type search direction $\Delta z^k$ for the primal variables, in order to compute a projection step for the Lagrange multipliers $\Delta \mu^k$, $\Delta \lambda^k$, based on a forward Cholesky factorization of the positive definite, approximate KKT matrix $M^k$, according to some embodiments. The initial step is to either compute or update the positive definite, approximate KKT matrix $M^k$ 900 in the reduced linear subsystem 821 at the current iteration of the interior point optimization method (IPM), potentially given the positive definite, approximate KKT matrix $M^k$ in the reduced linear subsystem 821 at a previous iteration of the IPM. A forward Cholesky factorization or decomposition $M^k = LL^T$, in which the matrix L is a lower triangular matrix, can be either computed or updated 905, given the Cholesky factorization information from a previous IPM iteration, which is then used to solve the reduced, approximated, linearized KKT system 910.

In some embodiments of the present disclosure, the solution of the reduced, approximated, linearized KKT system, $M^k \Delta z^k = -\bar{r}_z^k$ 910 is performed, based on a forward Cholesky factorization or decomposition $M^k = LL^T$ 905, by first computing a solution to the lower triangular system $L \Delta \tilde{z}^k = -\bar{r}_z^k$ by forward substitution 911, followed by computing a solution to the upper triangular system $L^T \Delta z^k = \Delta \tilde{z}^k$ by back substitution 912, resulting in the solution vector of the reduced, linearized KKT system $\Delta z^k = -M^{k-1} \bar{r}_z^k = -(LL^T)^{-1} \bar{r}_z^k$ 913, as part of the projection step 820 that can be used for early termination of the convex solver. Thus, the Cholesky factorization is computed or updated, given the Cholesky factorization from a previous projection step or from a previous iteration of a convex solution procedure, to compute a solution to the reduced linear system with a positive definite KKT matrix.

Some embodiments are based on the realization that the matrix defining the reduced, approximated, linearized KKT subsystem 821 to compute the Newton-type search direction $\Delta z^k$ is positive definite and it can exhibit a block-tridiagonal sparsity structure due to the block-structured sparsity of the constrained optimal control problem, such that a block-tridiagonal Cholesky factorization can be used to solve the reduced, approximated, linearized KKT system. In some embodiments, the KKT matrix of the reduced linear system has a block-tridiagonal sparsity structure due to the block-structured sparsity of the mixed-integer optimal control optimization problem, and a block-tridiagonal Cholesky factorization is computed or updated to compute a solution to the reduced linear system with a positive definite, block-tridiagonal KKT matrix. In other embodiments of the present disclosure, a dense, banded or sparse Cholesky factorization can be used to reduce the computational cost of solving the structured linear system in a projection step of the early termination procedure.

Some embodiments are based on the realization that a low-rank update to the KKT matrix and to its Cholesky factorization can be computed at a considerably smaller computational cost compared to a completely new evaluation of the KKT matrix and of its Cholesky factorization, in case of a low-rank update to the positive definite weighting matrix $W^k \succ 0$ corresponding to the inequality constraints from one IPM iteration to the next.

Figure 9B:
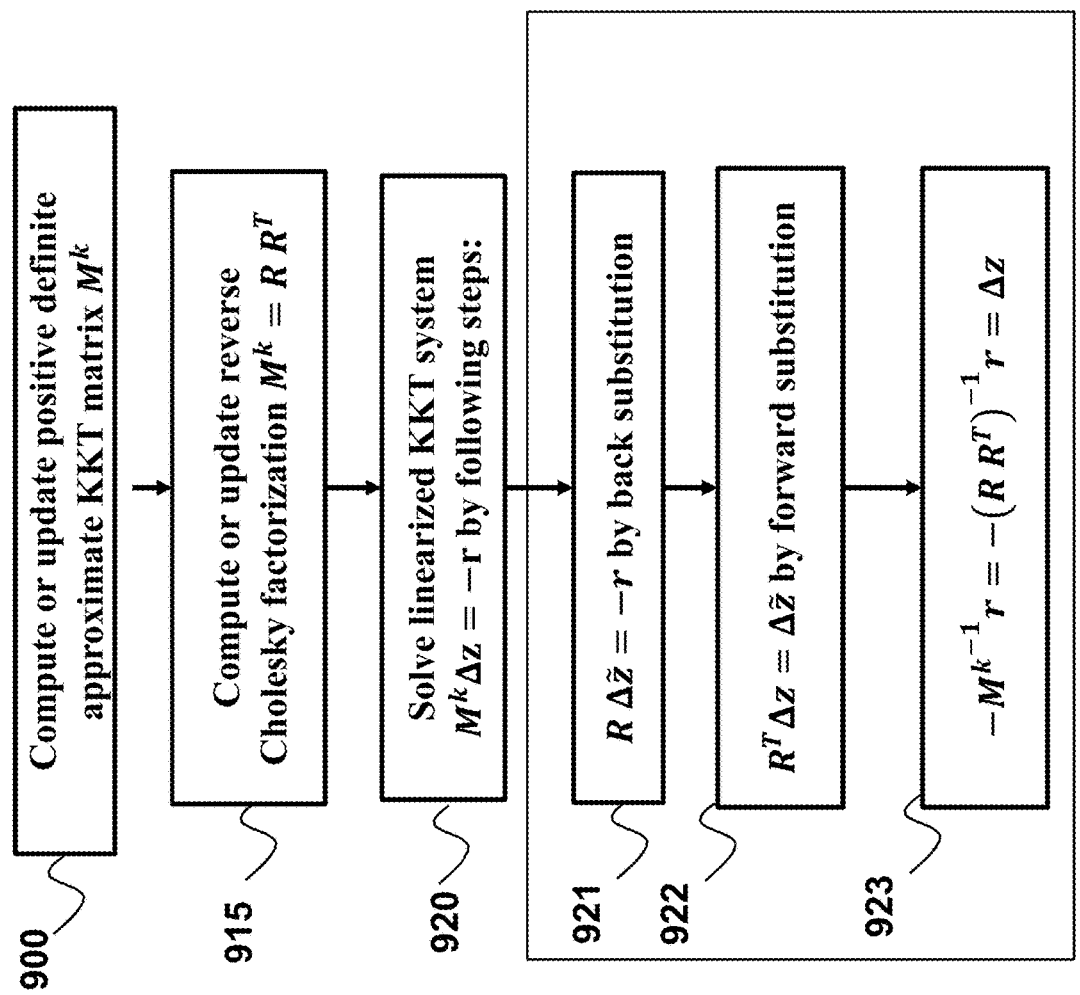
FIG. 9B illustrates a block diagram of a procedure to solve the reduced, approximated, linearized KKT system to compute the Newton-type search direction for the primal variables, based on a reverse Cholesky factorization of the positive definite, approximate KKT matrix, according to some embodiments.

FIG. 9B shows a block diagram of a procedure to solve the reduced, approximated, linearized KKT system 821 to compute the Newton-type search direction $\Delta z^k$ for the primal variables, based on a reverse Cholesky factorization of the positive definite, approximate KKT matrix $M^k$, according to some embodiments \. A reverse Cholesky factorization or decomposition $M^k=RR^T$, in which the matrix R is an upper triangular matrix, can be either computed or updated 915, potentially given the reverse Cholesky factorization information from a previous IPM iteration, which is then used to solve the reduced, approximated, linearized KKT system 920.

In some embodiments, the solution of the reduced, approximated, linearized KKT system, $M^k\Delta z^k=-\bar{r}_z^k$ 920 is performed, based on a reverse Cholesky factorization or decomposition $M^k=RR^T$ 915, by first computing a solution to the upper triangular system $R\Delta\tilde{z}^k=-\bar{r}_z^k$ by backward substitution 921, followed by computing a solution to the lower triangular system $R^T\Delta z^k=\Delta\tilde{z}^k$ by forward substitution 922, resulting in the solution vector of the reduced, linearized KKT system $\Delta z^k=-M^{k^{-1}}\bar{r}_z^k=-(RR^T)^{-1}\bar{r}_z^k$ 923, as part of the projection step 820 that can be used for early termination of the convex solver.

Figure 9C:
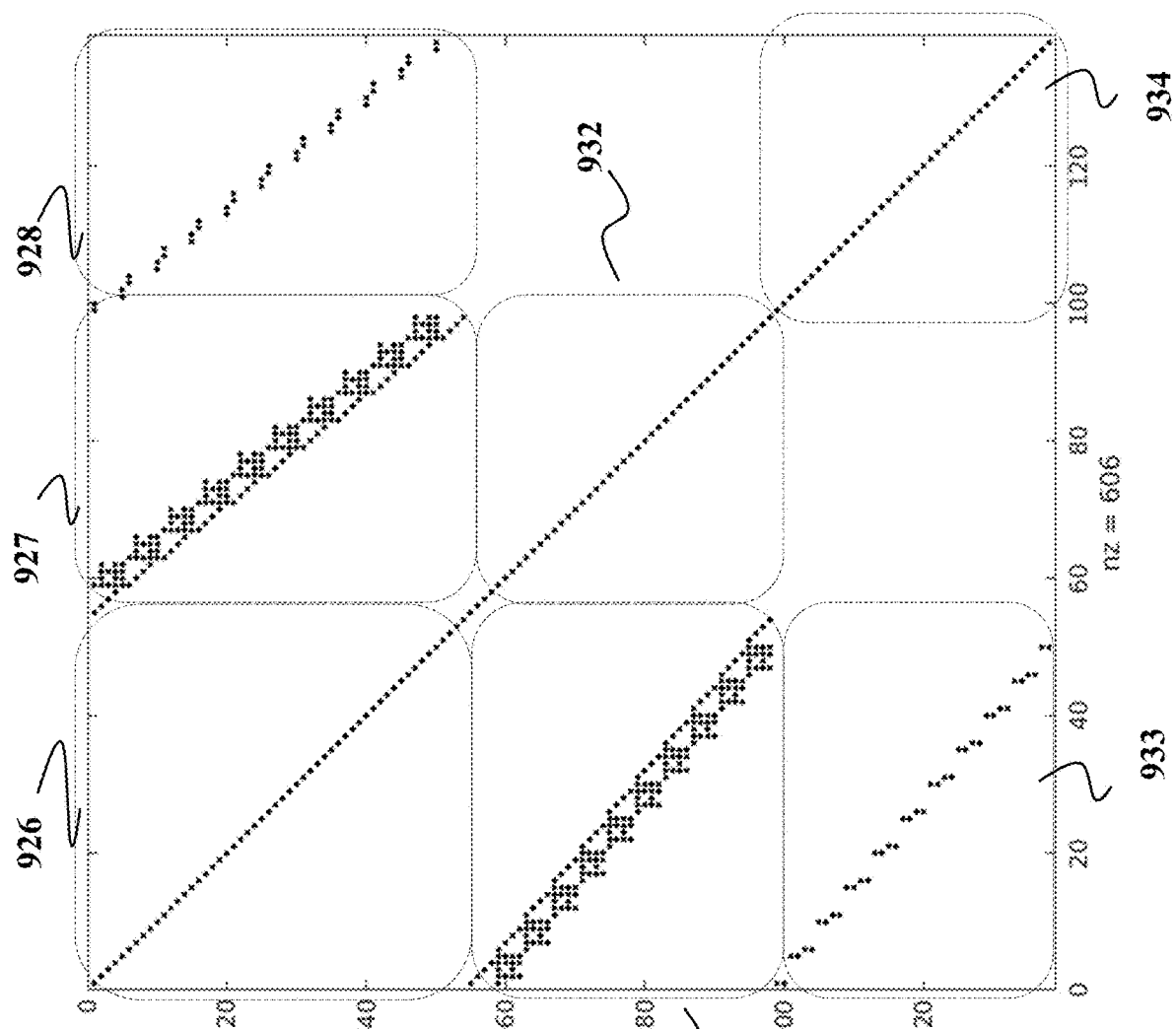
FIG. 9C illustrates a schematic of the block-structured sparsity pattern for the approximated KKT matrix in the linearized system to compute the Newton-type search direction for primal and dual optimization variables in the projection step, according to some embodiments.

FIG. 9C illustrates a schematic of the block-structured sparsity pattern 930 for the approximated KKT matrix 925 in the linearized system to compute the Newton-type search direction for primal and dual optimization variables in the projection step 710, according to some embodiments. The Hessian matrix H of the objective can be either diagonal or block-diagonal 926, due to the separable, stage-wise structure of the objective in the constrained optimal control structured optimization problem. The equality constraint Jacobian matrix F 931 and its transpose $F^T$ 927 typically exhibit a block-bidiagonal sparsity structure, due to the stage-wise coupling of the state variables at subsequent time intervals in the constrained OCP. The inequality constraint Jacobian matrix G 933 and its transpose $G^T$ 928 can be either diagonal or block-diagonal, due to the separable, stage-wise structure of the inequality constraints on state and/or control input variables in the constrained OCP.

The block matrices on the diagonal of the block-structured KKT matrix 925, such as the block matrix corresponding to the equality constraints 932 and the block matrix corresponding to the inequality constraints 934 are diagonal matrices. More specifically, the diagonal elements corresponding to the equality constraints 932 are equal to $-\epsilon_{dual}$, where the value for $\epsilon_{dual}>0$ is relatively small. The diagonal elements corresponding to the inequality constraints 934 depend on each particular inequality constraint and they can be equal to their corresponding $$w_i^k = \frac{s_i^k}{\mu_i^k} > 0$$

value or they can be bounded to be between a lower and upper bound value.

Figure 9D:
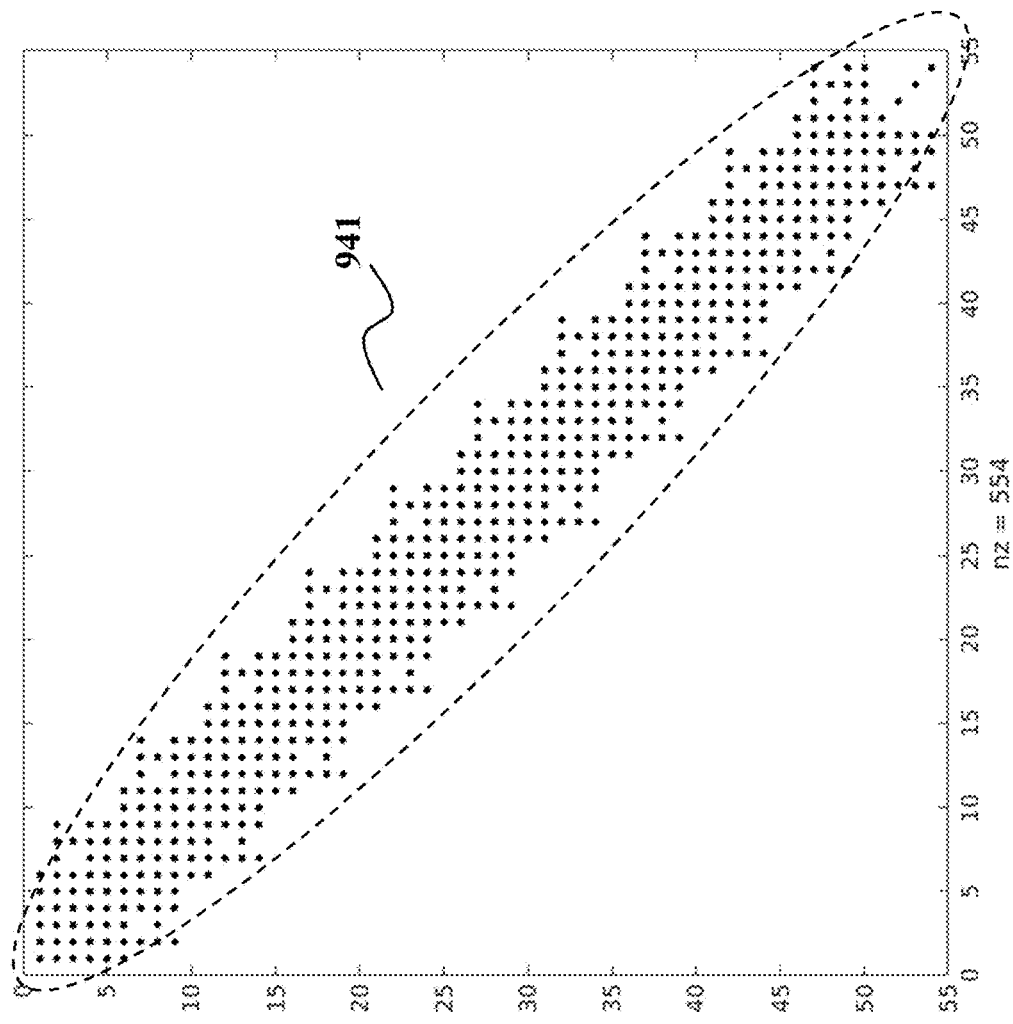
FIG. 9D illustrates a schematic of the block-structured sparsity pattern of the positive (semi-) definite KKT matrix in the reduced, approximated, linearized KKT system to compute the Newton-type search direction for the primal variables in the projection step, according to some embodiments.

FIG. 9D illustrates a schematic of the block-structured sparsity pattern 940 of the positive (semi-)definite KKT matrix 935 in the reduced, approximated, linearized KKT system 821 to compute the Newton-type search direction $\Delta z^k$ for the primal variables in the projection step 710, according to some embodiments. Some embodiments are based on the realization that the block-tridiagonal sparsity structure 941 of the KKT matrix can be used to solve the reduced linear system based on a block-tridiagonal matrix factorization, e.g., a block-tridiagonal forward or reverse Cholesky factorization, in order to reduce the computational cost of a projection step in the early termination procedure. Other embodiments of the present disclosure are based on the realization that the banded sparsity structure 941 of the KKT matrix can be used to solve the reduced linear system based on a banded and/or generally sparse matrix factorization in order to reduce the computational cost of a projection step in the early termination procedure in the predictive control system.

Figure 9E:
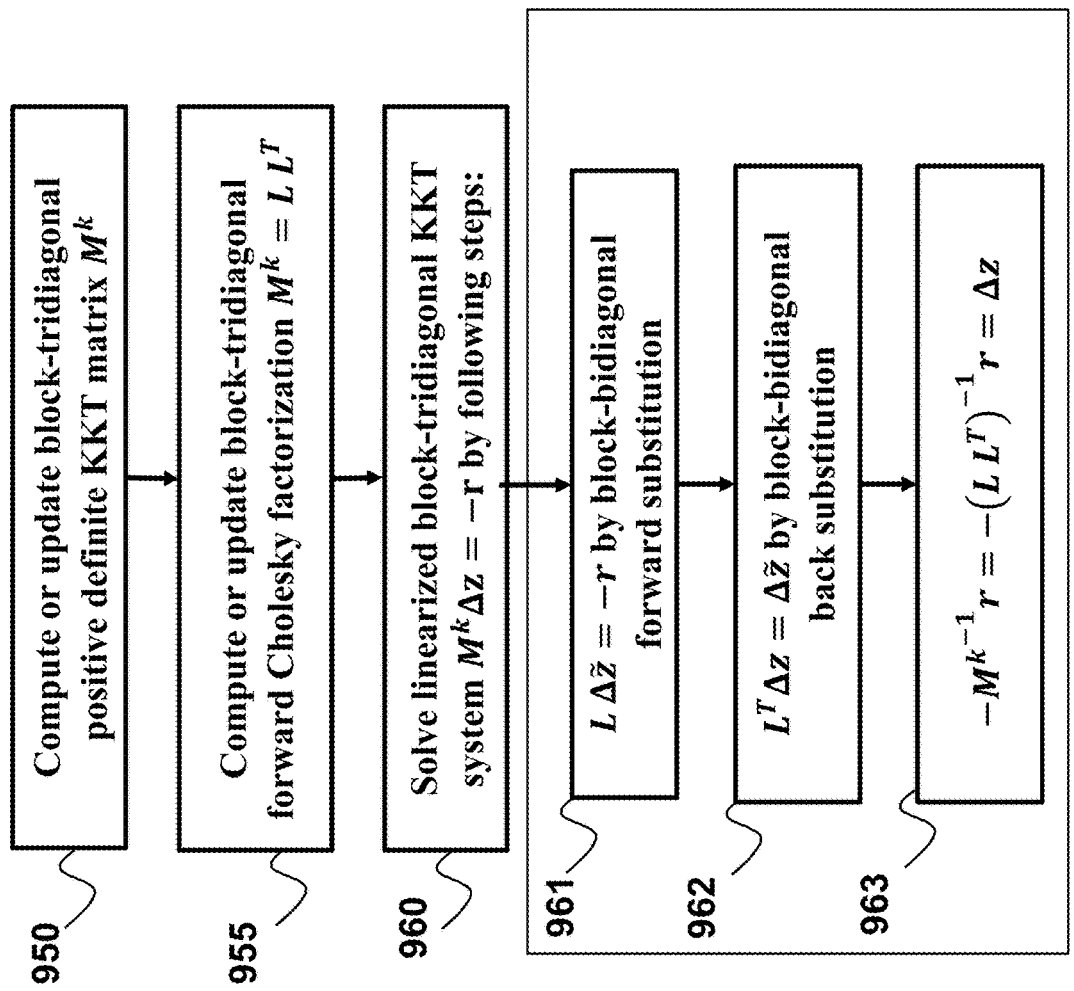
FIG. 9E illustrates a block diagram of a procedure to solve the reduced, approximated, linearized KKT system to compute the Newton-type search direction for the primal variables, in order to compute a projection step for the Lagrange multipliers, based on a block-tridiagonal forward Cholesky factorization of the block-tridiagonal, positive definite, approximate KKT matrix, according to some embodiments.

FIG. 9E illustrates a block diagram of a procedure to solve the reduced, approximated, linearized KKT system 821 to compute the Newton-type search direction $\Delta z^k$ for the primal variables, in order to compute a projection step for the Lagrange multipliers $\Delta\mu^k$, $\Delta\lambda^k$, based on a block-tridiagonal forward Cholesky factorization 955 of the block-tridiagonal, positive definite, approximate KKT matrix $M^k$ 950 according to some embodiments. A block-tridiagonal forward Cholesky factorization or decomposition $M^k=LL^T$, in which the matrix L is a lower block-bidiagonal matrix, can be either computed or updated 955, given the block-tridiagonal forward Cholesky factorization information from a previous IPM iteration or from the projection step in a previous iteration of the convex relaxation solution procedure, which is then used to solve the reduced, block-tridiagonal, linearized KKT system 960.

In some embodiments, the solution of the reduced, block-tridiagonal, linearized KKT system, $M^k\Delta z^k=-\bar{r}_z^k$ 960 is performed, based on a block-tridiagonal forward Cholesky factorization or decomposition $M^k=LL^T$ 955, by first computing a solution to the lower block-bidiagonal system $L\Delta\tilde{z}^k=-\bar{r}_z^k$ by block forward substitution 961, followed by computing a solution to the upper block-bidiagonal system $L^T\Delta z^k=\Delta\tilde{z}^k$ by block backward substitution 962, resulting in the solution vector of the reduced, block-tridiagonal, linearized KKT system $\Delta z^k=-M^{k^{-1}}\bar{r}_z^k=-(LL^T)^{-1}\bar{r}_z^k$ 963.

Figure 9F:
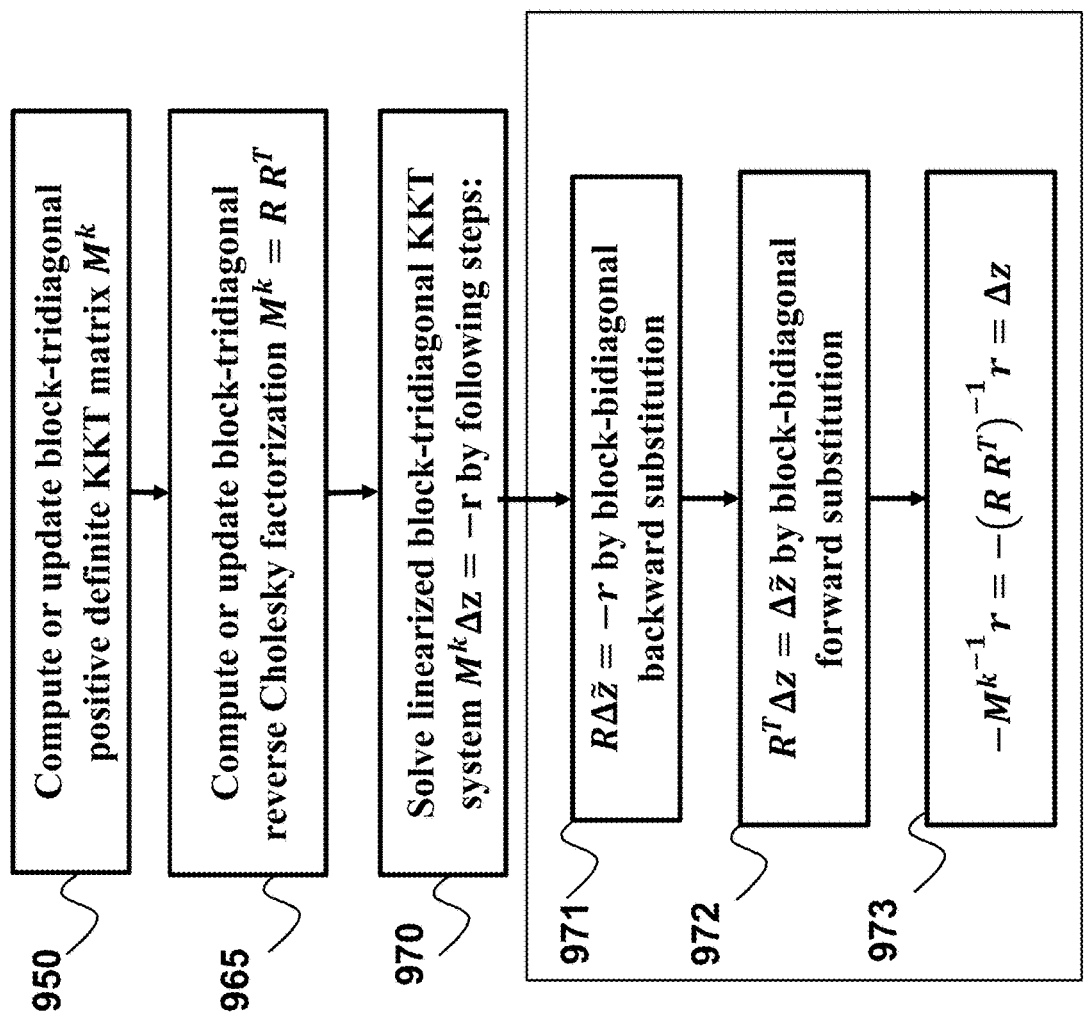
FIG. 9F illustrates a block diagram of a procedure to solve the reduced, approximated, linearized KKT system to compute the Newton-type search direction for the primal variables based on a block-tridiagonal reverse Cholesky factorization of the block-tridiagonal, positive definite, approximate KKT matrix, according to some embodiments.

FIG. 9F illustrates a block diagram of a procedure to solve the reduced, approximated, linearized KKT system 821 to compute the Newton-type search direction $\Delta z^k$ for the primal variables, based on a block-tridiagonal reverse Cholesky factorization 965 of the block-tridiagonal, positive definite, approximate KKT matrix $M^k$ 950, according to some embodiments. A block-tridiagonal reverse Cholesky factorization or decomposition $M^k=RR^T$, in which the matrix R is an upper block-bidiagonal matrix, can be either computed or updated 965, given the block-tridiagonal reverse Cholesky factorization information from a previous IPM iteration or from the projection step in a previous iteration of the convex relaxation solution procedure, which is then used to solve the reduced, block-tridiagonal, linearized KKT system 970.

In some embodiments, the solution of the reduced, block-tridiagonal, linearized KKT system, $M^k\Delta z^k=-\bar{r}_z^k$ 970 is performed, based on a block-tridiagonal reverse Cholesky factorization or decomposition $M^k=RR^T$ 965, by first computing a solution to the upper block-bidiagonal system $R\Delta\tilde{z}^k=-\bar{r}_z^k$ by block backward substitution 971, followed by computing a solution to the lower block-bidiagonal system $R^T\Delta z^k=\Delta\tilde{z}^k$ by block forward substitution 972, resulting in the solution vector of the reduced, block-tridiagonal, linearized KKT system $\Delta z^k=M^{k^{-1}}\bar{r}_z^k=-(RR^T)^{-1}\bar{r}_z^k$ 973.

Some embodiments are based on the realization that only one or multiple blocks of a reverse block-tridiagonal Cholesky factorization 965 need to be computed or updated, corresponding to the blocks that contain inequality constraints with updated values for $$w_i^k = \frac{s_i^k}{\mu_i^k} > 0$$

near the beginning of the control horizon in the constrained optimal control optimization problems of the predictive control system, resulting in a considerably reduced computational cost. Other embodiments are based on the realization that only one or multiple blocks of a forward block-tridiagonal Cholesky factorization 955 need to be computed or updated, corresponding to the blocks that contain inequality constraints with updated values for $$w_i^k = \frac{s_i^k}{\mu_i^k} > 0$$

near the end of the control horizon in the constrained optimal control optimization problems of the predictive control system, resulting in a considerably reduced computational cost.

Figure 10A:
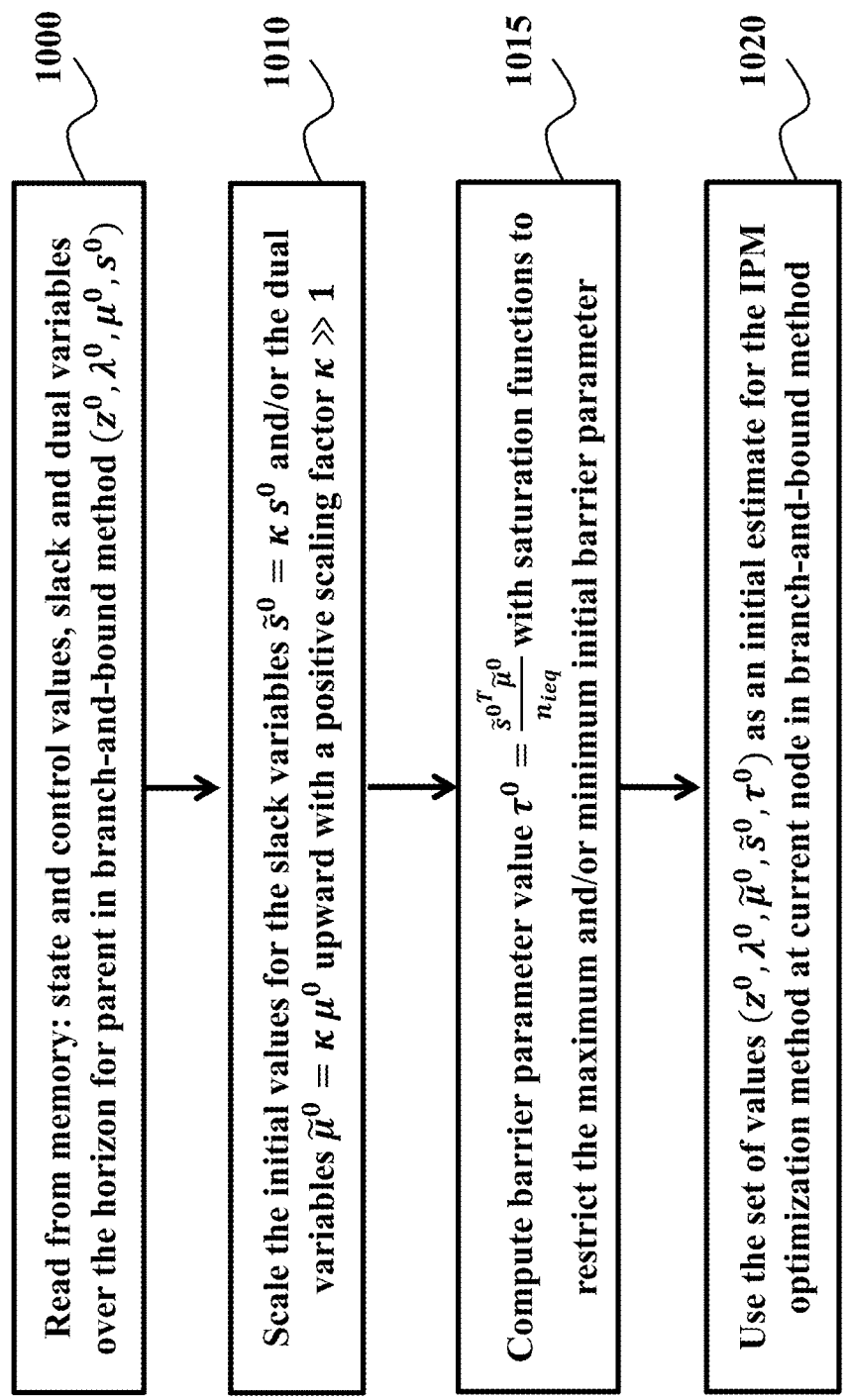
FIG. 10A illustrates a block diagram of a warm start initialization procedure to compute a solution estimate for the convex solution procedure, based on either an approximate or optimal solution to the convex relaxation in the parent node, according to some embodiments.

FIG. 10A illustrates a block diagram of a warm start initialization procedure to compute a solution estimate, based on either an approximate or optimal solution to the convex relaxation in the parent node, according to some embodiments. Further, the warm start initialization procedure computes a solution estimate for a convex relaxation within the branch-and-bound optimization algorithm. The procedure first reads the solution information for the convex relaxation in the parent problem of the branch-and-bound search tree from the memory 1000, i.e., including the optimal or approximate values $(z^0, \lambda^0, \mu^0, s^0)$ for the primal, dual and slack variables. Some embodiments are based on the realization that a dual feasible solution estimate for a parent problem additionally forms a dual feasible solution estimate for one or multiple of its children in the branch-and-bound search tree, such that this dual feasible solution estimate can be used in an early termination procedure to reduce the computational cost of solving the convex relaxation in one or multiple of the children nodes. In another embodiment, the projection step computes the sub-optimal dual solution estimate 520 from the local optimal solution to perform the early termination procedure for one or multiple other regions within the nested tree of regions for the B&B optimization.

In some embodiments, the warm start initialization procedure scales the initial values for the slack variables $\tilde{s}^0 = \kappa s^0$ and/or the dual variables $\tilde{\mu}^0 = \kappa \mu^0$ upward 1010, using a positive scaling factor $\kappa \gg 1$, and the resulting new value for the barrier parameter $$\tau^0 = \frac{\tilde{s}^{0T} \tilde{\mu}^0}{n_{ieq}}$$

is computed 1015. Some embodiments use additional saturation functions to ensure lower and upper bounds for the initial barrier parameter value, i.e., $\tau_{min} \leq \tau^0 \leq \tau_{max}$ where $\tau_{min}$ and $\tau_{max}$ denote the desired minimum and maximum values for the barrier parameter, respectively. The resulting set of values $(z^0, \lambda^0, \mu^0, \tilde{s}^0, \tau^0)$ can be used as an initial estimate for the interior point optimization algorithm to solve a convex relaxation at the current node in the branch-and-bound method 1020.

Some embodiments are based on the realization that an upward scaling of one or multiple values for the slack variables 1010 results in a constraint inactivation process that aims to avoid any situation of slow convergence for the interior point optimization algorithm due to a mistake in the warm start initialization that believes an inactive constraint to be active. Some embodiments are based on the realization that an upward scaling of one or multiple values for the dual variables 1010 (Lagrange multipliers) results in a constraint activation process that aims to avoid any situation of slow convergence for the interior point optimization algorithm due to a mistake in the warm start initialization that believes an active constraint to be inactive. More specifically, when choosing the scaling parameter value $\kappa \gg 1$ sufficiently large, but not too large, some or all of the inequality constraints can be moved away from the non-smoothness of the complementarity condition that states that either the slack variable or the Lagrange multiplier value should be equal to zero for each inequality constraint in the optimal solution to the convex relaxation. In addition, the resulting increase in the initial estimate for the barrier parameter 1015 results in a relaxed and therefore smoothened set of complementarity conditions.

Figure 10B:
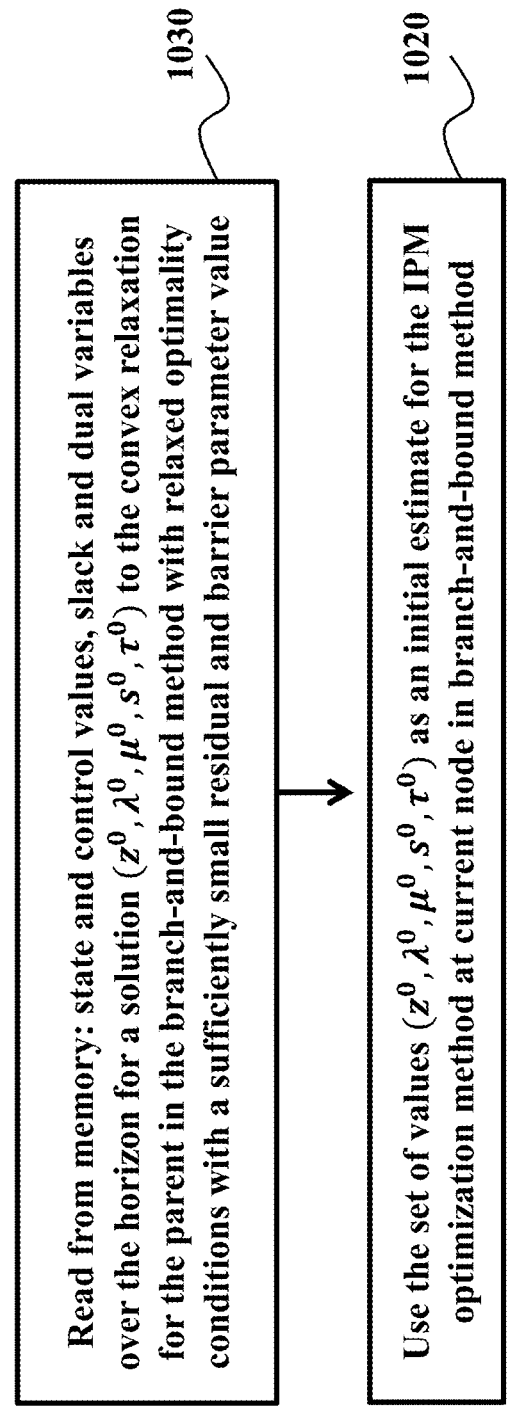
FIG. 10B illustrates a block diagram of a smooth relaxation-based warm start initialization procedure for the interior point optimization algorithm to solve one or multiple convex relaxations in the predictive control system, according to some embodiments.

FIG. 10B illustrates a block diagram of a smooth relaxation-based warm start initialization procedure for the interior point optimization algorithm to solve one or multiple convex relaxations in the predictive control system, according to some embodiments. Some embodiments are based on the realization that an approximate solution to the barrier-type relaxation of the optimality conditions for the constrained convex relaxation can be stored in memory for a parent node in the branch-and-bound search tree, when a norm of the residual vector is sufficiently small and/or when the barrier parameter value is sufficiently small. The first step of a smooth relaxation-based warm start initialization for the convex solution procedure is then to read the approximate, relaxed solution information $(z^0, \lambda^0, \mu^0, s^0, \tau^0)$ for the convex relaxation in the parent problem of the branch-and-bound search tree from the memory 1030. Next, the resulting set of values $(z^0, \lambda^0, \mu^0, s^0, \tau^0)$ can be used as an initial estimate for the interior point optimization algorithm to solve a convex relaxation at the current node in the branch-and-bound method 1020.

Some embodiments are based on the realization that the performance of the smooth relaxation-based warm start initialization procedure highly depends on the decision rule to store an approximate solution to the barrier-type relaxation of the optimality conditions for the constrained convex relaxation in a parent node of the branch-and-bound search tree. For example, the approximate and relaxed solution information can be stored in a particular iteration of the interior point optimization algorithm if the norm of the residual vector and the barrier parameter value are both below a particular threshold.

Figure 11:
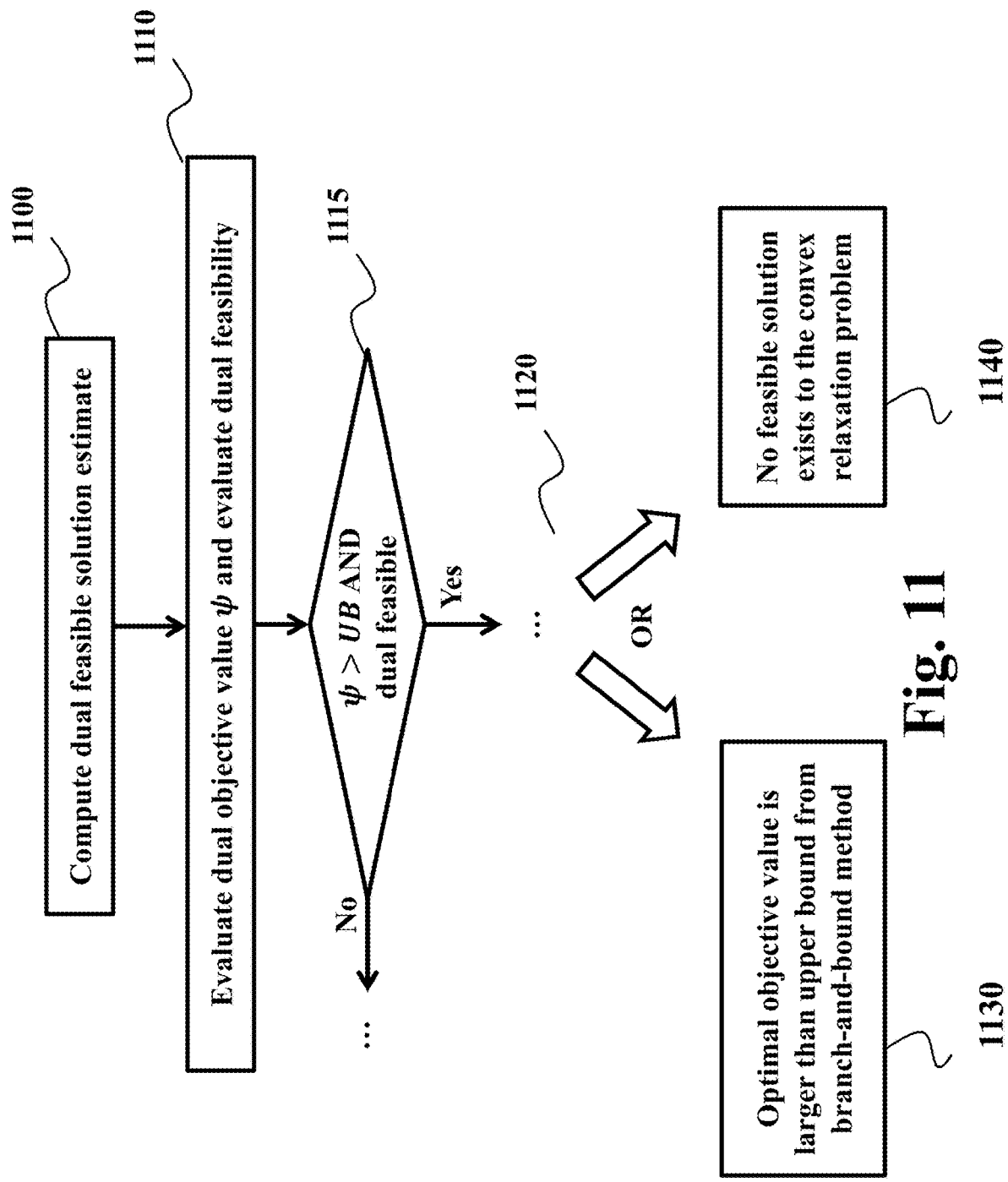
FIG. 11 illustrates a block diagram of an early termination procedure for the solution of a convex relaxation within the branch-and-bound algorithm, in case the optimal objective value is larger than the current upper bound or in case no feasible solution exists for the convex relaxation, according to some embodiments.

FIG. 11 illustrates a block diagram of an early termination procedure for the solution of a convex relaxation within the branch-and-bound algorithm, in case the optimal objective value is larger than the current upper bound or in case no feasible solution exists for the convex relaxation, according to some embodiments. Further, FIG. 11 illustrates an early termination procedure 750 to reduce the computational cost for the solution of a convex relaxation within the branch-and-bound optimization algorithm in the predictive controller, based on a dual feasible solution estimate or a projection step to compute a dual feasible solution estimate 1100 and based on an evaluation of the dual objective value 1110. If the dual objective value is larger than the current upper bound and if the solution estimate is dual feasible 1115, then the solution procedure of the convex relaxation can be terminated early 550, i.e., the optimal solution to the convex relaxation does not need to be computed since the corresponding node or partition is pruned 340. Some embodiments are based on the realization that the latter condition is satisfied 1120, in case the optimal objective value is larger than the current upper bound (UB) in the branch-and-bound optimization algorithm 1130 or in case there exists no feasible solution to the constrained convex relaxation problem 1140. More specifically, such embodiments are based on the realization that the dual objective function 411 for the dual QP 410 is unbounded in case the primal QP 400 is infeasible, i.e., the dual objective function 411 is unbounded and therefore larger than any upper bound value in the branch-and-bound method if there exists no values z=[x,y] that satisfy the affine inequality constraints 402 and affine equality constraints 403 in the primal QP 400.

Figure 12A:
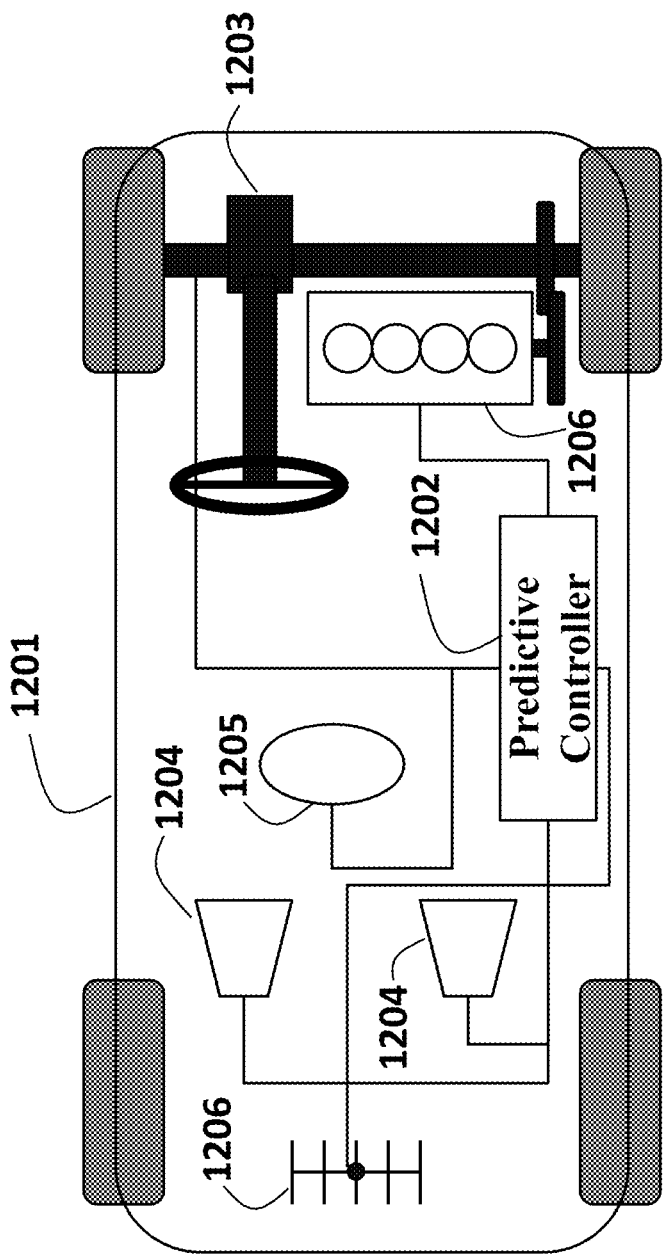
FIG. 12A illustrates a schematic of a vehicle including a predictive controller employing principles of some embodiments.

FIG. 12A illustrates a schematic of a vehicle 1201 including a predictive controller 1202 employing principles of some embodiments. As used herein, the vehicle 1201 can be any type of wheeled vehicle, such as a passenger car, bus, or rover. Also, the vehicle 1201 can be an autonomous or semi-autonomous vehicle. For example, some embodiments control the motion of the vehicle 1201. Examples of the motion include lateral motion of the vehicle controlled by a steering system 1203 of the vehicle 1201. In one embodiment, the steering system 1203 is controlled by the controller 1202. Additionally, or alternatively, the steering system 1203 can be controlled by a driver of the vehicle 1201.

The vehicle can also include an engine 1206, which can be controlled by the controller 1202 or by other components of the vehicle 1201. The vehicle can also include one or more sensors 1204 to sense the surrounding environment. Examples of the sensors 1204 include distance range finders, radars, lidars, and cameras. The vehicle 1201 can also include one or more sensors 1205 to sense its current motion quantities and internal status. Examples of the sensors 1205 include global positioning system (GPS), accelerometers, inertial measurement units, gyroscopes, shaft rotational sensors, torque sensors, deflection sensors, pressure sensor, and flow sensors. The sensors provide information to the controller 1202. The vehicle can be equipped with a transceiver 1206 enabling communication capabilities of the controller 1202 through wired or wireless communication channels.

Figure 12B:
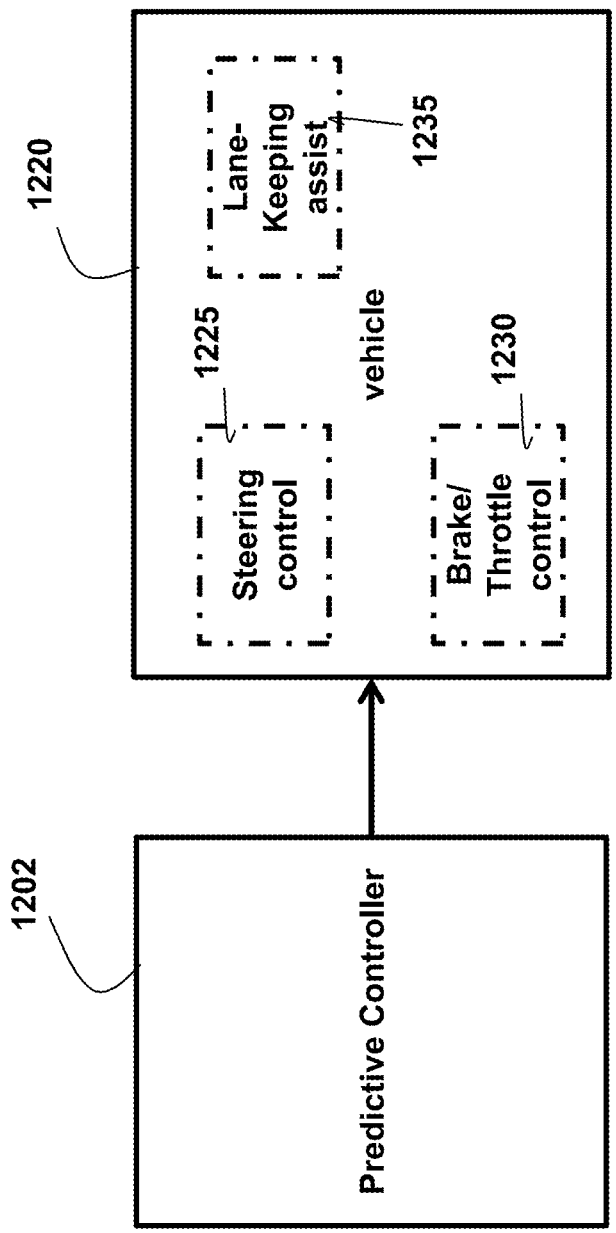
FIG. 12B illustrates a schematic of interaction between the predictive controller and other controllers of the vehicles, according to some embodiments.

FIG. 12B illustrates a schematic of interaction between the controller 1202 (i.e., a predictive controller) and other controllers 1220 of the vehicle 1201, according to some embodiments. For example, in some embodiments, the controllers 1220 of the vehicle 1201 are steering 1225 and brake/throttle controllers 1230 that control rotation and acceleration of the vehicle 1220, respectively. In such a case, the predictive controller 1202 outputs control inputs to the controllers 1225 and 1230 to control the state of the vehicle 1201. The controllers 1220 can also include high-level controllers, e.g., a lane-keeping assist controller 1235, that further process the control inputs of the predictive controller 1202. In both cases, the controllers 1220 use the outputs of the predictive controller 1202 to control at least one actuator of the vehicle 1201, such as the steering wheel and/or the brakes of the vehicle 1201, in order to control the motion of the vehicle 1201. Further, the predictive controller 1202 determines an input to the vehicle 1201 based on a mixed-integer control solution, where the input to the vehicle 1201 includes one or a combination of an acceleration of the vehicle 1201, an engine torque of the vehicle 1201, brake torques, and a steering angle, and the discrete optimization variables to model one or a combination of discrete control decisions, switching in the system dynamics, gear shifting, and obstacle avoidance constraints.

Figure 12C:
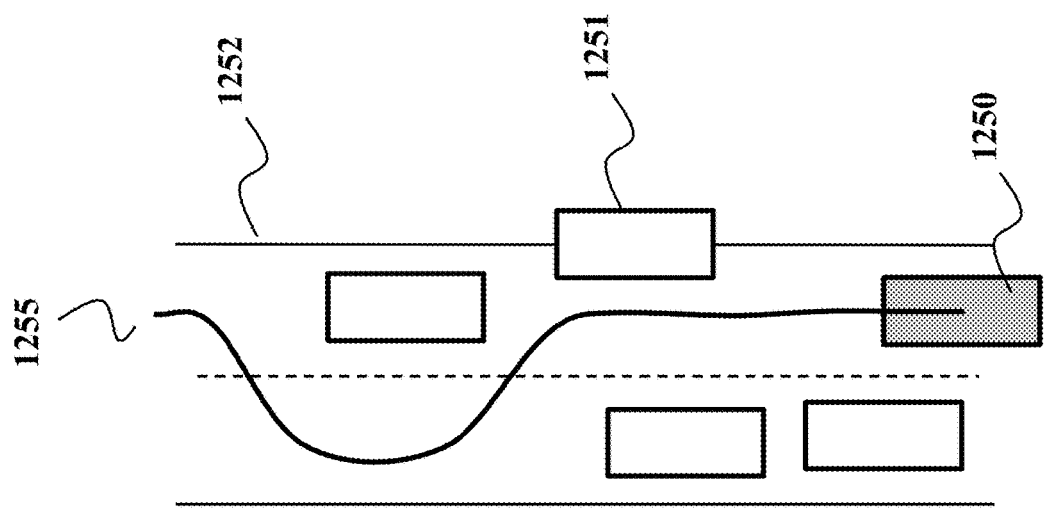
FIG. 12C illustrates a schematic of a path and/or motion planning method for a controlled vehicle employing principles of some embodiments.

FIG. 12C illustrates a schematic of a path and/or motion planning method for a controlled vehicle employing principles of some embodiments. Further, FIG. 12C illustrates a schematic of an autonomous or semi-autonomous controlled vehicle 1250 for which a dynamically feasible, and often optimal trajectory 1255 can be computed by using embodiments of the present disclosure. The generated trajectory aims to keep the vehicle within particular road bounds 1252, and aims to avoid other controlled and/or uncontrolled vehicles, i.e., these vehicles are obstacles 1251 for this particular controlled vehicle 1250. In some embodiments, each of the obstacles 1251 can be represented by one or multiple inequality constraints in a time or space formulation of the constrained mixed-integer programming problem, including one or multiple additional discrete variables for each of the obstacles. For example, based on embodiments configured to implement a mixed-integer model predictive controller, the autonomous or semi-autonomous controlled vehicle 1250 can make discrete decisions in real time such as, e.g., pass another vehicle on the left or on the right side or instead to stay behind another vehicle within the current lane of the road 1252, while additionally making continuous decisions in real time such as, e.g., the velocity, acceleration or steering inputs to control the motion of the vehicle 1250.

Figure 12D:
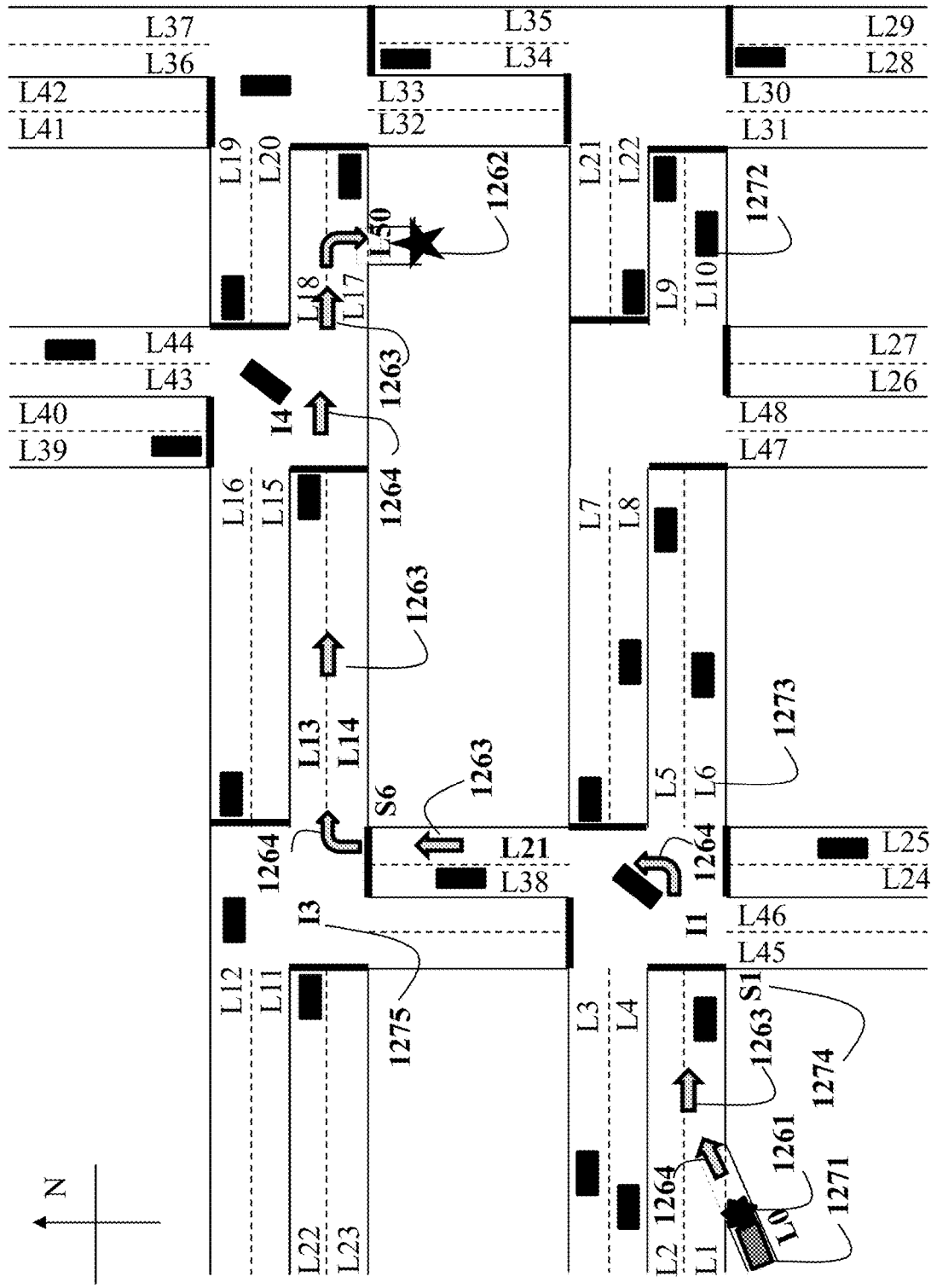
FIG. 12D illustrates an exemplary traffic scene for a single- or multi-vehicle decision making module based on some embodiments.

FIG. 12D illustrates an exemplary traffic scene for a single- or multi-vehicle decision making module based on some embodiments. The FIG. 12D depicts a scenario with one or multiple vehicles under control, referred to as an ego vehicle 1271, with the traffic composed of other vehicles shown similar to 1272, lanes marked for instance 1273 as L6, stop lines marked for instance 1274 as S1, intersections marked for instance 1275 as I3. For the vehicle in position 1261, with final destination 1262, a routing module provides the sequence of roads indicated by arrows 1263, and the sequence of turns indicated by arrows 1264. It should be noted however that the sequence of roads 1263 and the sequence of turns 1264 does not by itself specify a trajectory or a path for the vehicle. There are a number of discrete decisions to take such as in what lane the vehicle is to drive, if the vehicle should change lane or stay in the current lane, if the vehicle should start decelerating to stop at the stop line or not, if the vehicle is allowed to cross the intersection, and so on. Furthermore, there are a number of continuous decisions to make, such as the timed sequence of positions and orientations that the vehicle should achieve on the travel from its initial point to its destination. These decisions highly depend on the current traffic at the moment when the vehicle reaches the corresponding location, which is in general unknown to a routing module due to the uncertainty of traffic motion and uncertainty of the moment at which the vehicle will reach the location. In some embodiments of the present disclosure, a motion plan can be computed for one or multiple controlled ego vehicles 1271, possibly with communication to allow for coordination between the vehicles (V2V) and/or between a smart infrastructure system and the vehicles (V2X), by solving one or multiple connected mixed-integer programming problems.

Figure 13A:
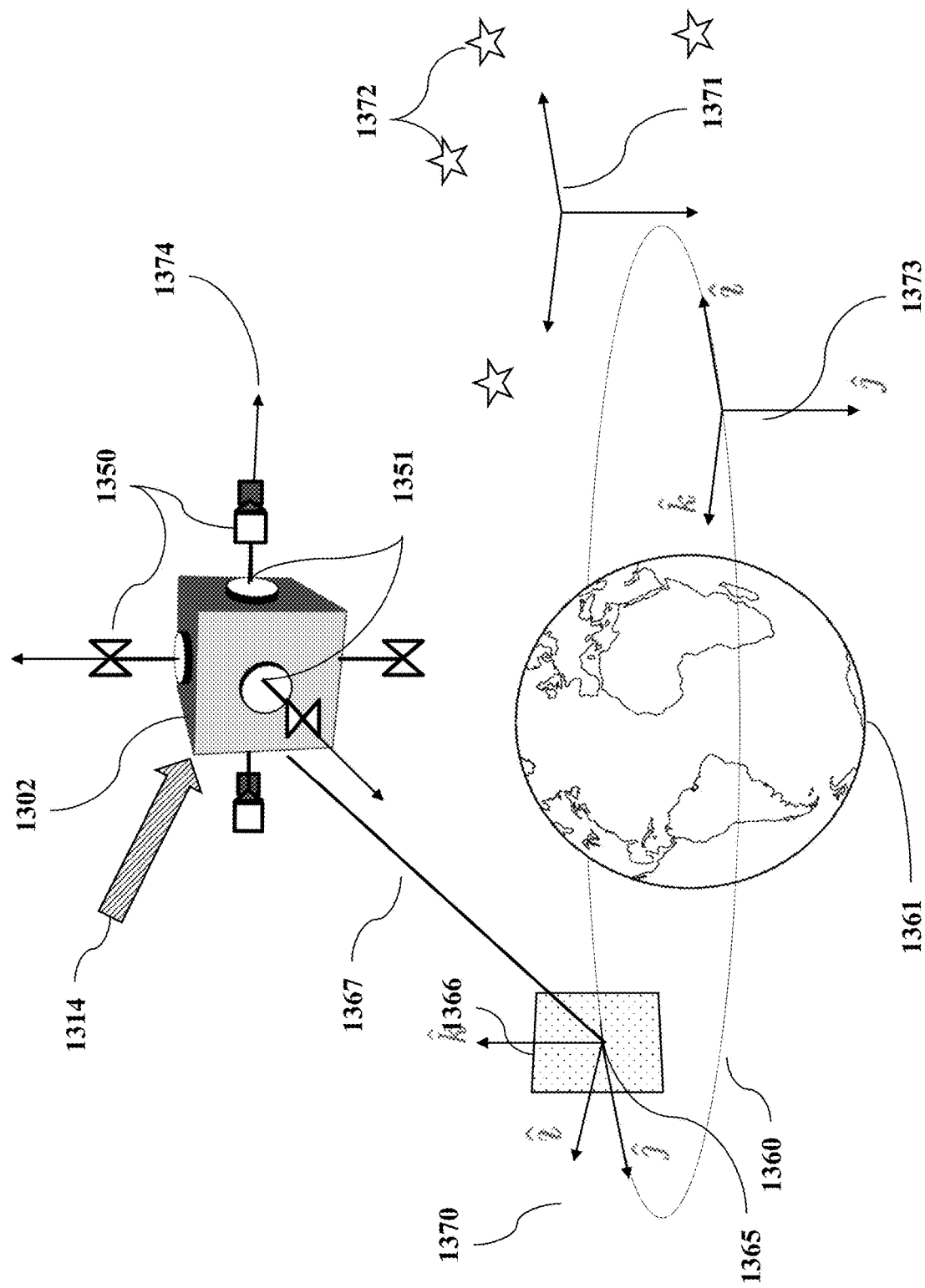
FIGS. 13A and 13B are schematics of the spacecraft mixed-integer predictive control problem formulation employing principles, according to some embodiments.
Figure 13B:
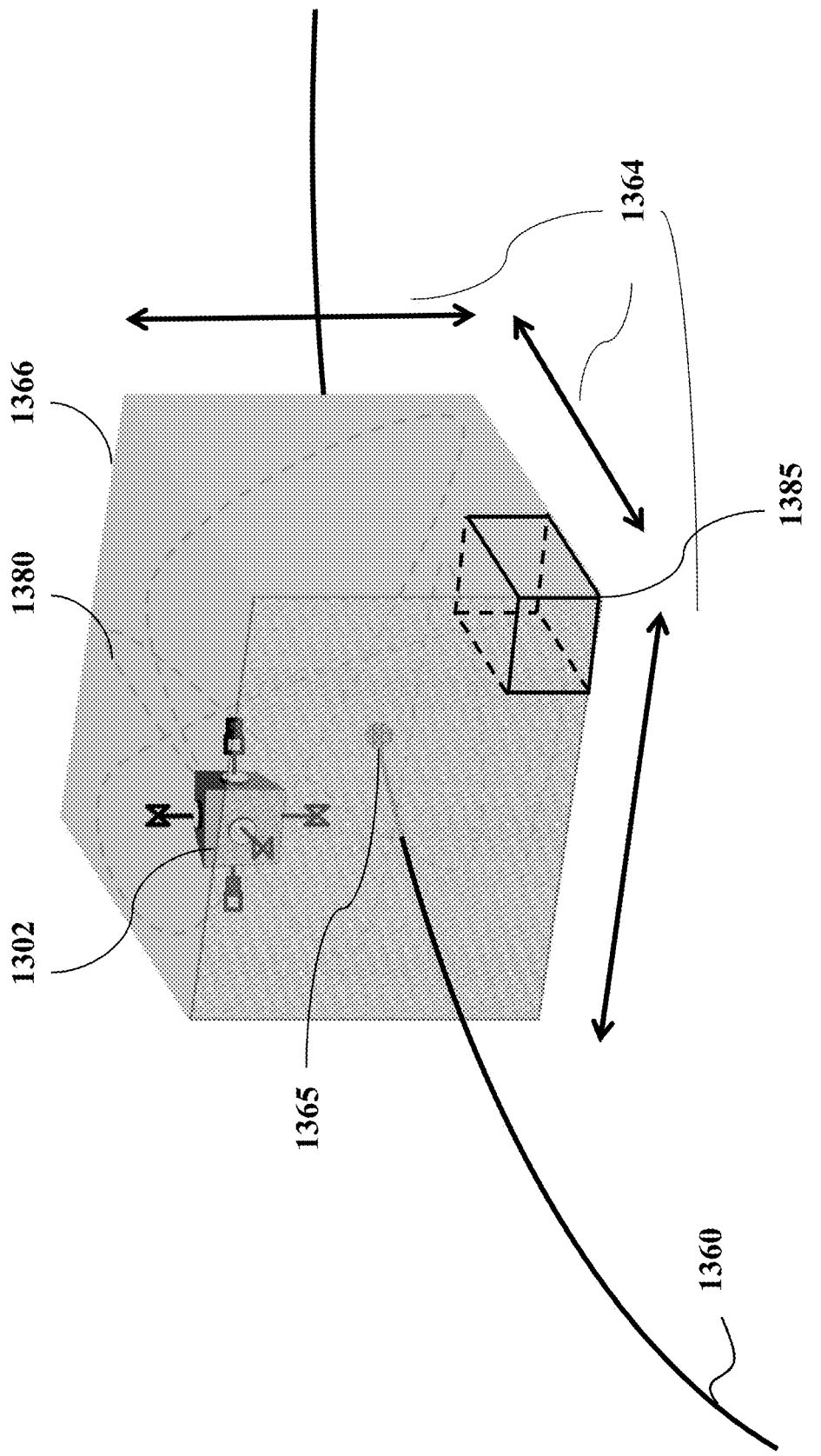

FIG. 13A and FIG. 13B are schematics of the spacecraft mixed-integer predictive control problem formulation employing principles of some embodiments of the disclosure. More specifically, FIG. 13A and FIG. 13B illustrate a spacecraft 1302 equipped with a plurality of actuators such as thrusters 1350 and momentum exchange devices 1351. Examples of the type of momentum exchange devices include reaction wheels (RWs) and gyroscopes. The spacecraft 1302 is a vehicle, vessel, or machine designed to fly in outer space whose operation changes quantities such as the position of the spacecraft 1302, its velocities, and its attitude or orientation, in response to commands that are sent to the actuators. When commanded, the actuators impart forces on the spacecraft 1302 that increase or decrease the velocity of the spacecraft 1302 and thus cause the spacecraft 1302 to translate its position, and, when commanded, the actuators also impart torques on the spacecraft 1302, which cause the spacecraft 1302 to rotate and thereby change its attitude or orientation. As used herein, the operation of the spacecraft 1302 is determined by the operation of the actuators that determine a motion of the spacecraft 1302 that changes such quantities.

The spacecraft 1302 flies in outer space along an open or closed orbital path 1360 around, between, or near one or more gravitational bodies such as the Earth 1361, moon, and/or other celestial planets, stars, asteroids, comets. Usually, a desired or target position 1365 along the orbital path is given. A reference frame 1370 is attached to the desired position, where the origin of the frame, i.e., the all zeros coordinates in that reference frame are the coordinates of the desired position at all times.

The spacecraft 1302 is subject to various disturbance forces 1314. These disturbance forces can include forces that were not accounted for when determining the orbital path for the spacecraft 1302. These disturbance forces act on the spacecraft 1302 to move the spacecraft 1302 away from the desired position on the orbital path. These forces can include, but are not limited to, gravitational attraction, radiation pressure, atmospheric drag, non-spherical central bodies, and leaking propellant. Thus, the spacecraft 1302 can be at a distance 1367 away from the target position.

Because of the disturbance forces, it is not always possible to keep the spacecraft 1302 at the desired position along its orbit. As such, it is desired that the spacecraft 1302 instead remains within a window 1366 with specified dimensions 1364 around the desired position. To that end, the spacecraft 1302 is controlled to move along any path 1380 that is contained within the desired target window. In this example, the window 1366 has a rectangular shape, but the shape of the window can vary for different embodiments.

The spacecraft 1302 is also often required to maintain a desired orientation. For example, a spacecraft-fixed reference frame 1374 is required to be aligned with a desired reference frame such as an inertial reference frame 1371 that is fixed relative to distant stars 1372, or a reference frame 1373 that is always oriented in a manner that points towards the Earth. However, depending on the shape of the spacecraft 1302, different disturbance forces 1314 can act non-uniformly on the spacecraft 1302, thereby generating disturbance torques, which cause the spacecraft 1302 to rotate away from its desired orientation. In order to compensate for the disturbance torques, momentum exchange devices 1351 such as reaction wheels are used to absorb the disturbance torques, thus allowing the spacecraft to maintain its desired orientation.

So that the momentum exchange devices do not saturate, and thereby lose the ability to compensate for disturbance torques, their stored momentum must be unloaded, e.g., by reducing spin rates of the reaction wheels. Unloading the momentum exchange devices imparts an undesired torque on the spacecraft 1302. Such an undesired torque is also compensated for by the thrusters.

In some embodiments, the predictive controller determines an input to the spacecraft 1302 based on the mixed-integer control solution, wherein the input to the spacecraft 1302 actuates one or a combination of thrusters and momentum exchange devices, and the discrete optimization variables are used to model one or a combination of discrete control decisions, switching in the system dynamics, integer values for the thruster commands, and obstacle avoidance constraints.

In some embodiments, the spacecraft 1302 can be modeled as a hybrid system and the commands that are sent to the actuators are computed using a predictive controller, such as the mixed-integer model predictive controller. For example, in some embodiments, the commands that are sent to the thrusters 1350 can only take a discrete set of values, and therefore resulting into a set of binary or integer control input variables for each stage within the mixed-integer control horizon.

In some embodiments, the predictive controller is designed such that the spacecraft 1302 remains outside of a particular zone 1385 with specified dimensions, close to the desired position along the orbit. The latter zone can be either fixed in time or it can be time varying, and is often referred to as an exclusion zone 1385, for which the corresponding logic inequality constraints can be modeled using an additional set of binary or integer control input variables for each stage within the mixed-integer control horizon. In this example, the exclusion zone 1385 has a rectangular shape, and it is positioned in a corner of the desired window 1366, but the shape and position of the exclusion zone within the desired target window can vary for different embodiments.

Figure 14A:
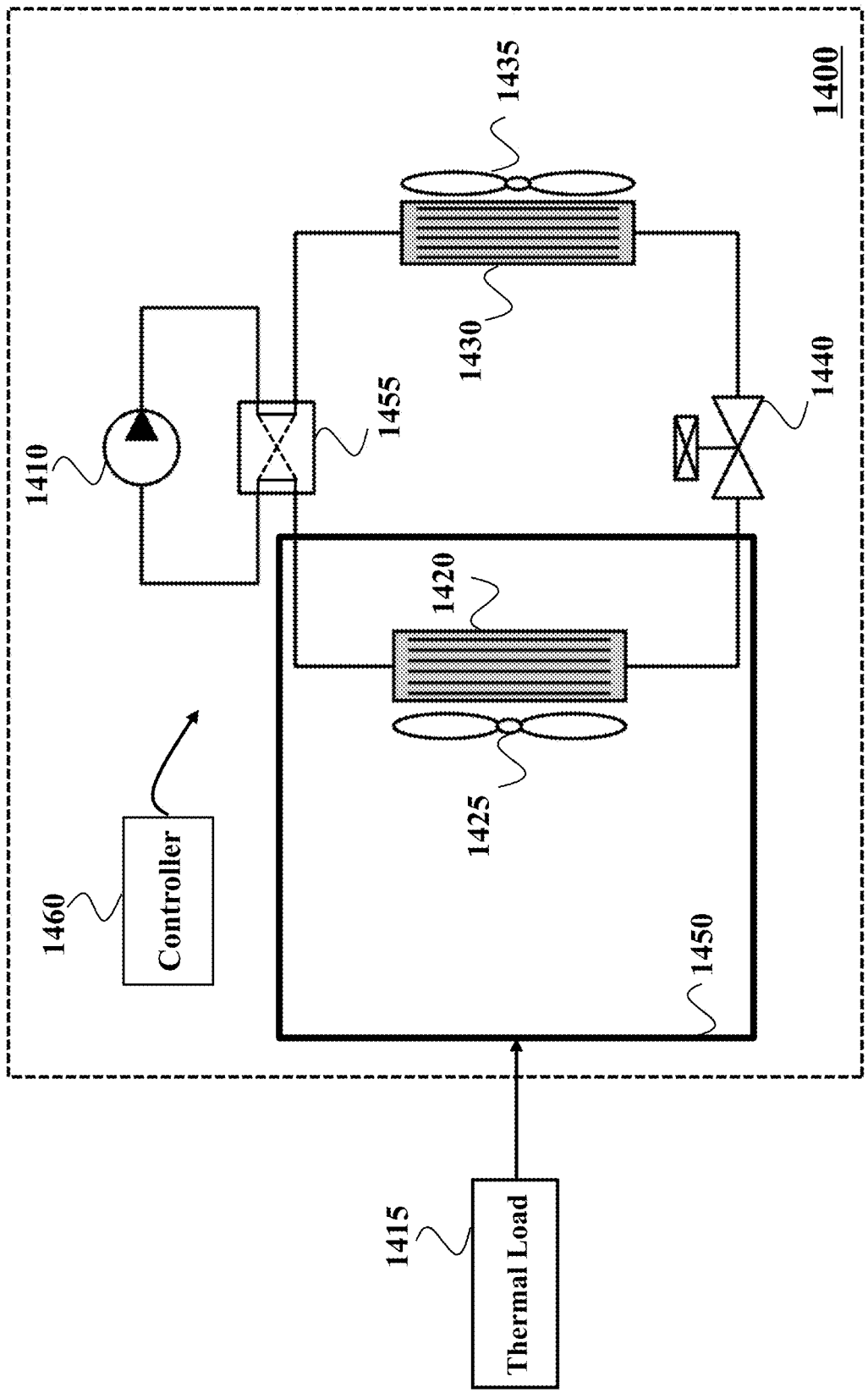
FIG. 14A illustrates a schematic of a vapor compression system controlled by a controller, according to some embodiments.

FIG. 14A illustrates a schematic of a vapor compression system 1400 controlled by a controller 1460, according to some embodiments. The controller 1460 includes a predictive controller, such as a controller implementing a model predictive control (MPC). The components of the vapor compression system (VCS) 1400 can include an indoor heat exchanger 1420 located in an indoor space or zone 1450, an outdoor unit heat exchanger 1430 located in the ambient environment, a compressor 1410 and an expansion valve 1440. A thermal load 1415 acts on the indoor space or zone 1450.

Additionally, the VCS 1400 can include a flow reversing valve 1455 that is used to direct high pressure refrigerant exiting the compressor to either the outdoor unit heat exchanger or the indoor unit heat exchanger, and direct low pressure refrigerant returning from either the indoor unit heat exchanger or outdoor unit heat exchanger to the inlet of the compressor. In the case where high pressure refrigerant is directed to the outdoor unit heat exchanger, the outdoor unit heat exchanger acts as a condenser and the indoor unit acts as an evaporator, wherein the system rejects heat from the zone to the ambient environment, which is operationally referred to as "cooling mode." Conversely, in the case where the high pressure refrigerant is directed to the indoor unit heat exchanger, the indoor unit heat exchanger acts as a condenser and the outdoor unit heat exchanger acts as an evaporator, extracting heat from the ambient environment and pumping this heat into the zone, which is operationally referred to as "heating mode."

Figure 14B:
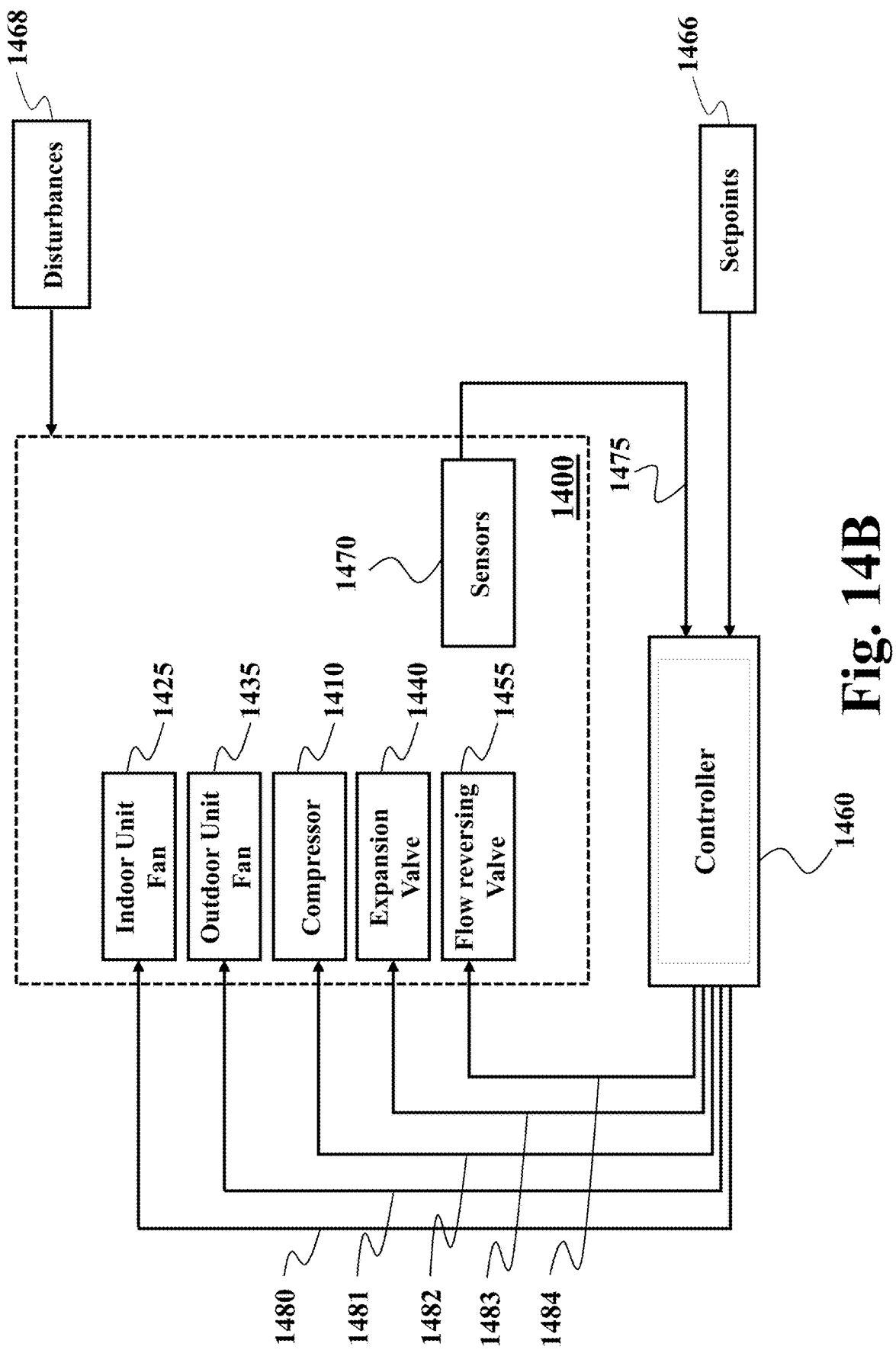
FIG. 14B illustrates an example of the configuration of signals, sensors, and controller used in the VCS, according to some embodiments.

FIG. 14B illustrates an example of the configuration of signals, sensors, and controller used in the VCS 1400, according to some embodiments. A controller 1460 reads information from sensors 1470 configured to measure various temperatures, pressures, flow rates or other information about the operation of the system, including measurable disturbances such as the ambient air temperature. The controller 1460 can be provided with setpoints 1466 that represent desired values of measured signals of the process such as a desired zone temperature. Setpoint information can come from a thermostat, wireless remote control, or internal memory or storage media. The controller then computes control inputs such that some measured outputs are driven to their setpoints. These control inputs can include an indoor unit fan speed 1480, an outdoor unit fan speed 1481, a compressor rotational speed 1482, an expansion valve position 1483, and a flow reversing valve position 1484. In this manner, the controller controls operation of the vapor compression system such that the setpoint values are achieved in the presence of disturbances 1468, such as a thermal load, acting on the system.

In some embodiments, the VCS 1400 can be modeled as a hybrid system and the commands that are sent to the actuators are computed using a predictive controller, such as the mixed-integer model predictive controller. For example, in some embodiments, the commands that are sent to the valves and/or the fans can only take a discrete set of values, and therefore resulting into a set of binary or integer control input variables for each stage within the mixed-integer control horizon.

In some embodiments, the predictive controller determines an input to the vapor compression system based on the mixed-integer control solution, wherein the input to the vapor compression system includes one or a combination of an indoor unit fan speed, an outdoor unit fan speed, a compressor rotational speed, an expansion valve position, and a flow reversing valve position, and the discrete optimization variables are used to model one or a combination of discrete control decisions, switching in the system dynamics, and integer values for the commands that are sent to the valves and/or to the fans.

In some embodiments, the dynamic behavior of the VCS 1400 can change rapidly or even switch at certain time instances, depending on the current state of the system and the current control input values. The resulting hybrid VCS 1400 with switching dynamics can be modeled using an additional set of binary or integer control input variables for each stage within the mixed-integer control horizon.

FIG. 15 illustrates a method 1500 for controlling a system, according to an example embodiment. At step 1501, the method includes accepting feedback signal including measurements of a state of the system. At step 1503, the method includes solving a mixed-integer optimal control optimization problem using branch-and-bound (B&B) optimization that searches for a global optimal solution within a search space to produce a control signal, where the B&B optimization iteratively partitions the search space into a nested tree of regions, and prunes at least one region from the nested tree of regions before finding a local optimal solution for each region when a dual objective value of a projection of a sub-optimal dual solution estimate for each region into a dual feasible space is greater than an upper bound or lesser than a lower bound of the global optimal solution maintained by the B&B optimization. At step 1505, controlling the system based on the control signal to change the state of the system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A predictive controller for controlling a system, the predictive controller comprising: at least one processor; and memory having instructions stored thereon that, when executed by the at least one processor, cause the predictive controller to:

accept feedback signal including measurements of a state of the system;

solve a mixed-integer optimal control optimization problem using branch-and-bound (B&B) optimization that searches for a global optimal solution within a search space to produce a control signal, wherein the B&B optimization iteratively partitions the search space into a nested tree of regions, and prunes at least one region from the nested tree of regions before finding a local optimal solution for each region when a dual objective value of a projection of a sub-optimal dual solution estimate for each region into a dual feasible space is greater than an upper bound or lesser than a lower bound of the global optimal solution maintained by the B&B optimization, wherein the nested tree of regions is formed by different convex relaxations of integer variables of the mixed-integer optimal control optimization problem, and wherein the local optimal solution within each region of the nested tree of regions is searched by an interior-point method over multiple iterations, such that the sub-optimal dual solution estimate for each region is produced by an intermediate iteration of the interior-point method, wherein the local optimal solution is based on an early termination procedure, wherein the early termination procedure allows the interior-point method to terminate its iterative procedure before the local optimal solution for the at least one region is found in case when: a dual feasible solution estimate is computed after one or multiple iterations of the interior point method and the dual objective value is greater than the upper bound of the global optimal solution maintained by the B&B optimization; or a projection step is performed after one or multiple iterations of the interior point method to compute a dual feasible solution estimate and the corresponding dual objective value is greater than the upper bound of the global optimal solution maintained by the B&B optimization;

or the interior point method detects after one or multiple iterations that no feasible solution exists for the at least one region,
wherein the projection step computes an update to the sub-optimal dual solution estimate by solving an equality-constrained optimization problem that enforces the dual feasibility constraints and minimizes a norm of the update for Lagrange multiplier variables, and wherein the projection step enforces one or multiple additional optimality conditions, and minimizes a weighted norm of the update for optimization variables, based on a positive definite weighting matrix in an objective function; and
control the system based on the control signal to change the state of the system.

2. The predictive controller of claim 1, wherein the processor is configured to:
perform the projection of the sub-optimal dual solution estimate for the early termination procedure when the dual objective value for the sub-optimal dual solution estimate is greater than the upper bound; or
continue to execute the iterative procedure from the sub-optimal dual solution estimate to find the global optimal solution.

3. The predictive controller of claim 2, wherein the local optimal solution for the at least one region is used to initialize the iterative procedure in one or multiple other regions within the nested tree of regions for the B&B optimization.

4. The predictive controller of claim 1, wherein the projection step computes the sub-optimal dual solution estimate from the local optimal solution to perform the early termination procedure for one or multiple other regions within the nested tree of regions for the B&B optimization.

5. The predictive controller of claim 1, wherein the projection step computes an update to the sub-optimal dual solution estimate by solving a block-structured linear system, the solution of which forms an optimal solution to the equality-constrained optimization problem.

6. The predictive controller in claim 1, wherein the positive definite weighting matrix in the objective of the projection step corresponds to a Hessian matrix as a weighting for the update to the optimization variables, a diagonal matrix of small positive weighting values for the update to the Lagrange multipliers corresponding to the equality constraints in the convex relaxation, and a positive weighting value that corresponds to the ratio between the slack variable and the Lagrange multiplier value corresponding to each inequality constraint after one or multiple iterations of a convex solution procedure.

7. The predictive controller of claim 5, wherein the block-structured linear system is solved by solving a reduced linear system to compute an update to the optimization variables, followed by a solution of a diagonal linear system to compute an update to the Lagrange multiplier variables.

8. The predictive controller of claim 7, wherein a Cholesky factorization is computed or updated, given the Cholesky factorization from a previous projection step or from a previous iteration of a convex solution procedure, to compute a solution to the reduced linear system with a positive definite KKT matrix.

9. The predictive controller of claim 8, wherein the KKT matrix of the reduced linear system has a block-tridiagonal sparsity structure due to the block-structured sparsity of the mixed-integer optimal control optimization problem, and a block-tridiagonal Cholesky factorization is computed or updated to compute a solution to the reduced linear system with a positive definite, block-tridiagonal KKT matrix.

10. The controller of claim 1, wherein the predictive controller is implemented using a mixed-integer model predictive control (MI-MPC), wherein the MI-MPC computes the control signal based on current state of the system and control command, and wherein the MI-MPC computes a control solution that comprises a sequence of future optimal discrete and continuous control inputs over a prediction time horizon of the system, by solving a constrained mixed-integer optimization problem at each control time step.

11. The predictive controller of claim 1, wherein the system is a vehicle, and wherein the predictive controller determines an input to the vehicle based on the mixed-integer control solution, wherein the input to the vehicle includes one or a combination of an acceleration of the vehicle, an engine torque of the vehicle, brake torques, and a steering angle, and the discrete optimization variables are used to model one or a combination of discrete control decisions, switching in the system dynamics, gear shifting, and obstacle avoidance constraints.

12. The predictive controller of claim 1, wherein the system is a spacecraft, and wherein the predictive controller determines an input to the spacecraft based on the mixed-integer control solution, wherein the input to the spacecraft actuates one or a combination of thrusters and momentum exchange devices, and the discrete optimization variables are used to model one or a combination of discrete control decisions, switching in the system dynamics, integer values for the thruster commands, and obstacle avoidance constraints.

13. The predictive controller of claim 1, wherein the system is a vapor compression system, and wherein the predictive controller determines an input to the vapor compression system based on the mixed-integer control solution, wherein the input to the vapor compression system includes one or a combination of an indoor unit fan speed, an outdoor unit fan speed, a compressor rotational speed, an expansion valve position, and a flow reversing valve position, and the discrete optimization variables are used to model one or a combination of discrete control decisions, switching in the system dynamics, and integer values for the commands that are sent to the valves and/or to the fans.

14. A method for controlling a system, wherein the method uses: at least one processor; and a memory having instructions stored thereon that, when executed by the at least one processor carry out steps of the method, comprising:
accepting feedback signal including measurements of a state of the system;
solving a mixed-integer optimal control optimization problem using branch-and-bound (B&B) optimization that searches for a global optimal solution within a search space to produce a control signal, wherein the B&B optimization iteratively partitions the search space into a nested tree of regions, and prunes at least one region from the nested tree of regions before finding a local optimal solution for each region when a dual objective value of a projection of a sub-optimal dual solution estimate for each region into a dual feasible space is greater than an upper bound or lesser than a lower bound of the global optimal solution maintained by the B&B optimization,
wherein the nested tree of regions is formed by different convex relaxations of integer variables of the mixed-integer optimal control optimization problem, and wherein the local optimal solution within each region of the nested tree of regions is searched by an interior-point method over multiple iterations, such that the sub-optimal dual solution estimate for each region is produced by an intermediate iteration of the interior-point method, wherein the local optimal solution is based on an early termination procedure, wherein the early termination procedure allows the interior-point method to terminate its iterative procedure before the local optimal solution for the at least one region is found in case when: a dual feasible solution estimate is computed after one or multiple iterations of the interior point method and the dual objective value is greater than the upper bound of the global optimal solution maintained by the B&B optimization; or a projection step is performed after one or multiple iterations of the interior point method to compute a dual feasible solution estimate and the corresponding dual objective value is greater than the upper bound of the global optimal solution maintained by the B&B optimization; or the interior point method detects after one or multiple iterations that no feasible solution exists for the at least one region, wherein the projection step computes an update to the sub-optimal dual solution estimate by solving an equality-constrained optimization problem that enforces the dual feasibility constraints and minimizes a norm of the update for Lagrange multiplier variables, and wherein the projection step enforces one or multiple additional optimality conditions, and minimizes a weighted norm of the update for optimization variables, based on a positive definite weighting matrix in an objective function; and controlling the system based on the control signal to change the state of the system.

15. The method of claim 14, wherein the local optimal solution is based on an early termination procedure, wherein the early termination procedure allows the interior-point method to terminate its iterative procedure before the local optimal solution for the at least one region is found in case when:
a dual feasible solution estimate is computed after one or multiple iterations of the interior point method and the dual objective value is greater than the upper bound of the global optimal solution maintained by the B&B optimization; or
a projection step is performed after one or multiple iterations of the interior point method to compute a dual feasible solution estimate and the corresponding dual objective value is greater than the upper bound of the global optimal solution maintained by the B&B optimization; or
the interior point method detects after one or multiple iterations that no feasible solution exists for the at least one region.

16. A non-transitory computer readable storage medium embodied thereon a program executable by a processor for performing a method, the method comprising:
accepting feedback signal including measurements of a state of the system;
solving a mixed-integer optimal control optimization problem using branch-and-bound (B&B) optimization that searches for a global optimal solution within a search space to produce a control signal, wherein the B&B optimization iteratively partitions the search space into a nested tree of regions, and prunes at least one region from the nested tree of regions before finding a local optimal solution for each region when a dual objective value of a projection of a sub-optimal dual solution estimate for each region into a dual feasible space is greater than an upper bound or lesser than a lower bound of the global optimal solution maintained by the B&B optimization,
wherein the nested tree of regions is formed by different convex relaxations of integer variables of the mixed-integer optimal control optimization problem, and wherein the local optimal solution within each region of the nested tree of regions is searched by an interior-point method over multiple iterations, such that the sub-optimal dual solution estimate for each region is produced by an intermediate iteration of the interior-point method, wherein the local optimal solution is based on an early termination procedure, wherein the early termination procedure allows the interior-point method to terminate its iterative procedure before the local optimal solution for the at least one region is found in case when: a dual feasible solution estimate is computed after one or multiple iterations of the interior point method and the dual objective value is greater than the upper bound of the global optimal solution maintained by the B&B optimization; or a projection step is performed after one or multiple iterations of the interior point method to compute a dual feasible solution estimate and the corresponding dual objective value is greater than the upper bound of the global optimal solution maintained by the B&B optimization; or the interior point method detects after one or multiple iterations that no feasible solution exists for the at least one region,
wherein the projection step computes an update to the sub-optimal dual solution estimate by solving an equality-constrained optimization problem that enforces the dual feasibility constraints and minimizes a norm of the update for Lagrange multiplier variables, and wherein the projection step enforces one or multiple additional optimality conditions, and minimizes a weighted norm of the update for optimization variables, based on a positive definite weighting matrix in an objective function; and
controlling the system based on the control signal to change the state of the system.

* * * * *